(12) United States Patent
Lee et al.

(10) Patent No.: US 8,059,166 B2
(45) Date of Patent: Nov. 15, 2011

(54) MULTIFUNCTIONAL VIDEO APPARATUS AND METHOD OF PROVIDING USER INTERFACE THEREOF

(75) Inventors: Chang-hyeon Lee, Suwon-si (KR); Han-kon Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 731 days.

(21) Appl. No.: 11/870,568

(22) Filed: Oct. 11, 2007

(65) Prior Publication Data
US 2008/0180549 A1   Jul. 31, 2008

(30) Foreign Application Priority Data

Jan. 31, 2007  (KR) ................... 10-2007-0009852

(51) Int. Cl.
*H04N 5/222* (2006.01)
(52) U.S. Cl. ............ 348/231.2; 348/240.99; 348/333.01
(58) Field of Classification Search ............... 348/231.2, 348/231.8, 333.01–333.09, 231.99, 240.99
See application file for complete search history.

(56) References Cited

U.S. PATENT DOCUMENTS

| | | | |
|---|---|---|---|
| 3,950,083 A | 4/1976 | Yoshimura et al. | |
| 4,410,247 A | 10/1983 | Hirata et al. | |
| 4,858,012 A * | 8/1989 | Hino et al. | 348/211.6 |
| 5,189,563 A | 2/1993 | Breslau et al. | |
| 5,742,341 A * | 4/1998 | Ohishi et al. | 348/373 |
| 6,490,407 B2 * | 12/2002 | Niida | 386/69 |
| 7,098,948 B2 * | 8/2006 | Ikehata et al. | 348/231.8 |
| 7,158,175 B2 * | 1/2007 | Belz et al. | 348/231.3 |
| 7,511,741 B2 * | 3/2009 | Son | 348/231.2 |
| 2002/0141617 A1 * | 10/2002 | Yamashiro et al. | 382/103 |
| 2002/0181722 A1 * | 12/2002 | Hibino et al. | 381/92 |
| 2003/0169349 A1 * | 9/2003 | Aoi et al. | 348/231.2 |
| 2004/0004667 A1 * | 1/2004 | Morikawa et al. | 348/333.06 |
| 2004/0056972 A1 * | 3/2004 | Jang et al. | 348/333.01 |
| 2004/0174442 A1 * | 9/2004 | Chosa | 348/231.1 |
| 2004/0212700 A1 * | 10/2004 | Prabhu et al. | 348/231.99 |
| 2004/0263659 A1 * | 12/2004 | Abe | 348/333.01 |
| 2005/0147407 A1 * | 7/2005 | Park et al. | 396/281 |
| 2005/0212915 A1 * | 9/2005 | Karasaki et al. | 348/207.2 |
| 2005/0275743 A1 * | 12/2005 | Kikuchi | 348/345 |
| 2006/0018207 A1 * | 1/2006 | Saito | 369/30.01 |
| 2006/0051083 A1 * | 3/2006 | Yamamoto | 396/287 |
| 2006/0072028 A1 * | 4/2006 | Hong | 348/333.01 |
| 2006/0187316 A1 * | 8/2006 | Teramoto et al. | 348/231.3 |

(Continued)

FOREIGN PATENT DOCUMENTS

EP           1158785       11/2001

(Continued)

OTHER PUBLICATIONS

European Search Report issued Nov. 11, 2009 in EP Application No. 07120794.8.

(Continued)

*Primary Examiner* — Tuan Ho
*Assistant Examiner* — Kent Wang
(74) *Attorney, Agent, or Firm* — Stanzione & Kim, LLP

(57) ABSTRACT

A multifunctional video apparatus and a method of providing a user interface (UI) thereof. The multifunctional video apparatus has diverse functions such as image capturing, image reproduction, image editing, image input/output from/to an external device, etc., and provides a UI capable of performing the above-described functions more conveniently.

17 Claims, 83 Drawing Sheets

U.S. PATENT DOCUMENTS

| | | | |
|---|---|---|---|
| 2007/0139534 A1* | 6/2007 | Tsushio et al. | 348/231.99 |
| 2007/0206944 A1* | 9/2007 | Ieda | 396/287 |
| 2007/0296832 A1* | 12/2007 | Ota et al. | 348/231.99 |
| 2009/0086058 A1* | 4/2009 | Kaplan et al. | 348/231.9 |

FOREIGN PATENT DOCUMENTS

| | | |
|---|---|---|
| EP | 1608151 | 12/2005 |
| EP | 1608155 | 12/2005 |
| EP | 1811770 | 7/2007 |
| JP | 2000041163 | 2/2000 |
| KR | 1999-12580 | 4/1999 |
| KR | 2007-12157 | 1/2007 |

OTHER PUBLICATIONS

Samsung Electronics: "Digital Camcorder SCD101/D103/D105" [Online] Apr. 21, 2004, Samsung Electronics, XP002553065 Retrieved from the Internet: URL:http://www.samsung.com/us/support/search/supportSearchModelResult.do?menu=SPO1&searchWord-scd103&searchInputBox=scd103&find_button=> [retrieved on Oct. 30, 2009] p. 13-16 p. 18-19 pp. 23, 30 pp. 35, 42-44 p. 48-49 pp. 57, 62-63 pp. 65, 70 pp. 87, 91-92 p. 96-98.

European Search Report dated Aug. 5, 2009 issued in EP Application No. 07120794.8.

JVC Victor Co. of Japan: JY-VS200 Digital Video Camera—XP002538277.

JVC : JVC Launches ProMedia JY-VS200 "Indie" Professional DV Camcorder with Digital Still Capability—XP002538279.

Sony: Sony Turns Up the Volume on it Camcorders for 2006—XP002538278.

Sony Corp: DCR-SR100 Camera Operating Guide—XP002538276.

* cited by examiner

MULTIFUNCTIONAL VIDEO APPARATUS AND METHOD OF PROVIDING USER INTERFACE THEREOF

CROSS-REFERENCE TO RELATED APPLICATIONS

This application claims priority under 35 U.S.C. §119 (a) of Korean Patent Application No. 10-2007-0009852, filed on Jan. 31, 2007, in the Korean Intellectual Property Office, the disclosure of which is hereby incorporated herein in its entirety by reference.

BACKGROUND OF THE INVENTION

1. Field of the Invention

The present general inventive concept relates to a multifunctional video apparatus and a method of providing a user interface thereof. More particularly, the present general inventive concept relates to a multifunctional video apparatus and a method of providing a user interface (UI) thereof, which can perform diverse functions such as image capturing, image editing, voice recording, etc.

2. Description of the Related Art

A conventional multifunctional video apparatus is an apparatus in which diverse video devices are integrated. Implementation of such a conventional multifunctional video apparatus has become possible by grafting new digital technology onto video apparatuses.

Since functions performed by the conventional multifunctional video apparatus constantly increase in size and complexity, methods of using the conventional multifunctional video apparatus have also become quite complicated.

Accordingly, a need exists for a user interface (UI) that facilitates a user's manipulation and provides an excellent visual effect.

SUMMARY OF THE INVENTION

The present general inventive concept provides a multifunctional video apparatus and a method of providing a user interface (UI) thereof, which can simplify manipulation of the multifunctional video apparatus and provide an excellent visual effect.

Additional aspects and utilities of the present general inventive concept will be set forth in part in the description which follows and, in part, will be obvious from the description, or may be learned by practice of the general inventive concept.

The foregoing and other aspects and utilities of the present general inventive concept may be achieved by providing an image capturing and reproducing apparatus, which includes a main body, a display unit rotatively connected to the main body, a storage unit to store a captured image, and a mode determining unit to determine a mode of the image capturing and reproducing apparatus, wherein the display unit comprises an LCD screen to display the captured image, and a control button to perform at least two control functions according to the mode selected by the mode determining unit.

If the mode selected by the mode determining unit is an image capturing mode, the control button may operate to perform zoom-in or zoom-out of an object, and if the mode selected is an image reproduction mode, the control button may operate to perform volume-up or volume-down.

The foregoing and other aspects and utilities of the present general inventive concept may also be achieved by providing an image capturing and reproducing apparatus, which includes a main body, a display unit rotatively connected to the main body, and a mode determining unit to determine a mode of the image capturing and reproducing apparatus, wherein the display unit comprises an LCD screen to display the captured image, and a quick menu button to display a menu according to the mode selected by the mode determining unit.

If the mode selected by the mode determining unit is an image capturing mode, the quick menu button may operate to display a menu used to perform image capturing, and if the mode selected is an image reproduction mode, the quick menu button may operate to display a menu used to perform image reproduction.

The foregoing and other aspects and utilities of the present general inventive concept may also be achieved by providing a method of displaying a recording medium of an image capturing and reproducing apparatus having a first recording medium and a second recording medium, which includes selecting the first recording medium or the second recording medium, displaying a recording medium icon corresponding to the selected recording medium, selecting an image capturing mode or an image reproduction mode of the image capturing and reproducing apparatus, and displaying an icon corresponding to the selected mode.

The foregoing and other aspects and utilities of the present general inventive concept may also be achieved by providing a method of simultaneously controlling an image and a voice of an image capturing device, which includes inputting an image and voice control command by pushing a fade button during an image capturing, controlling the captured image to become dark gradually and simultaneously controlling the voice to become small gradually on the basis of the image and voice control command, and restoring the present operation state to the operation state before the fade button is pushed by controlling the image to become bright gradually and simultaneously controlling the voice to become loud gradually if the pushing of the fade button is stopped.

The foregoing and other aspects and utilities of the present general inventive concept may also be achieved by providing a method of copying an image recorded in a first recording medium into a second recording medium in an image capturing device having the first recording medium and the second recording medium, which includes receiving a copy command to copy an image in the first recording medium into the second recording medium, searching to find still images from images stored in the first recording medium, and copying the searched still images into the second recording medium.

The first recording medium may be a magnetic tape, and the second recording medium may be a semiconductor memory.

The foregoing and other aspects and utilities of the present general inventive concept may also be achieved by providing a computer readable recording medium having embodied thereon a computer program to execute a method, wherein the method includes selecting a first recording medium or a second recording medium, displaying a recording medium icon corresponding to the selected recording medium, selecting an image capturing mode or an image reproduction mode of an image capturing and reproducing apparatus, and displaying an icon corresponding to the selected mode.

The foregoing and other aspects and utilities of the present general inventive concept may also be achieved by providing an image capturing and reproducing apparatus, including a mode selection unit to select between a mode of capturing an image onto at least one of a plurality of recording media and a mode of reproducing another image from at least one of the plurality of recording media, and a display unit to display the image being captured or the reproduced another image.

The display unit may further display an indicator corresponding to the selected mode.

The image capturing and reproducing apparatus may further include a lens to capture the image, and a storage unit to store the captured image and the another image.

The display unit may include at least one of an LCD screen and a viewfinder.

The mode selection unit may further include a power selection switch to select between an image capturing mode and an image reproducing mode, and a mode selection switch to select one of the plurality of recording media.

The plurality of recording media may include a tape and a memory card.

The selecting of the tape and the image capturing mode may produce a menu on the display unit which includes at least one of a plurality of functions which allow a user to alter a voice mode of the image being captured, to display recording time left in the tape, to apply image effects to the image being captured, to change a shutter speed of a lens of the image capturing and reproducing apparatus, to perform handshake correction, to capture a photo of the image being captured, and to change an aspect ratio of the image being captured.

The selecting of the tape and the image reproducing mode may produce a menu on the display unit which includes at least one of a plurality of functions which allow a user to change a volume of a sound from the image being reproduced, to dub external audio sounds onto the image being reproduced, and to display an amount of reproduction time left in the tape.

The selecting of the memory card and the image capturing mode may produce a menu on the display unit which includes at least one of a plurality of functions which allow a user to change a pixel size of the image being captured, to alter an exposure setting of a lens of the image capturing and reproducing apparatus, to display an amount of MPEG-4 recording time left in the memory card, and to display a number or images which can fit onto the memory card.

The selecting of the memory card and the image reproducing mode may produce a menu on the display unit which includes at least one of a plurality of functions which allow a user to prevent the image being reproduced from being erased, to display a folder in which the image being reproduced is stored, to display an amount of reproduction time left in the memory card.

The foregoing and other aspects and utilities of the present general inventive concept may also be achieved by providing a method of an image capturing and reproducing apparatus, including selecting between a mode of capturing an image onto at least one of a plurality of recording media and a mode of reproducing another image from at least one of the plurality of recording media, displaying an indicator corresponding to the selected mode, and displaying the image being captured or the reproduced another image.

The foregoing and other aspects and utilities of the present general inventive concept may also be achieved by providing a computer readable recording medium having embodied thereon a computer program to execute a method, wherein the method includes selecting between a mode of capturing an image onto at least one of a plurality of recording media and a mode of reproducing another image from at least one of the plurality of recording media, displaying an indicator corresponding to the selected mode, and displaying the image being captured or the reproduced another image.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

Throughout the drawings, the same drawing reference numerals will be understood to refer to the same elements, features and/or structures.

DETAILED DESCRIPTION OF THE PREFERRED EMBODIMENTS

Figure 1:
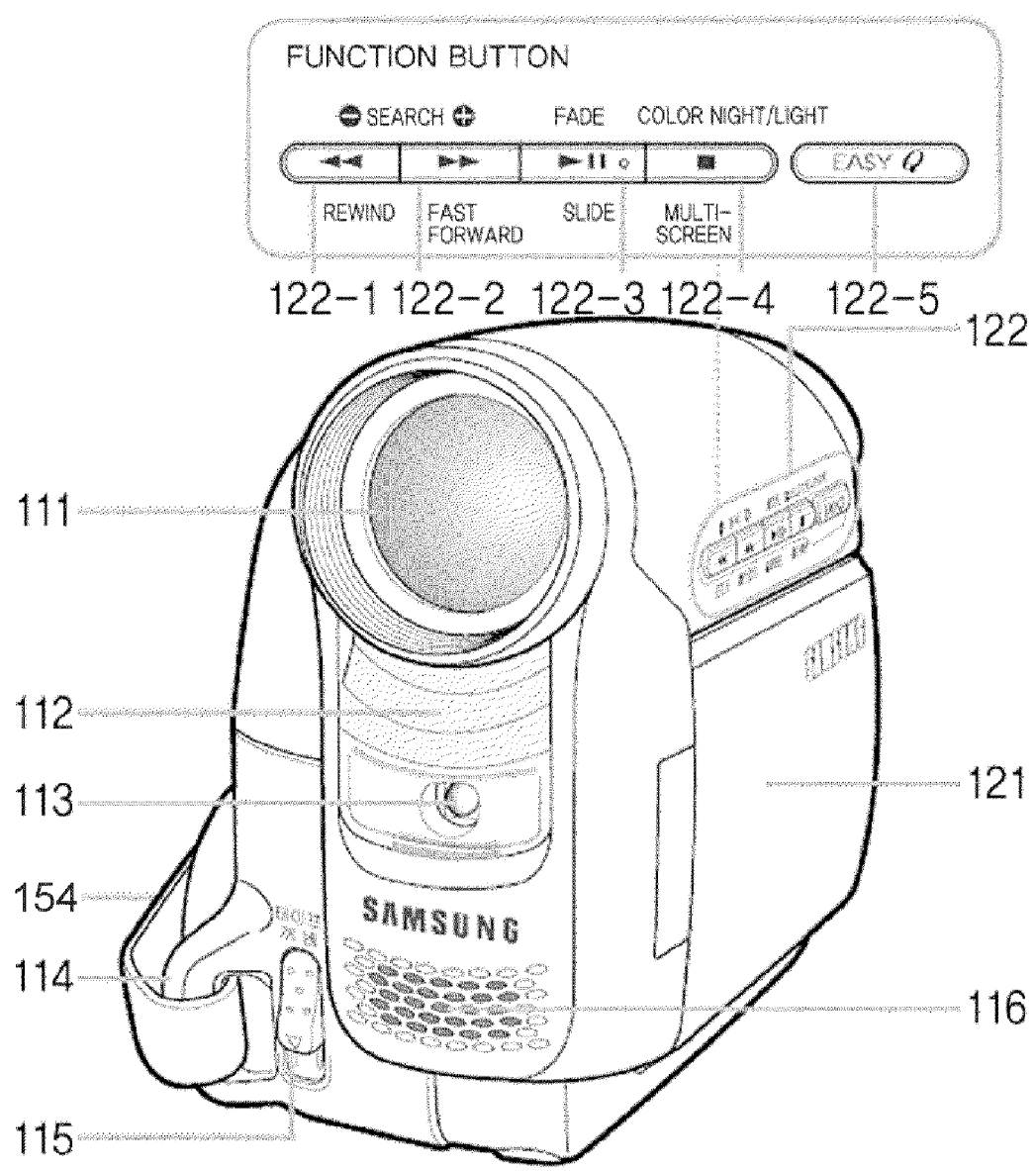
FIGS. 1 to 5 are perspective views illustrating external appearances of the multifunctional video apparatus according an exemplary embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

A multifunctional audio/video apparatus according to an embodiment of the present general inventive concept (hereinafter referred to as a "multifunctional video apparatus") provides functions of environment setup, still image capturing/reproduction, moving image capturing/reproduction, audio editing, still image management, PC camera, connecting with an external device, etc. The above functions, operation of the multifunctional video apparatus in a mode to perform the respective functions, and a user interface (UI) provided to a user will be described in detail later.

FIG. 1 is a perspective view illustrating an external appearance of a multifunctional video apparatus with front and left-side surfaces thereof illustrated according to an exemplary embodiment of the present general inventive concept.

As illustrated in FIG. 1, a main body of the multifunctional video apparatus according to an embodiment of the present general inventive concept is provided with a lens 111, a remote control receiving unit 112, a flash 113, a grip belt connection ring 114, a tape ejection switch 115, a built-in microphone 116, an LCD panel 121, and function buttons 122.

The grip belt connection ring 114 can be a connection ring to enable a user to use buttons and switches of the multifunctional video apparatus with one hand, and a length of the grip belt connection ring 114 can be adjusted to properly fit the user's hand by adjusting an adjustment belt that is a part of a grip belt 154.

The tape ejection switch 115 is a switch that is used to insert a tape into the multifunctional video apparatus or to remove the tape from the multifunctional video apparatus. A method of inserting a tape into the multifunctional video apparatus using the tape ejection switch 115 will be described later.

The LCD panel 121 can be moved in a predetermined direction around the main body.

The function buttons 122 include a rewind (RW) button 122-1, a fast-forward (FF) button 122-2, a play/pause button 122-3, a stop button 122-4, and an Easy.Q button 122-5. According to different circumstances and functionalities of the multifunctional video apparatus, the RW button 122-1 may function as a "Previous" button or a reverse button, and the FF button 122-2 may function as a "Next" button. The play/pause button 122-3 may function as a slide button or a fade button, and the stop button 122-3 may function as a multi-screen button or a color night/light button. Various uses of the respective buttons belonging to the function buttons 122 will be described later.

Figure 2:
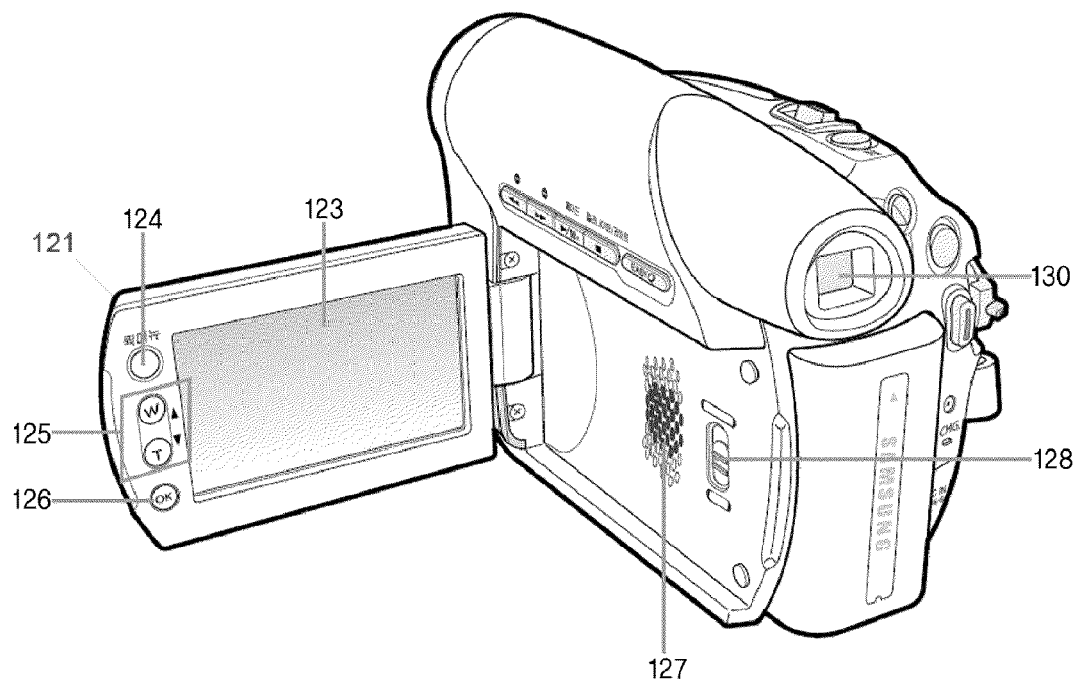

FIG. 2 is a perspective view illustrating an external appearance of a multifunctional video apparatus with rear and left-side surfaces thereof illustrated according to an exemplary embodiment of the present general inventive concept.

As illustrated in FIG. 2, a main body of the multifunctional video apparatus according to an embodiment of the present general inventive concept is provided with an LCD panel 121 having an LCD screen 123, a quick menu button 124, an up/down (W/T) button 125, and a confirmation (OK) button 126, a built-in speaker 127, a mode selection switch 128, and a view finder 130.

The LCD screen 123 may display captured and/or reproduced images, menu items of the multifunctional video apparatus, etc. Furthermore, the LCD screen 123 is generally implemented by a Liquid Crystal Diode (LCD).

The up/down button 125 is a button that is used to shift a menu item during setup of a specified function, to adjust the volume during reproduction of an image, to perform zoom-in or zoom-out of an object to be captured during capturing of the image, and to search to find a specified image during reproduction of the image.

The confirmation button 126 is a button used to select any one of a plurality of menu items. A user can select a specified menu item using the up/down button 125 and the confirmation button 126.

The viewfinder 130 displays an image, similarly to the LCD screen 123, and particularly, the viewfinder 130 is used in replacement of the LCD screen 123 if the LCD screen is not visible in an excessively bright place. The viewfinder 130 may be automatically turned on when the LCD screen 123 is closed. In addition, as illustrated in FIG. 3, by shifting a focus control lever 143 that is adjacent to the viewfinder 130 in right and left directions, the image displayed on the viewfinder 130 can be focused.

Figure 3:
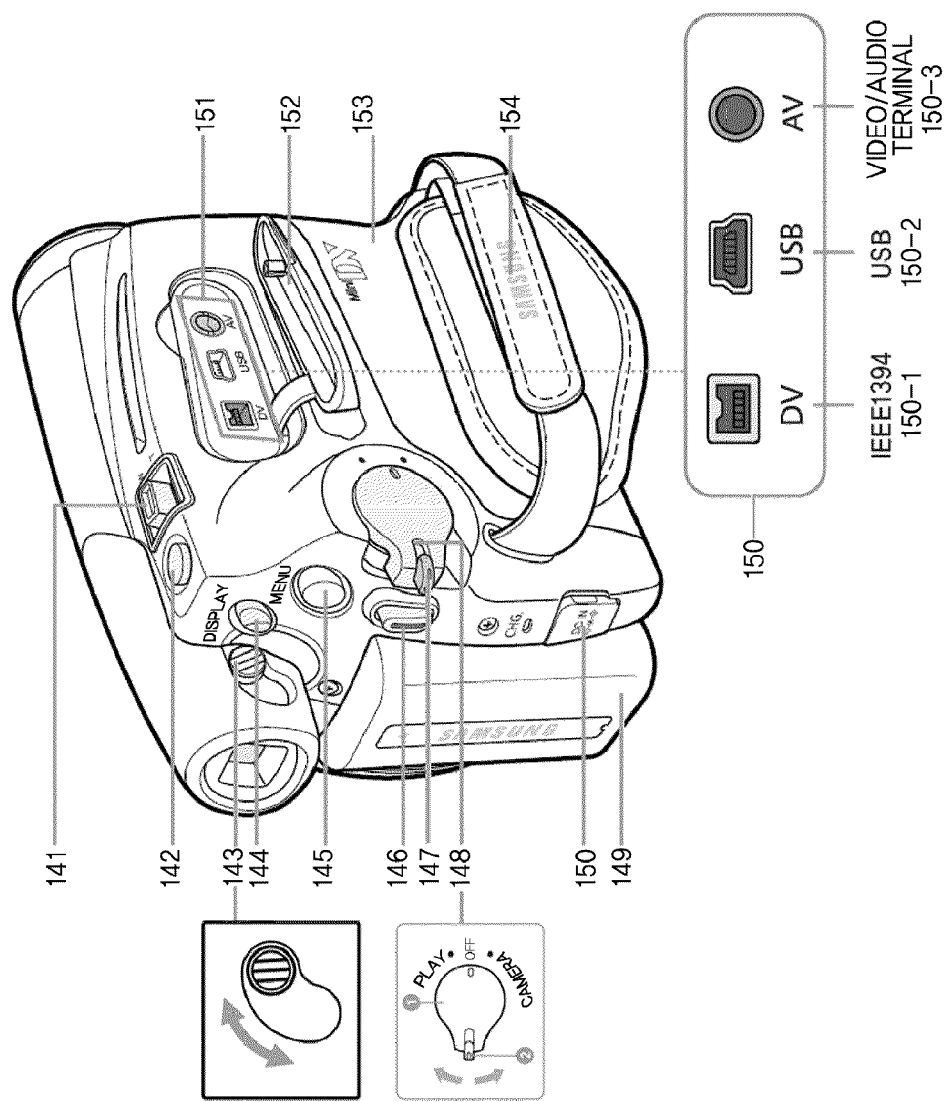

FIG. 3 is a perspective view illustrating an external appearance of a multifunctional video apparatus with rear and right-side surfaces thereof illustrated according to an exemplary embodiment of the present general inventive concept.

As illustrated in FIG. 3, the main body of the multifunctional video apparatus according to an embodiment of the present general inventive concept is provided with a zoom lever 141, a photo (i.e., still image) button 142, the focus control lever 143, a screen display button 144, a menu button 145, an image capturing start/stop button 146, a locking/unlocking button 147, a power selection switch 148, a battery pack 149, a DC power terminal 150, an external input terminal 151, a connection terminal cover 152, a cassette door 153, and the grip belt 154.

The screen display button 144 is a button used to set whether to display an image on the LCD screen 123. For example, if a user pushes the screen display button 144 once, an image being captured is displayed on the LCD screen 123, and if the user pushes the screen display button 144 once more, the image is not displayed on the LCD screen 123.

The menu button 145 is a button used to input a command to call and display a menu on the LCD screen 123.

The power selection switch 148 is a switch used to select a power on/off mode, an image capturing mode, or a tape reproduction mode. The user can select a desired mode of the multifunctional video apparatus by shifting the power selection switch 148 upward or downward while pushing the locking/unlocking button 147.

The modes of the multifunctional video apparatus are briefly classified into a tape camera mode, a tape reproduction mode, a memory card camera mode, and a memory card reproduction mode in accordance with corresponding types of the recording media. The tape camera mode is a mode to record a moving image on a tape or recording a still image, and the tape reproduction mode is a mode to reproduce a moving image or a still image recorded on the tape. The memory card mode is a mode to record a moving image or a still image on the memory card, and a memory card reproduction mode is a mode to reproduce a moving image or a still image stored in the memory card. The modes of the multifunctional video apparatus are determined by combinations of the power selection switch 148 and the mode selection switch 128. In addition, the multifunctional video apparatus according to an embodiment of the present general inventive concept has diverse modes, and details thereof will be described later.

Figure 4:
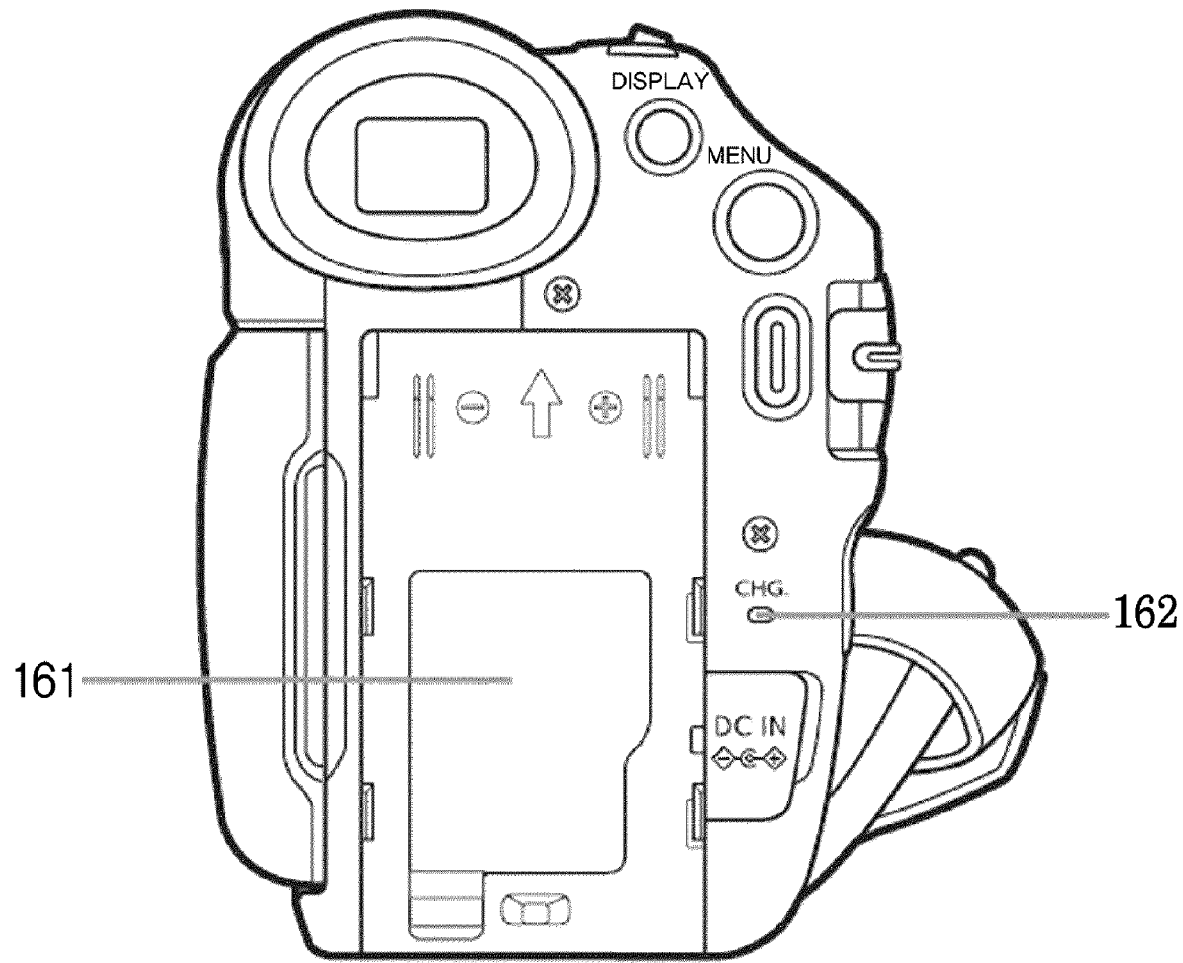

FIG. 4 is a rear view of the multifunctional video apparatus with the battery pack 149 of FIG. 3 removed according to an exemplary embodiment of the present general inventive concept. The main body of the multifunctional video apparatus is provided with a lithium battery holder 161 and a battery charging indicator light 162.

Figure 5:
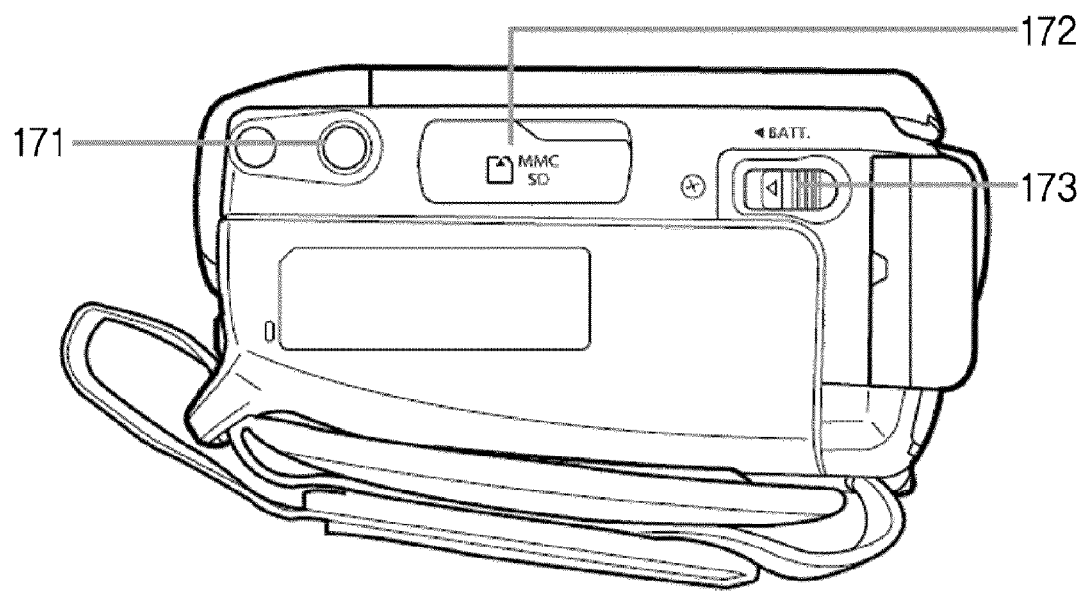

FIG. 5 is a bottom view of the multifunctional video apparatus. The main body of the multifunctional video apparatus is provided with a three-legged support fixing part 171, a memory card slot 172, and a battery ejection switch 173.

A memory card may be inserted into the memory card slot 172. The memory card used in the multifunctional video apparatus according to an embodiment of the present general inventive concept may be a multimedia card (MMC) or a secure digital card (SD), but is not limited thereto. Any detachable memory card can be used in the multifunctional video apparatus. The above-described memory card is one of a type of semiconductor memories. In contrast, another recording medium used in the multifunctional video apparatus may be a tape, including a magnetic tape. The three-legged support fixing part 171 includes holes to fix a tripod, or any other type of multifunctional video apparatus support part not limited to having three legs, thereto.

Hereinafter, a method of attaching/detaching a detachable tape, memory card, battery pack and a method of moving the LCD panel 121 of FIG. 2 in the multifunctional video apparatus according to an embodiment of the present general inventive concept will be described.

Figure 6A:
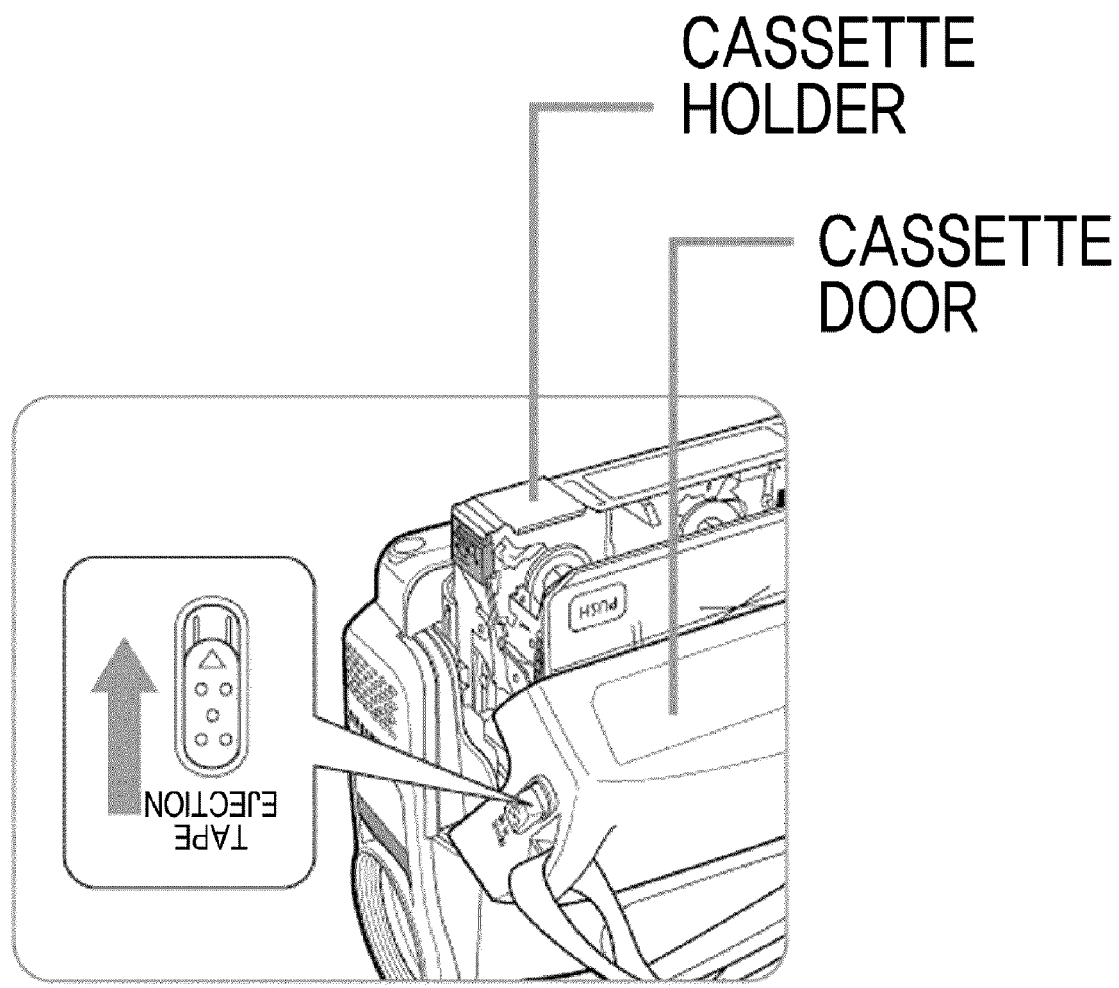
FIGS. 6A to 12B are views illustrating initial manipulations of the multifunctional video apparatus according to an exemplary embodiment of the present general inventive concept.
Figure 6B:
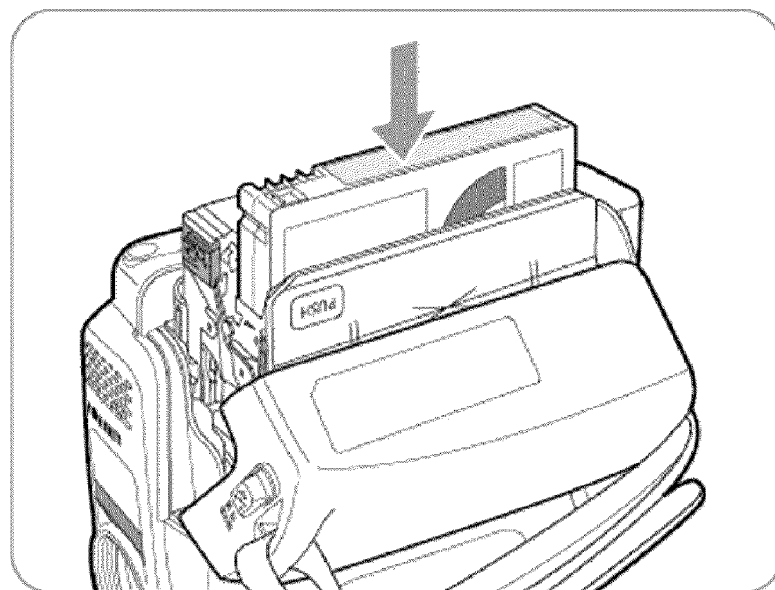
Figure 6C:
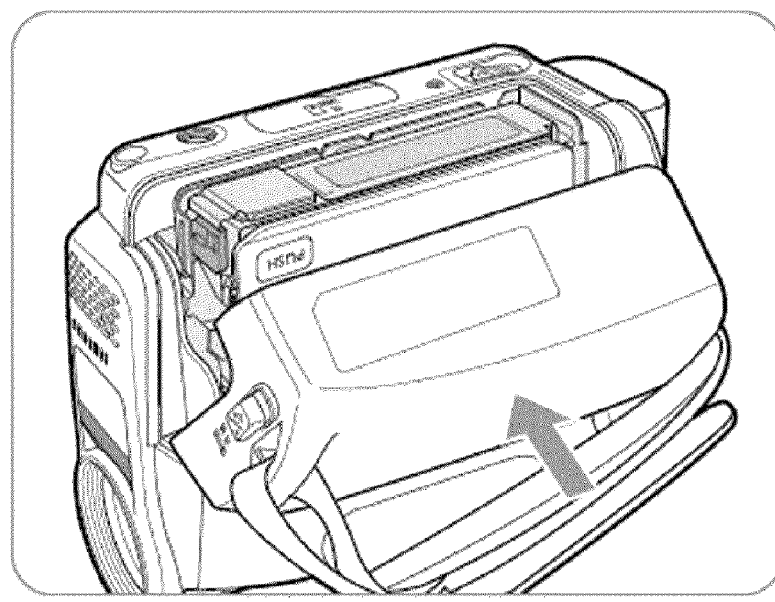

FIGS. 6A to 6C are views illustrating a method of inserting a tape into the multifunctional video apparatus using the tape ejection switch 115 of FIG. 1.

As illustrated in FIG. 6A, a user pushes the tape ejection switch 115 located on the front surface of the multifunctional video apparatus in an opposite direction to a direction of tape ejection, as indicated by an arrow, and opens the cassette door 153. In contrast, the cassette door 153 may be automatically opened depending on various circumstances. As illustrated in FIG. 6B, the user pushes a cassette holder to the inside of the multifunctional video apparatus, as indicated by an arrow, with the window part of the tape turned toward the outside. The cassette holder may be closed with a specified sound and the tape may be automatically mounted in the multifunctional video apparatus as the cassette holder is closed. Then, the cassette door 153 may be closed as illustrated in FIG. 6C.

Figure 7:
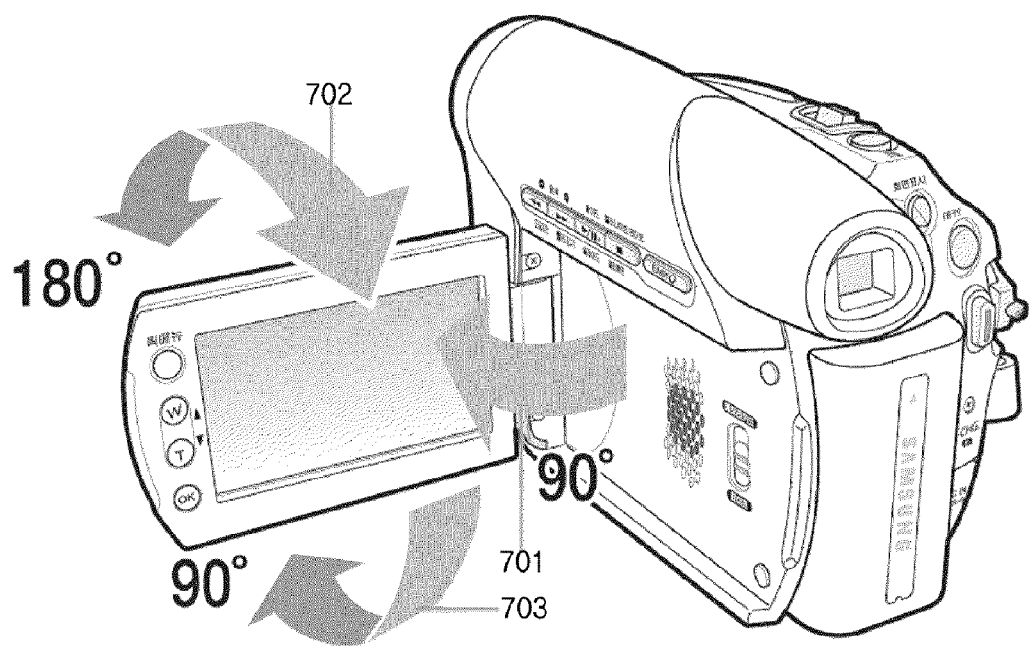

FIG. 7 is a view illustrating a method of moving the LCD panel 121 that includes the LCD screen 123 around the main body of the multifunctional video apparatus. As illustrated in FIG. 7, the LCD panel 121 is rotatively connected to the main body of the multifunctional video apparatus so that the LCD panel is opened and closed in first and second directions 701 and 702 as indicated by arrows with respect to the main body of the multifunctional video apparatus. Specifically, the LCD panel 121 is opened by 90°, starting from the left-side surface of the multifunctional video apparatus, so that the LCD screen 123 is turned toward an opposite direction to the direction which the lens 111 faces. Accordingly, the user of the multifunctional video apparatus can capture an image of an object located in front of the user. In contrast, the LCD screen 123 may be turned toward the same direction as the lens 111 to allow the user to capture his/her own image. In addition, it is also possible to rotate the LCD screen 123 so that it is turned toward the bottom of the multifunctional video apparatus. Accordingly, the user can capture the image of the object using the LCD screen 123 even if an obstacle exists between the user and the object to be captured by lifting the multifunctional video apparatus over the user's head and viewing the LCD screen 123 from underneath.

Figure 8A:
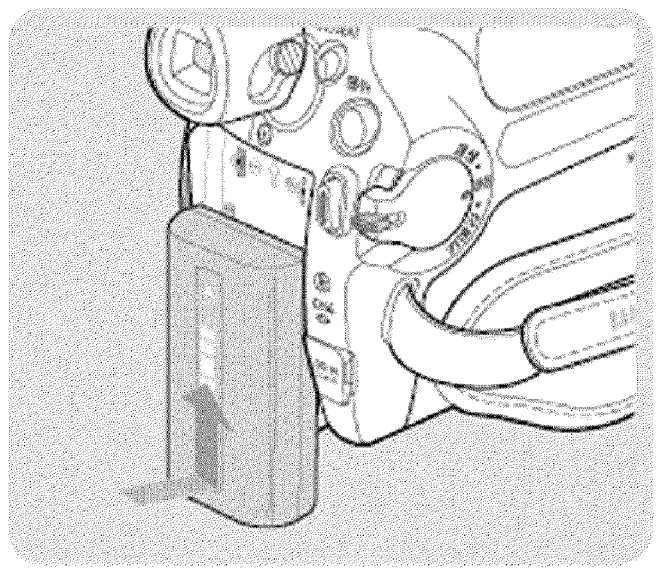
Figure 8B:
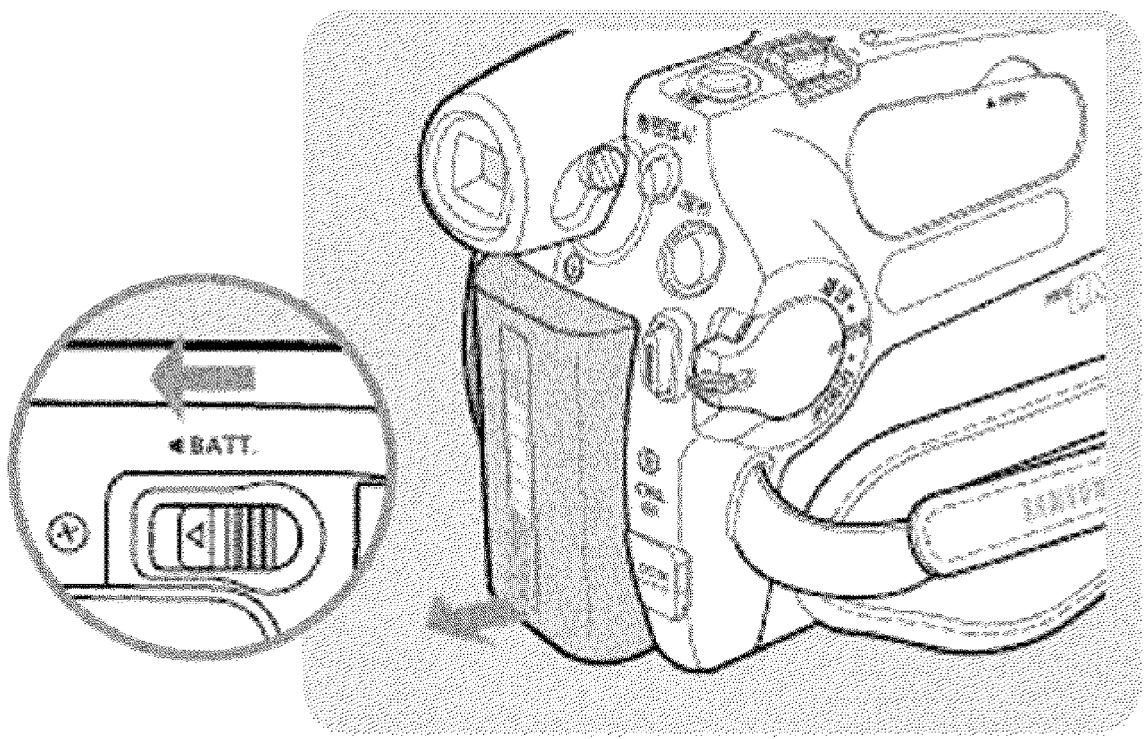

FIGS. 8A and 8B are views illustrating a method of attaching a battery pack 149 to the multifunctional video apparatus according to an embodiment of the present general inventive concept. In order to attach the battery pack 149 to the multifunctional video apparatus, as illustrated in FIG. 8A, the user inserts the battery pack 149 in a groove formed on a rear surface of the multifunctional video apparatus and pushes the battery pack 149 in a direction indicated by an arrow. In order to remove the battery pack 140 from the multifunctional video apparatus, as illustrated in FIG. 8B, the user pushes the battery packet 149 in an opposite direction to the direction of battery packet attachment as the user pushes a battery switch BATT provided on the bottom surface of the multifunctional video apparatus in a direction indicated by an arrow.

Figure 9:
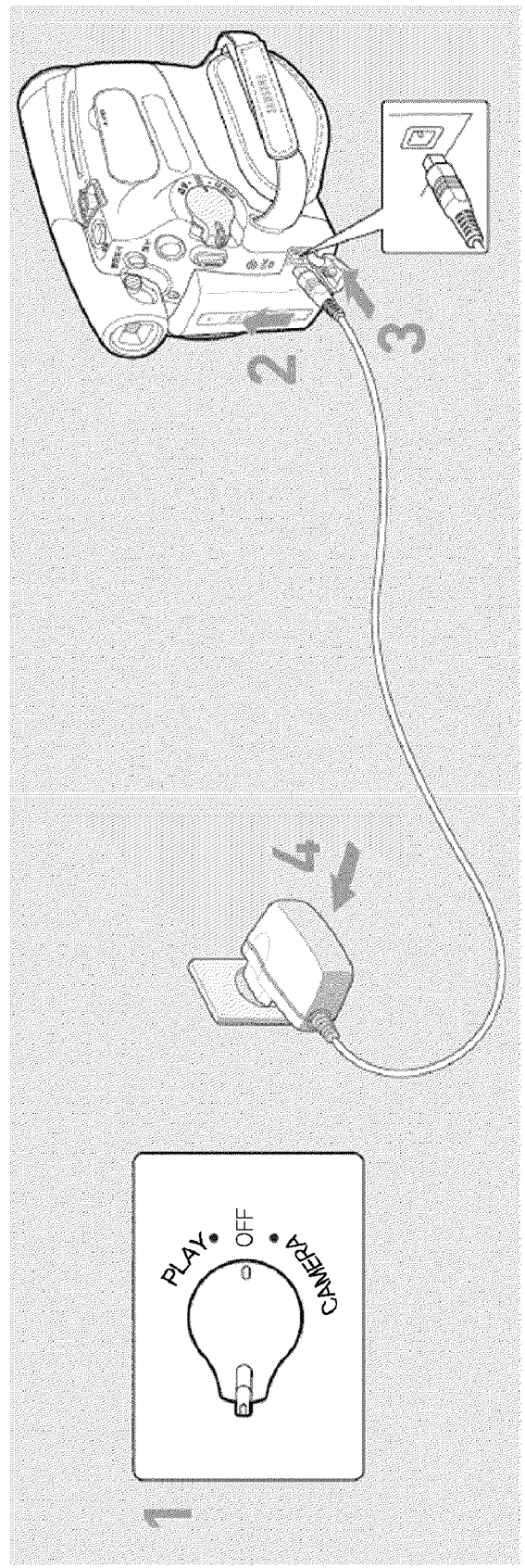

FIG. 9 is a view illustrating a method of charging the battery pack 149 using a power supply unit. The battery pack 140 mounted in the multifunctional video apparatus can be charged using the power supply unit (i.e., adapter). When charging the battery pack 149, as illustrated in FIG. 9, the user turns off the power selection switch 148, and mounts the battery pack 149 in the multifunctional video apparatus. Then, the user connects a jag of the power supply unit to a DC power terminal 150 of the multifunctional video apparatus, and connects a power connector of the power supply unit to a power outlet.

Figure 10A:
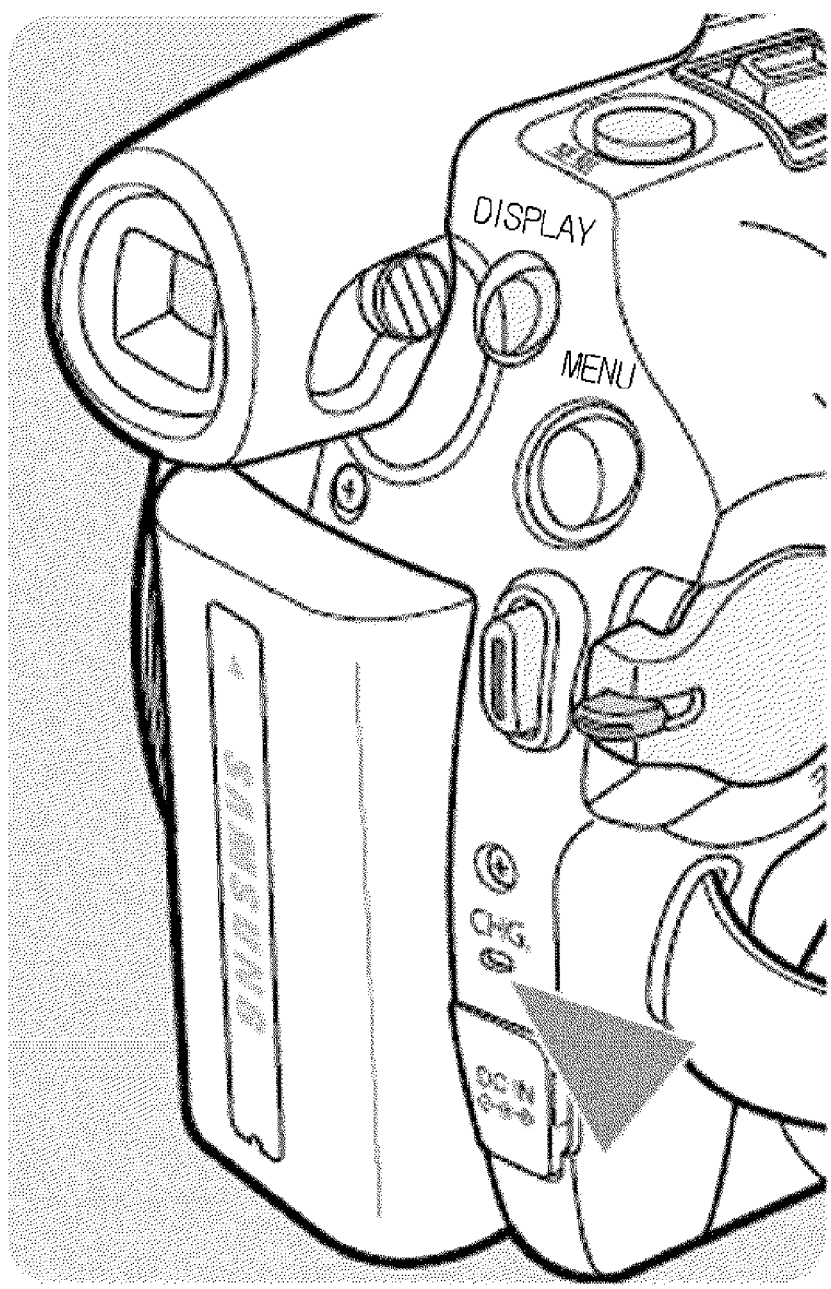
Figure 10B:
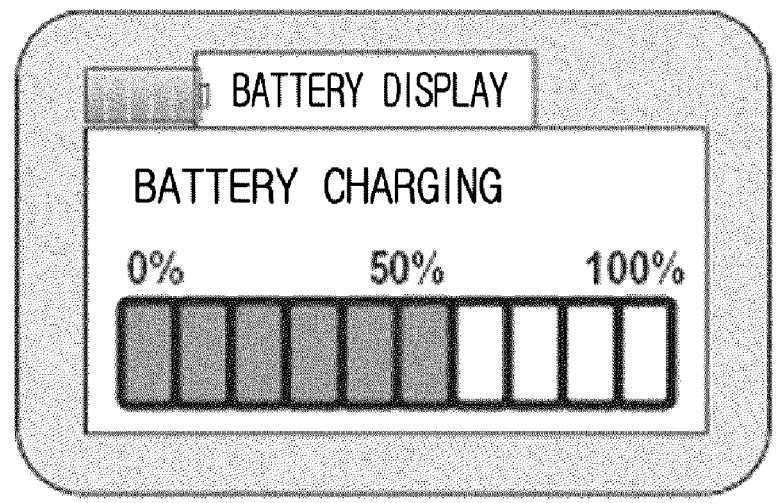
Figure 10C:
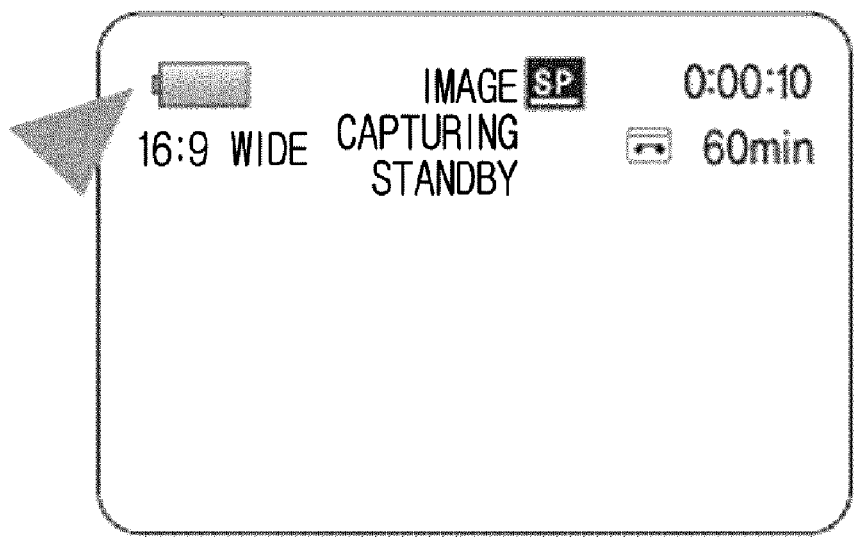

FIGS. 10A through 10C use views illustrating a charging state of the battery pack 149. The charging state of the battery pack 149 is indicated by the battery charging indicator light 162 as illustrated in FIG. 10A. When the battery pack 149 is being charged, the battery charging indicator light 162 flickers. The battery charging indicator light 162 may flicker once every second. If the flickering of the battery charging indicator light 162 becomes slower, there may be a problem with charging of the battery. If the charging is completed by more than 90%, the battery charging indicator light 162 is kept in a turned-on state. If the user desires to confirm the charging state through the LCD screen 123, the user may turn off the power of the multifunctional video apparatus and may press the screen display button 144. Accordingly, the charging state of the battery pack 149 is displayed as illustrated in FIG. 10B. Also, a residual capacity of the charged battery pack 149 can be confirmed by the battery state that is displayed on the LCD screen 123 or the viewfinder 130, as illustrated in FIG. 10C.

Figure 11:
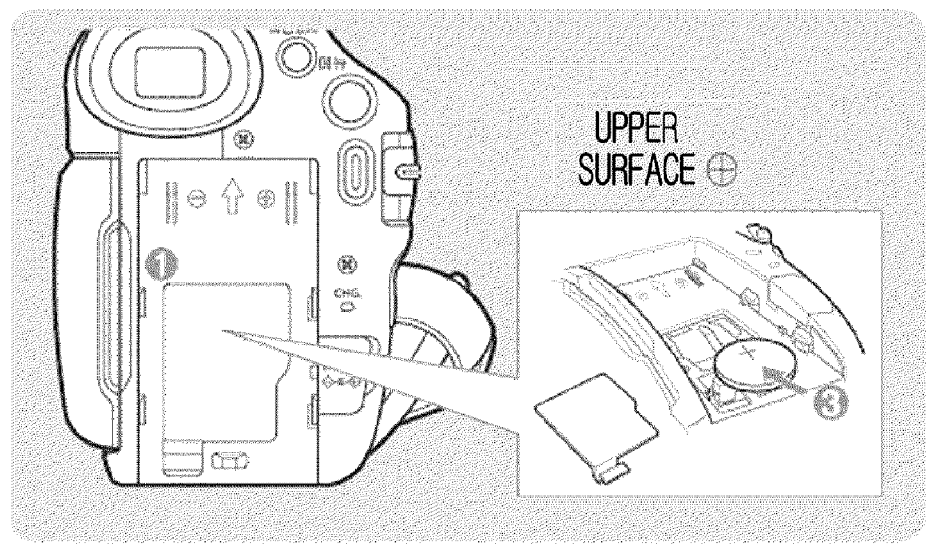

FIG. 11 is a view illustrating a method of mounting a lithium battery in the multifunctional video apparatus according to an embodiment of the present general inventive concept. In order to mount the lithium battery in the multifunctional video apparatus, the user must first check whether the battery pack 149 is mounted on the rear surface of the multifunctional video apparatus. If the battery pack 149 is mounted, the user removes the battery pack 149 from the multifunctional video apparatus. Then, as illustrated in FIG. 11, the user opens a lithium battery holder 161, inserts the lithium battery into the holder with a positive (+) pole of the lithium battery facing upward, and then closes the lithium battery holder 161.

Figure 12A:
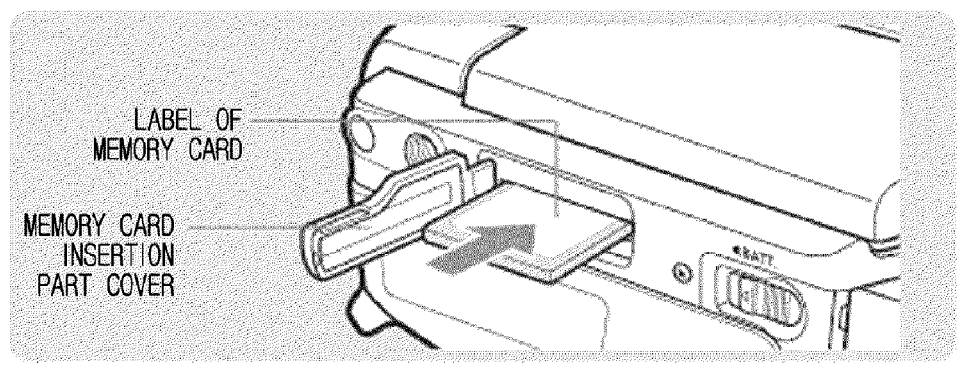
Figure 12B:
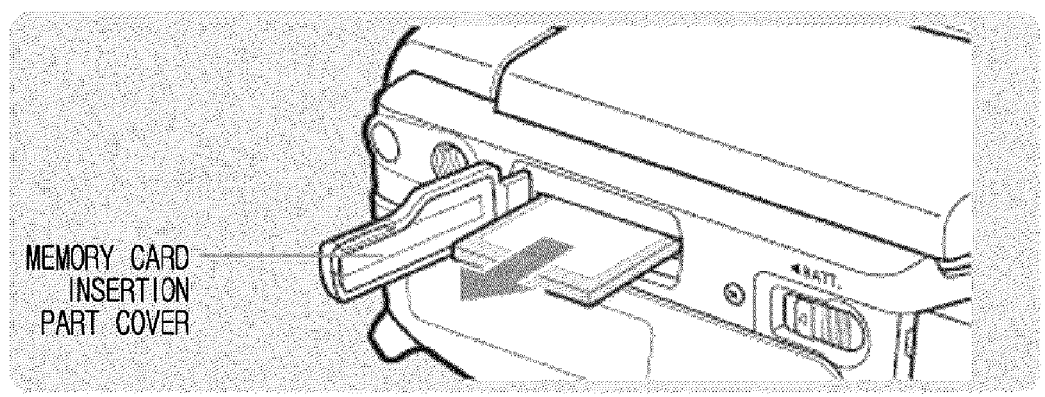

FIGS. 12A and 12B are views illustrating a method of inserting a memory card into the multifunctional video apparatus and removing the memory card from the multifunctional video apparatus according to an embodiment of the present general inventive concept. As illustrated in FIG. 12A, a user can insert a memory card into a memory card slot in a direction as indicated by an arrow after opening a memory card slot cover. When the memory card is inserted, a slant corner of the memory card may face rearward. When removing the memory card from the multifunctional video apparatus, as illustrated in FIG. 12B, a user slightly pushes an end part of the memory card, and the memory card is automatically ejected out of the multifunctional video apparatus. Then, the user completely takes the memory card out of the multifunctional video apparatus, and then closes the memory card slot cover.

Next, a method of a screen display on the LCD screen 123 according to a mode of the multifunctional video apparatus will be described. The screen display may include a display of icons corresponding to specified functions, expressions related to specified functions, numerals, etc. The screen display may differ according to various modes of the multifunctional video apparatus according to an embodiment of the present general inventive concept.

Figure 13:
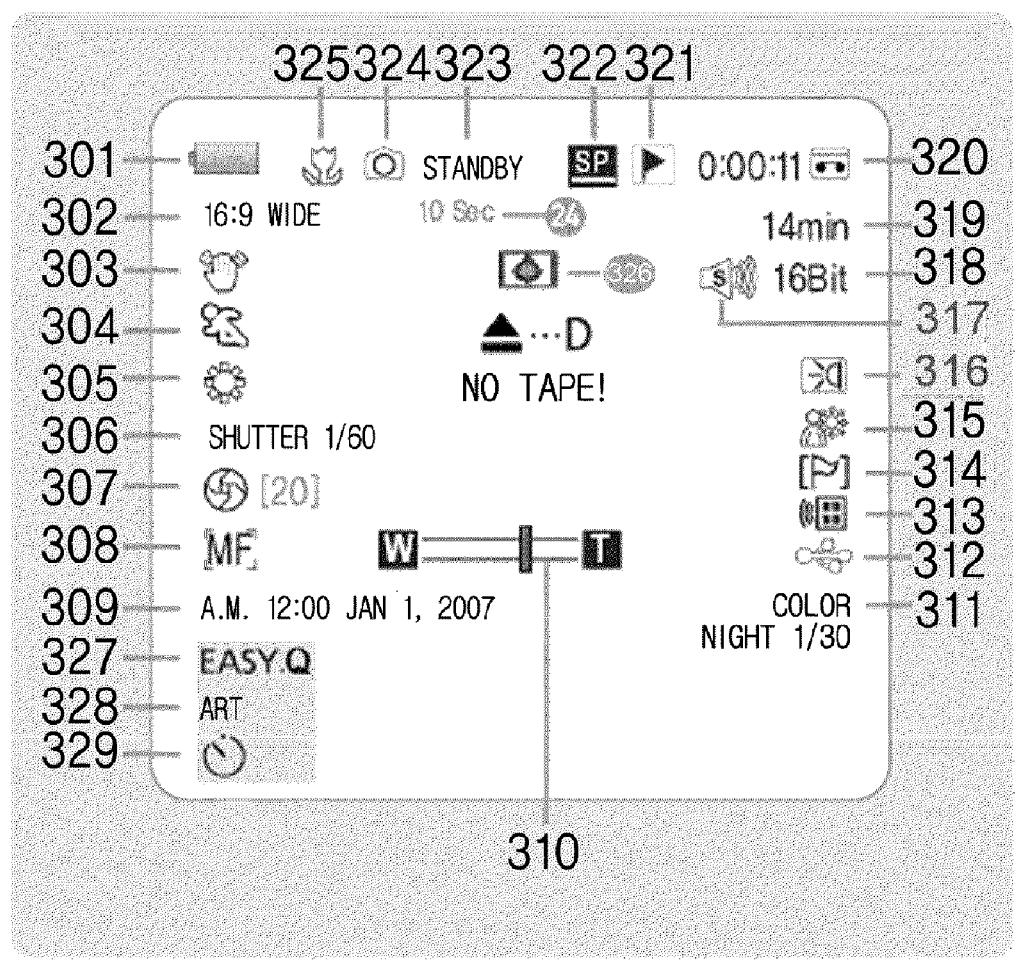
FIGS. 13 to 17 are views illustrating screens provided in respective modes of the multifunctional video apparatus according to an exemplary embodiment of the present general inventive concept.

FIG. 13 is a view illustrating a screen display that can be displayed on the LCD screen 123 if the mode of the multifunctional video apparatus is a tape camera mode. During the a tape camera mode, the screen display includes displays of a battery state 301, 16:9 aspect ratio 302, hand-shake correction 303, auto exposure 304, selection of color tone 305, shutter 306, exposure 307, manual focus 308, date/time 309, zoom 310, color night 311, USB connection 312, remote control setup 313, wind sound removing function 314, backlight correction 315, flash 316, real stereo 317, voice mode function 318, residual quantity of tape 319, tape counter 320, zero-point memory 321, recording mode 322, operation display 323, photo image capture 324, delayed image capture, macro 325, dew condensation indicator 326, Easy.Q 327, image effect 328, and photo image capture 329.

Figure 14:
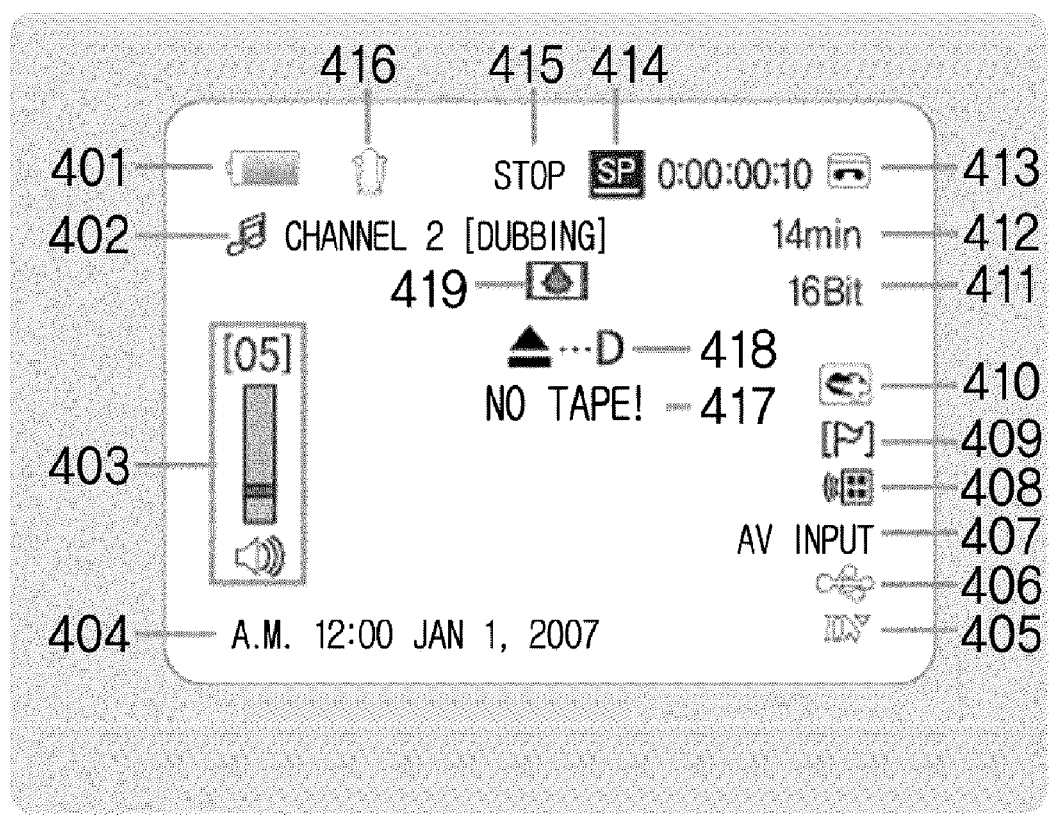

FIG. 14 is a view illustrating a screen display that can be displayed on the LCD screen 123 if the mode of the multifunctional video apparatus is a tape reproduction mode. During the tape reproduction mode, the screen display includes displays of a battery state 401, a voice selection 402, a voice display 403, a date/time 404, a DV connection 405, a USB connection 406, an AV input/output display 407, a remote control setup 408, a wind sound removing function 409, a voice plus (Voice+) 410, a voice mode function 411, a residual quantity of tape 412, a time code 413, a recording mode (SP/LP) 414, an operation 415, an audio dubbing 416, a notice and report 417, a notice 418, and a dew condensation indicator 419.

Figure 15:
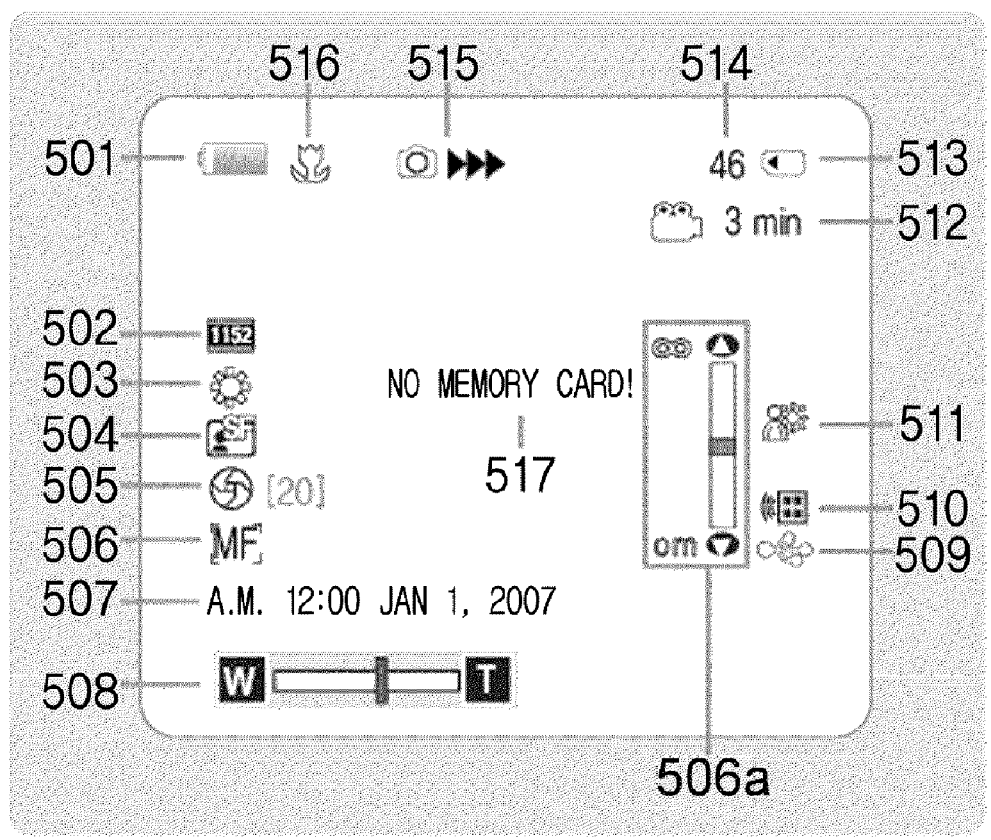

FIG. 15 is a view illustrating a screen display that can be displayed on the LCD screen 123 if the mode of the multifunctional video apparatus is a memory card camera mode. During the a memory card camera mode, the screen display includes displays of a battery state 501, photo size 502, selection of color tone 503, still-image quality 504, exposure 505, manual focus 506, manual focus calibrator 506a, date/time 507, zoom 508, USB connection 509, remote control setup 510, backlight correction 511, MPEG4 residual quantity 512, storage memory 513, a number of possible still-image captures 514, operation 515, macro 516, and notice and report 517.

Figure 16:
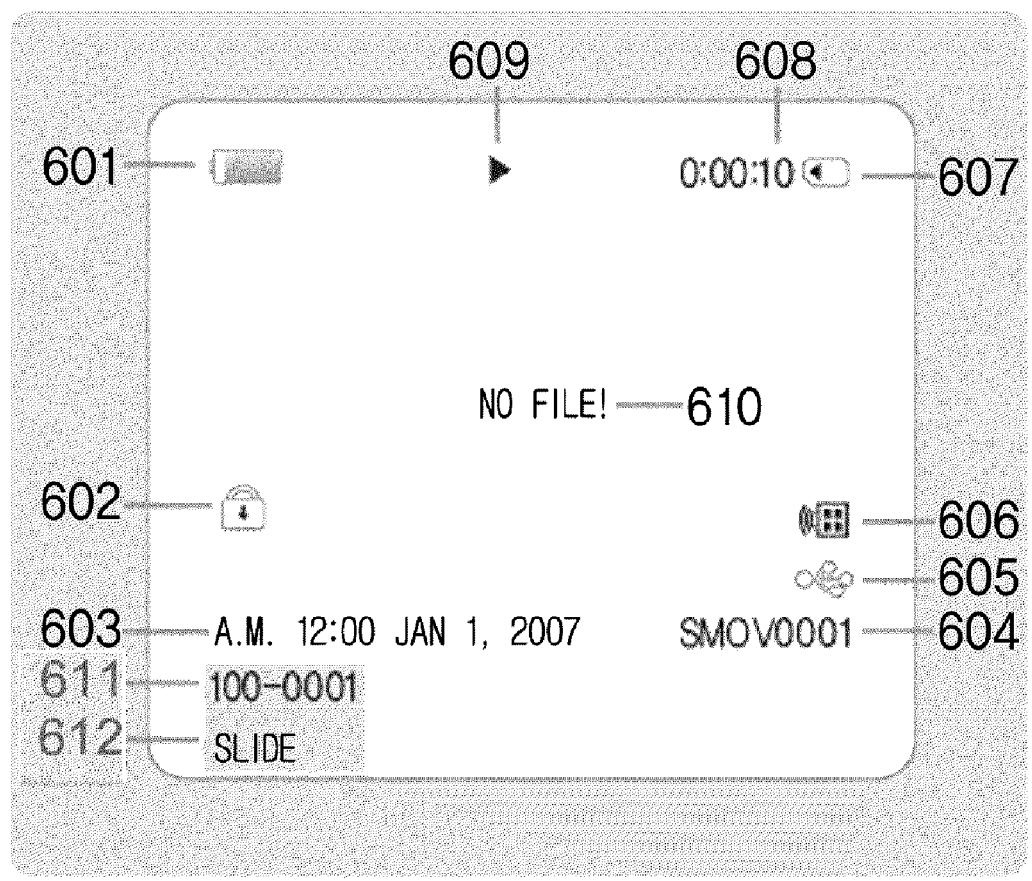

FIG. 16 is a view illustrating a screen display that can be displayed on the LCD screen 123 if the mode of the multifunctional video apparatus is a memory card reproduction mode. During the memory card reproduction mode, the screen display includes displays of a battery state 601, erase prevention 602, date/time 603, MPEG4 reproduction file 604, USB connection 605, remote control setup 606, storage memory 607, MPEG4 reproduction counter 608, operation 609, notice and report 610, folder/file number 611, and slide 612.

Figure 17:
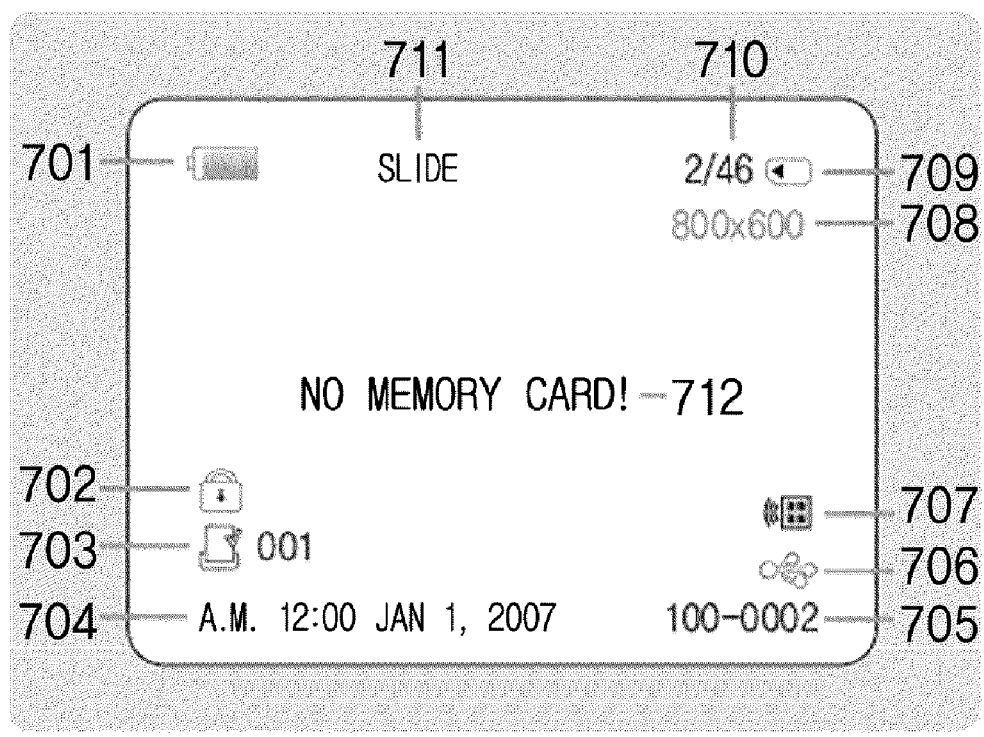

FIG. 17 is a view illustrating a screen display that can be displayed on the LCD screen 123 if the mode of the multifunctional video apparatus is a still image reproduction mode. The still image reproduction mode is a type of memory tape reproduction mode, and particularly a mode to reproduce a still image stored in a memory card. During the still image reproduction mode, the screen display includes displays of a battery state 701, an erase prevention 702, a print mark 703, a date/time 704, a folder/file number 705, a USB connection 706, a remote control setup 707, a photo size 708, a storage memory 709, a presently reproduced file number/the total number of still image files 710, a slide 711, and a notice and report 712. The above respective screen displays of FIGS. 13 through 17 will be described in detail when various functions of the multifunctional video apparatus are described later.

Hereinafter, a method of setting an initial environment of the multifunctional video apparatus will be described in detail. The initial environment setting function is a function set when the multifunctional video apparatus is initially used, and the initial environment setting function may be applied to all modes of the multifunctional video apparatus.

To avoid describing each potential camera mode, a tape camera mode (i.e., the mode indicated by "camera mode" in FIG. 18) will be described in detail. However, as described above, the initial environment setting function can be applied to all modes of the multifunctional video apparatus according to an embodiment of the present general inventive concept.

Figure 18:
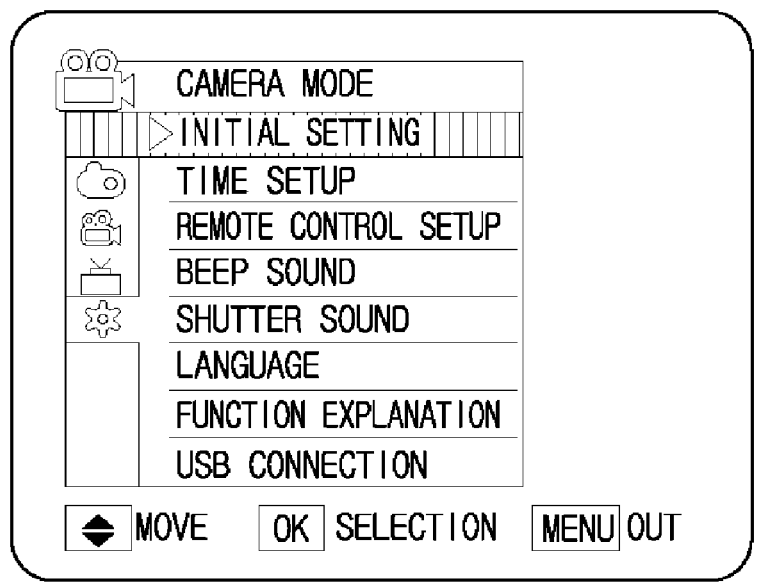
FIGS. 18 to 25 are views illustrating user interfaces (UI) related to initial environment setting functions of the multifunctional video apparatus according to an exemplary embodiment of the present general inventive concept.

FIG. 18 is a view illustrating menu items of the initial environment setting function. As illustrated in FIG. 18, the initial environment setting function includes functions of time setup to change a date and time set in the multifunctional video apparatus, remote control setup to operate the multifunctional video apparatus through a remote controller, beep sound capable of turning on and/or off a sound effect occurring when the multifunctional video apparatus operates, that is, the power is turned on, or the menu button 145 is pushed, shutter sound capable of turning on and/or off a sound effect when the still image (i.e., photo) button 142 is pushed (this function can be applied only to the tape camera mode, the tape reproduction mode, and the memory tape camera mode), language to set a the language being displayed on the screen to a specified language (e.g., Korean), function explanation capable of displaying in advance representative functions of the multifunctional video apparatus according to an embodiment of the present general inventive concept (this function can be applied only to the camera mode, and is performed when no tape is mounted in the multifunctional video apparatus), and USB connection capable of transmitting a still image or a moving image stored in the memory card to a PC through a USB connection without any separate equipment (this function can be applied only to the memory reproduction mode).

Figure 19A:
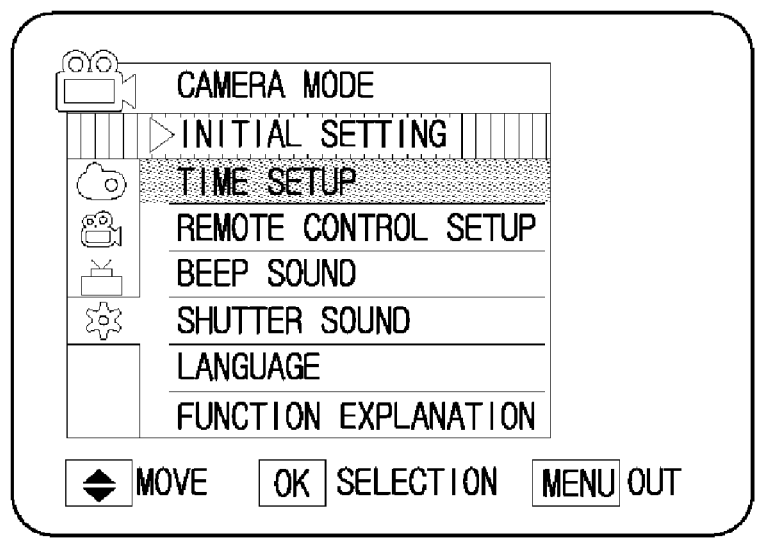
Figure 19B:
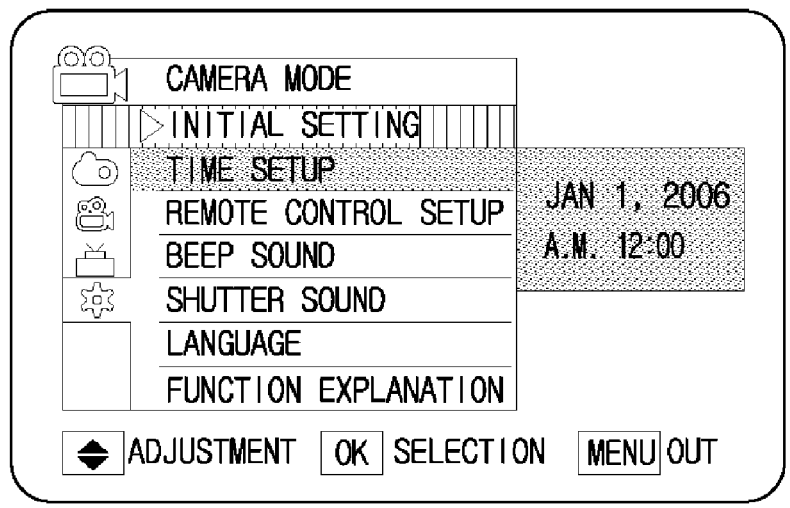
Figure 19C:
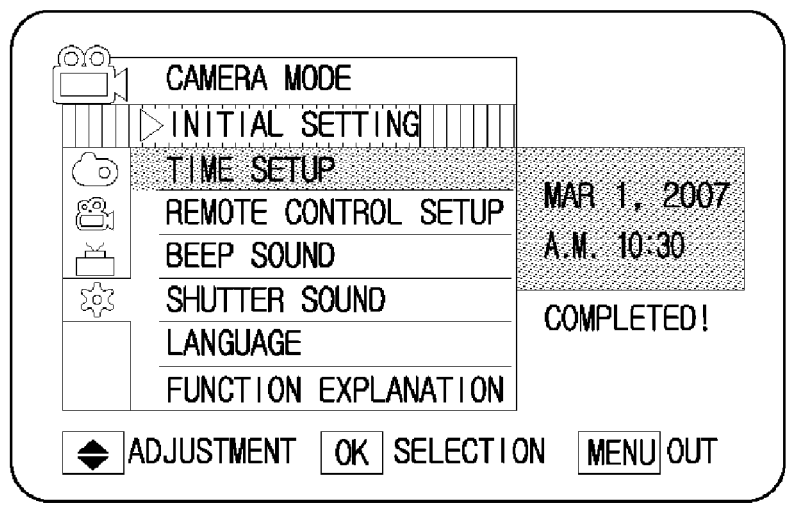

FIGS. 19A to 19C are views illustrating a time setting function included in the initial environment setting function. If the user pushes the menu button 145, a menu screen is displayed on the LCD screen 123. Accordingly, the user may move a cursor to an item "Initial Setup" using the up/down button 125, and then may push the confirmation button 126. When the confirmation button 126 is pressed, a menu corresponding to the initial setup is displayed on the LCD screen as illustrated in FIG. 19A. The user may then move the cursor to an item "Time Setup" using the up/down button 125, and then may again push the confirmation button 126.

When the confirmation button 126 is pushed, sub-items of "Year," "Month," "Day," "Time (a.m./p.m.)," and "Minute" are displayed as illustrated in FIG. 19B. The user then sets the time using the up/down button 125 and the confirmation button 126. For example, if "2006" is displayed as the sub-item "Year," the user may change it to "2007" using the up/down button 126, and then may push the confirmation button 126. Accordingly, the sub-item "Year" is set to "2007." In the same manner, the user sets the time, and then pushes the menu button 145 to terminate the time setting function.

Figure 20:
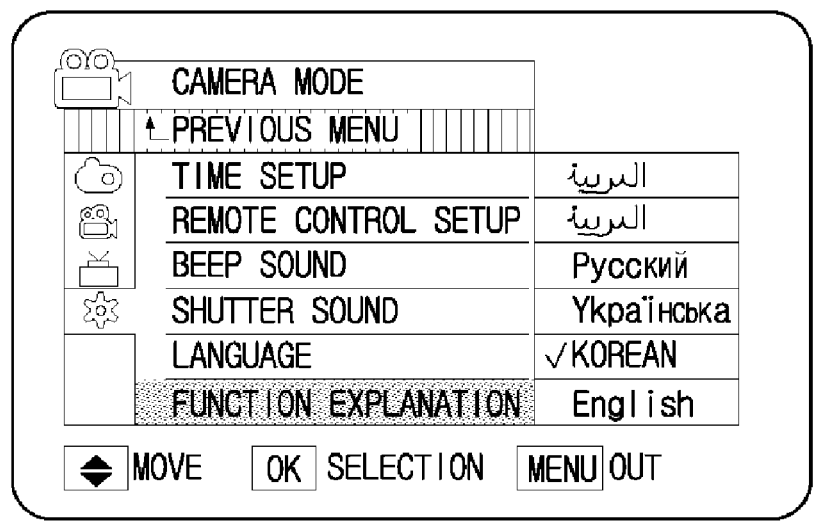

FIG. 20 is a view illustrating a language setting function. The process of selecting a menu item "Language" from a menu screen is similar to the process of selecting the "Time Setup" menu item as illustrated in FIGS. 19A to 19C. If the user moves the cursor to the item "Language" using the up/down button 125 and then pushes the confirmation button 126, several kinds of languages, which are sub-items of the item "Language," are displayed as illustrated in FIG. 20. The user can select one of the displayed languages using the up/down button 125. For example, if the user intends to select "Korean," the user moves the cursor to the sub-item "Korean" using the up/down button 125, and then pushes the confirmation button 126. Then, the language that is displayed on the LCD screen 123 is set to "Korean."

Figure 21:
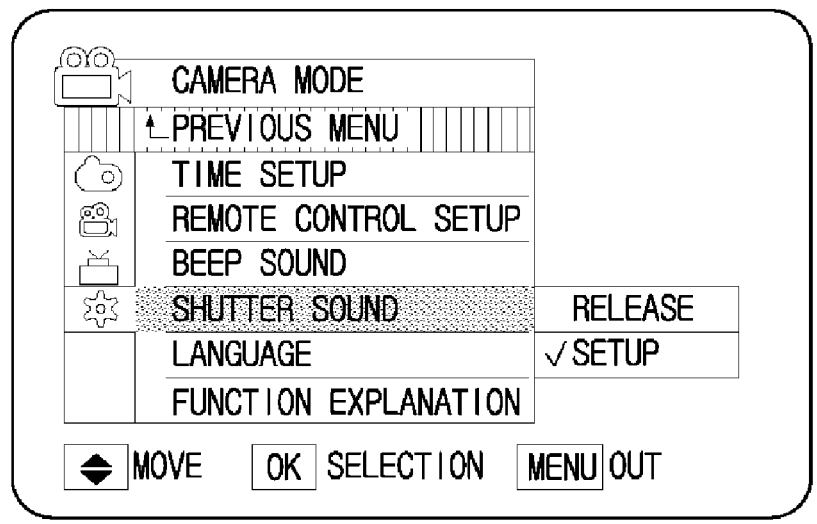

FIG. 21 is a view illustrating a shutter sound setting function. The user selects the item "Initial Setup" from the menu screen and then selects the item "Shutter Sound" included in the menu item "Initial Setup." Then, the user selects a sub-item "Release" or "Set" of the menu item "Shutter Sound" using the up/down button 125 and the confirmation button 126. FIG. 21 illustrates that "Setup" has been selected. Setup of other functions included in the initial environment setting function, such as a remote control setting function, a beep sound setting function, etc., is identical to the setup of the shutter sound function.

Figure 22A:
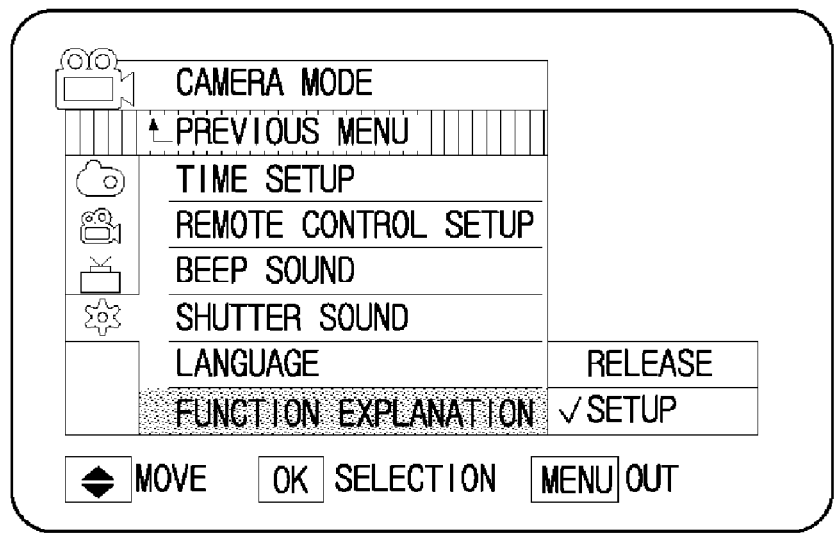
Figure 22B:
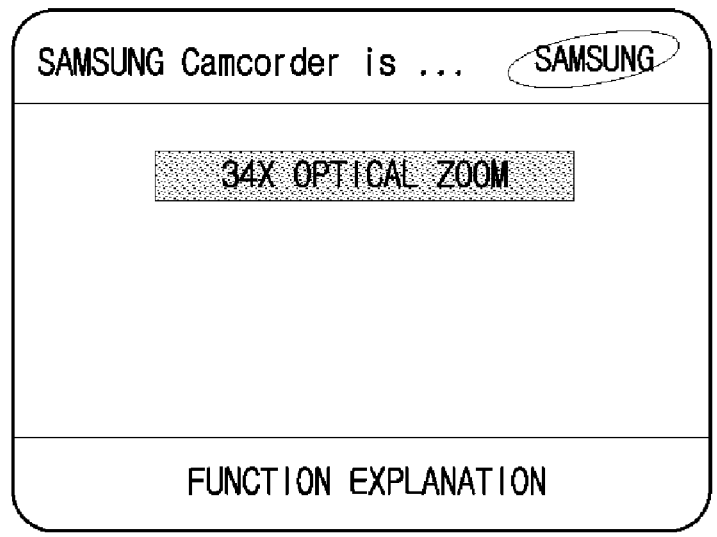

FIGS. 22A and 22B are views illustrating a function explanation function. If an item "Setup" of the function explanation function is selected as illustrated in FIG. 22A, the user pushes the menu button 145 to display the function explanation on the LCD screen 123. The function explanation is a function displaying representative functions of the multifunctional video apparatus such as a digital zoom, hand-shaking correction, still image capturing, etc., on the LCD screen 123 in the form of a slide show. FIG. 22B is a view illustrating the digital zoom function that is one of the above-described functions of the multifunctional video apparatus according to an embodiment of the present general inventive concept. The user can stop the display of the function explanation by pushing the menu button 145. The function explanation is made only when no tape is mounted in the multifunctional video apparatus in a tape camera mode.

Figure 23:
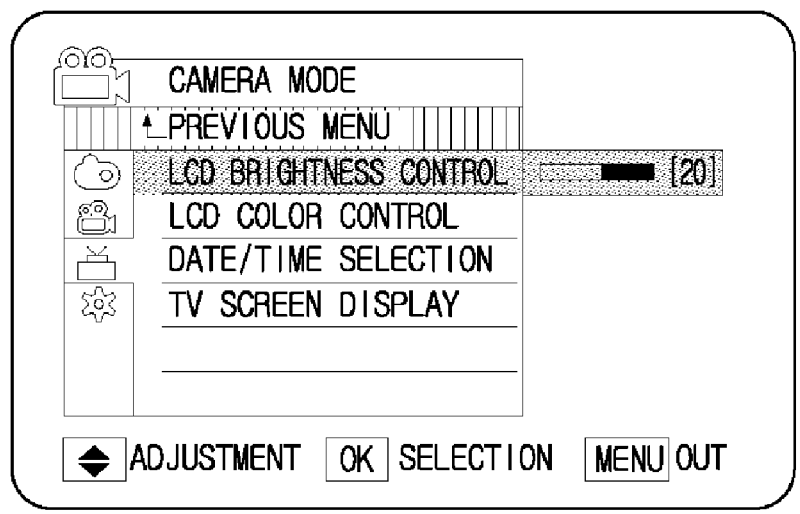

FIG. 23 is a view illustrating a brightness control function. In order to control the brightness of the LCD screen, the user pushes the menu button 145, shifts the menu item to "Screen Setup" using the up/down button 125, and if the cursor on the item "Screen Setup" flickers, the user pushes the confirmation button 126. Then, the user moves the cursor to the item "LCD Brightness Control" using the up/down button 125, and then pushes the confirmation button 126. Accordingly, as illustrated in FIG. 23, a brightness control state bar is displayed. The user controls the brightness state of the LCD screen using the up/down button 125, and then pushes the confirmation button 126. The color control of the LCD screen 125 can be performed in the same manner as the brightness control of the LCD screen 123.

Figure 24A:
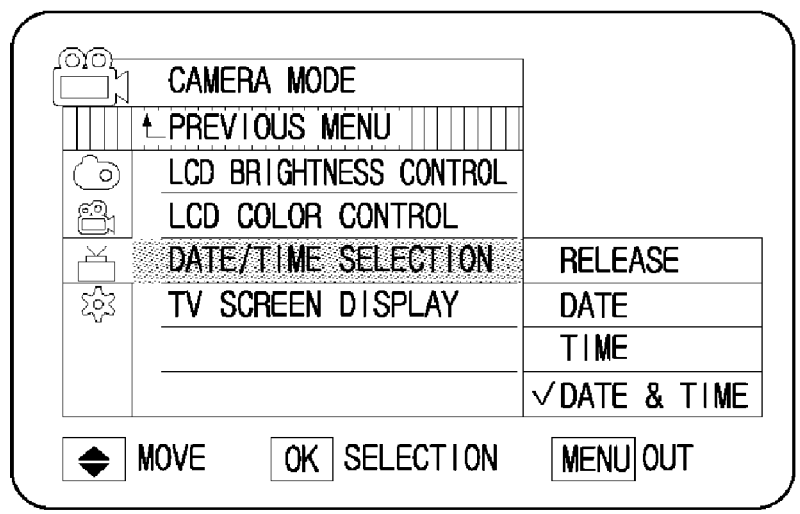
Figure 24B:
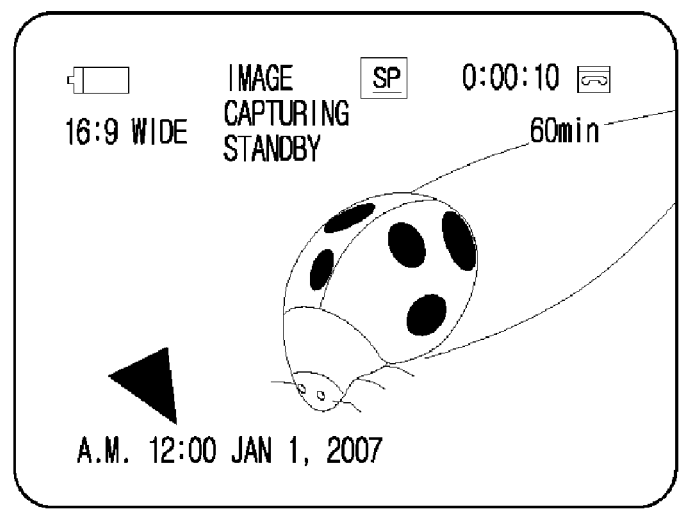

In contrast, FIGS. 24A and 24B are views illustrating whether to display the date/time. In order to make the date and/or time be displayed or be not displayed on the LCD screen, the user moves the cursor to "Screen Setup" and then pushes the confirmation button 126. Then, the user moves the cursor to "Date/Time Selection" in the menu item using the up/down button 125, and then pushes the confirmation button 126. In the menu item "Date/Time Selection," as illustrated in FIG. 24A, sub-items "Release" to display no date and/or time on the LCD screen 123, "Date" to display only the date on the LCD screen 123, "Time" to display only the time on the LCD screen 123, and "Date and Time" to display the date and time on the LCD screen 123 are displayed on the LCD screen 123. In order to display the data and the time on the LCD screen 123, the user moves the cursor to "Date/Time" using the up/down button 125, and pushes the confirmation button 126. Thereafter, if the user terminates the setup by pressing the menu button 145, a date/time display part 319 is displayed at a lower end of the LCD screen.

Figure 25:
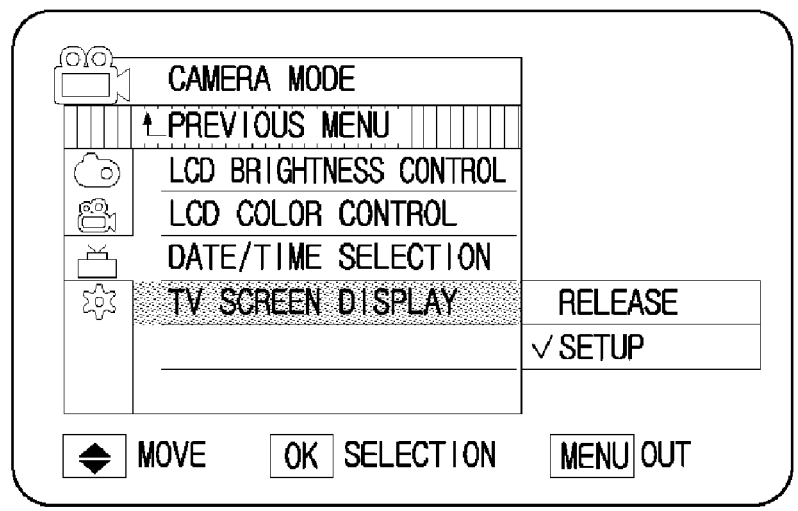

FIG. 25 is a view illustrating a method of setting a screen display on a television (TV) screen. The user moves the cursor to a menu item "Screen Setup," and then pushes the confirmation button 126. Then, the user moves the cursor to "TV Screen Display" using the up/down button 125, and then pushes the confirmation button 126. Accordingly, as illustrated in FIG. 25, a sub-item "Release" to display no screen display on a TV screen and a sub-item "Setup" to display a screen display on a TV screen are displayed on one side of the item "TV Screen Display." Then, the user selects either "Release" or "Setup" using the up/down button 125, pushes the confirmation button 126, and then pushes the menu button 145 to terminate the setup operation.

Hereinafter, a method of capturing or reproducing an image through a user's manipulation of buttons provided in the main body of the multifunctional video apparatus, rather than using menu items, will be described in detail.

Figure 26A:
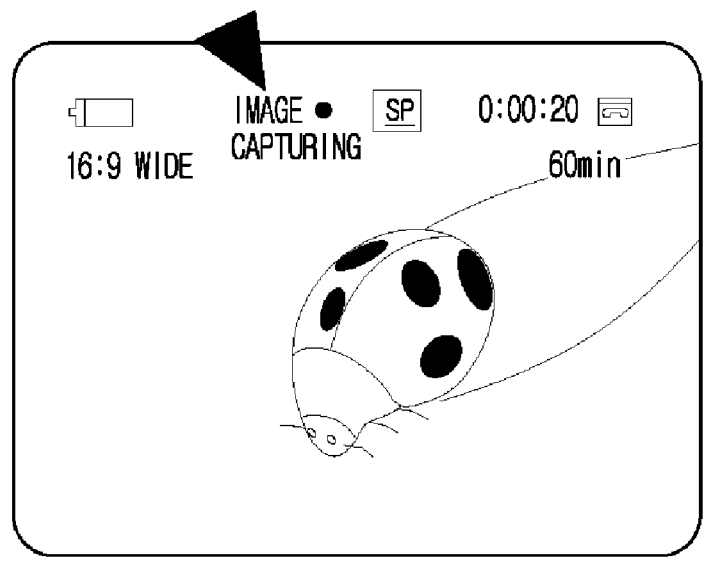
FIGS. 26A to 32 are views illustrating user interfaces (UI) related to a method of capturing or reproducing an image using a button of the multifunctional video apparatus according to an exemplary embodiment of the present general inventive concept.
Figure 26B:
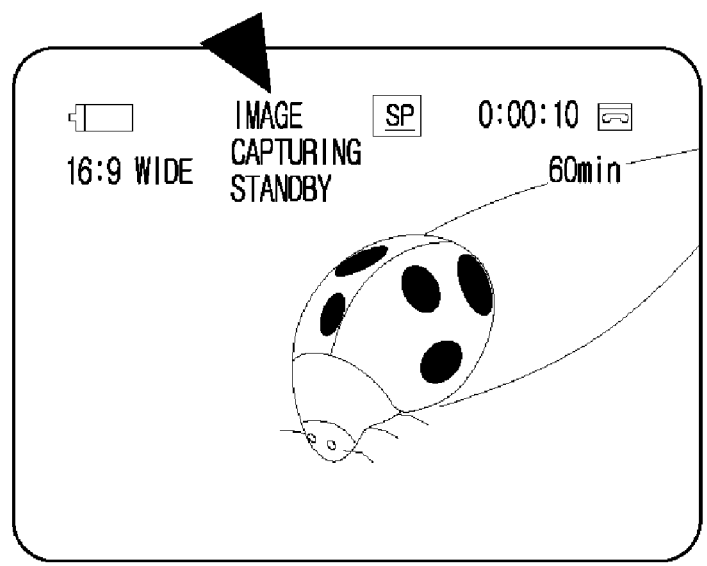
Figure 26C:
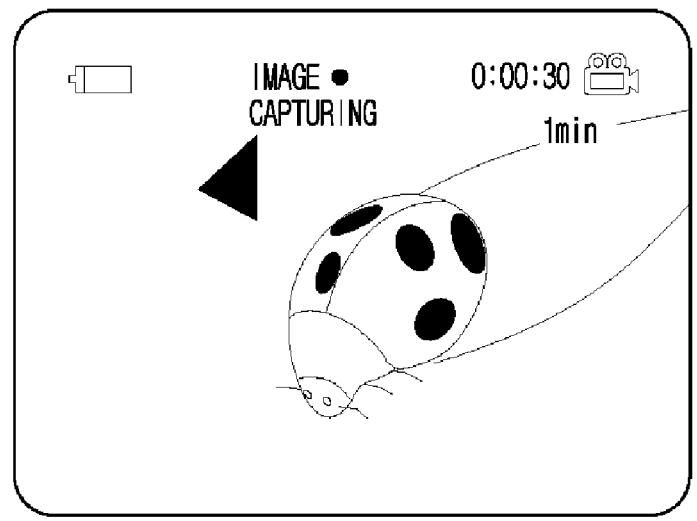

FIGS. 26A to 26C are views illustrating a method of capturing a moving image. Specifically, FIGS. 26A and 26B are views related to a recording of the captured moving image on a tape, and FIG. 26C is a view related to a recording of the captured image on a memory card.

The user captures a moving image by pushing an image capturing start/stop button 146. When recording the moving image on the tape, as illustrated in FIG. 26A, "Image Capturing," which is a kind of an operation display part 323, is displayed on the LCD screen 123, and a tape counter starts its operation. In contrast, the user pushes the image capturing start/stop button 146 if the user intends to stop the image capturing. Accordingly, as illustrated in FIG. 26B, the image capturing is stopped, and "Image Capturing Standby," which is a type of the operation display part 323, is displayed on the LCD screen. The image capturing standby state is a state in which image capturing of an object through a lens is performed, but the captured image is not stored in the recording medium, e.g., on the tape. Accordingly, if a predetermined time (e.g., five minutes) elapses, the power may be automatically turned off. Also, the user turns on the power by pushing the image capturing start/stop button 146. The power selection switch 148 may be set to "Turn Off" after the image capturing is completed to prevent power of the battery pack 149 from being consumed.

In contrast, when recording the captured moving image in a memory card, as illustrated in FIG. 26C, a time code is operated on the CRT screen 123, and "Image Capturing" is displayed. The user can stop the recording of the moving image by pushing the image capturing start/stop button 146 once more.

Further in certain, when the user intends to directly confirm the captured image recorded on the tape, the user may change the present state of the multifunctional video apparatus to an image capturing standby state by pushing the image capturing start/stop button 146. In order to reproduce the captured image in a reverse direction, the user pushes the rewind (RW) button 122-1. If the RW button is slightly pushed and then released, the image is reproduced in reverse direction during a specified time (e.g., a duration of about three seconds), and then is reproduced in a forward direction to return to the original position. If the fast forward (FF) button 122-2 is pressed, the image is reproduced in forward direction, and if the user intends to capture an image, the user pushes the image capturing start/stop button 146 again.

Figure 27A:
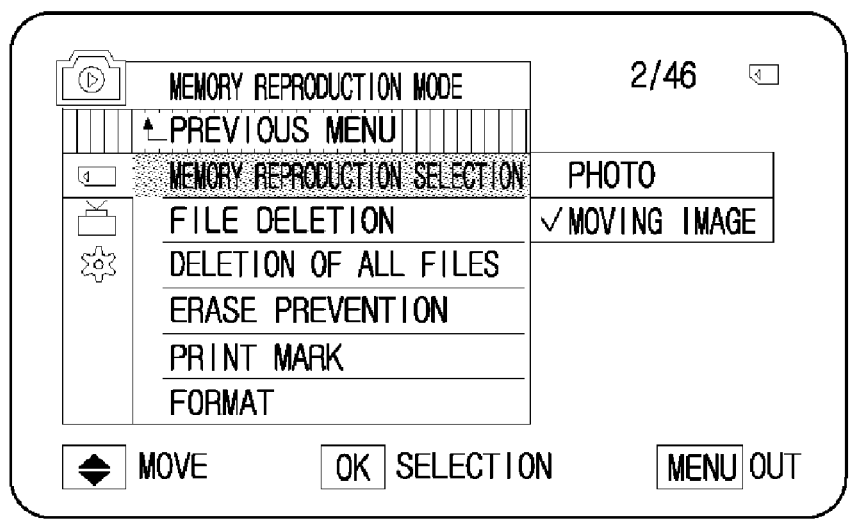
Figure 27B:
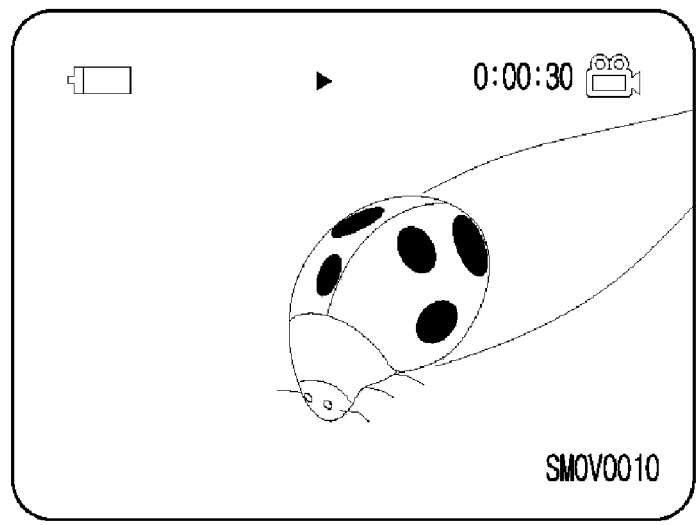

A method of reproducing a moving image recorded in a memory card will be described with reference to FIGS. 27A and 27B. First, the user changes the mode of the multifunctional video apparatus according to an embodiment of the present general inventive concept to a memory card reproduction mode (e.g., "Memory Reproduction Mode" as illustrated in FIG. 27A). Then, if the user selects a menu item "Memory Setup" and selects "Memory Reproduction Selection" that is a sub-item of "Memory Setup," as illustrated in FIG. 27A, sub-items "Photo" and "Moving Image" of "Memory Reproduction Selection" are displayed on the LCD screen 123. The user then selects either of them using the up/down button 125 and the confirmation button 126, and then terminates "Memory Reproduction Selection" by using the menu button 145. The user then searches to find the moving image to be reproduced using the "Previous" or "Next" button, and if the moving image to be reproduced is displayed on the LCD screen 123, the user reproduces the moving image by pushing the play/pause button, as illustrated in FIG. 27B.

Figure 28:
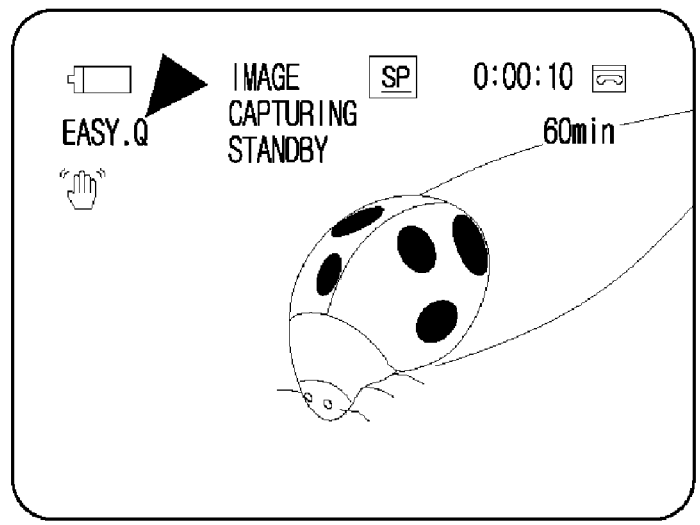

FIG. 28 is a view illustrating a method of setting an Easy.Q mode of the multifunctional video apparatus according to an embodiment of the present general inventive concept. The Easy.Q mode is a mode in which image capturing functions of the multifunctional video apparatus such as focus, exposure, color tone, and hand-shake correction are automatically controlled according to a particular object to be captured and image capturing circumstances. The user changes the mode of the multifunctional video apparatus to a tape camera mode. If the user pushes the Easy.Q button 122-5, as illustrated in FIG. 28, an Easy.Q mark 327 and a hand-shake compensation mark 323 are displayed on the LCD screen 123. Accordingly, the user can capture the image by pushing the image capturing start/stop button 146. If the user pushes the Easy.Q button 122-5 once more, the Easy.Q mode is released.

Figure 29A:
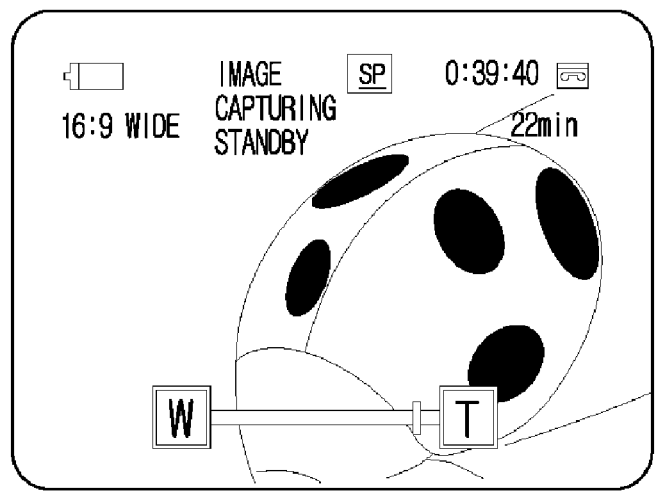
Figure 29B:
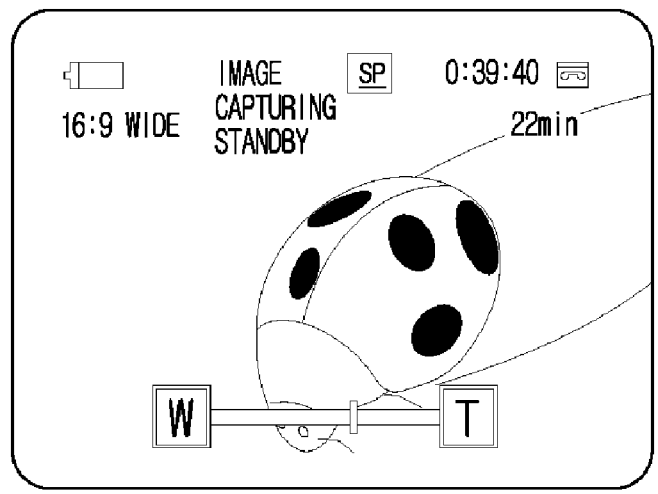
Figure 29C:
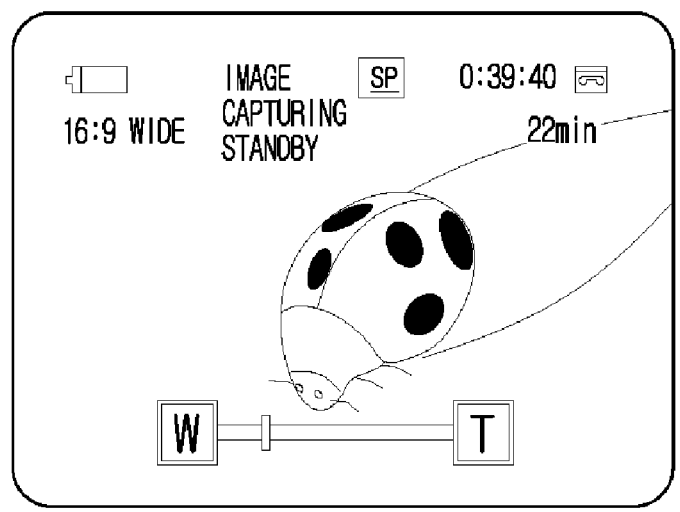

FIGS. 29A to 29C are views illustrating images captured by a zoom-in/zoom-out function. As illustrated in FIG. 29A, the zoom-in function is a function of capturing an image of a captured object to be gradually enlarged, and the user can perform the zoom-in function by pushing a zoom lever 141 in a direction "T" or pushing a down (▼) button. FIG. 29B illustrates an image captured without using the zoom-in function, and FIG. 20C illustrates an image captured using the zoom-out function.

Figure 30A:
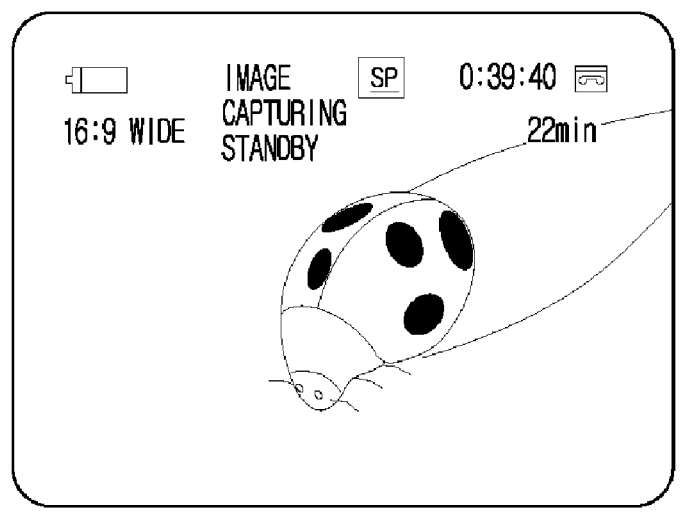
Figure 30B:
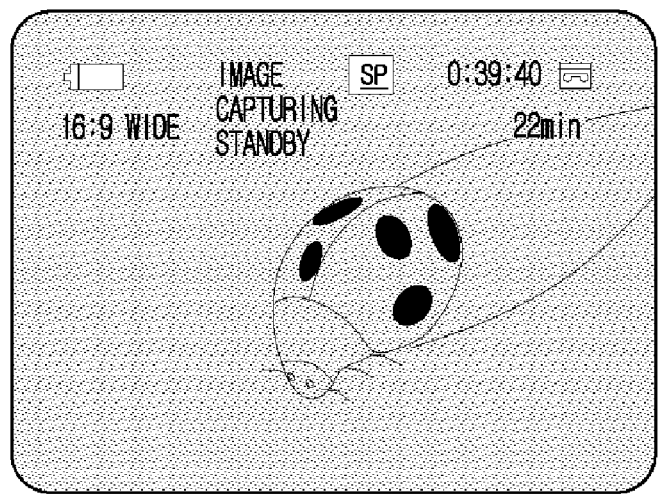
Figure 30C:
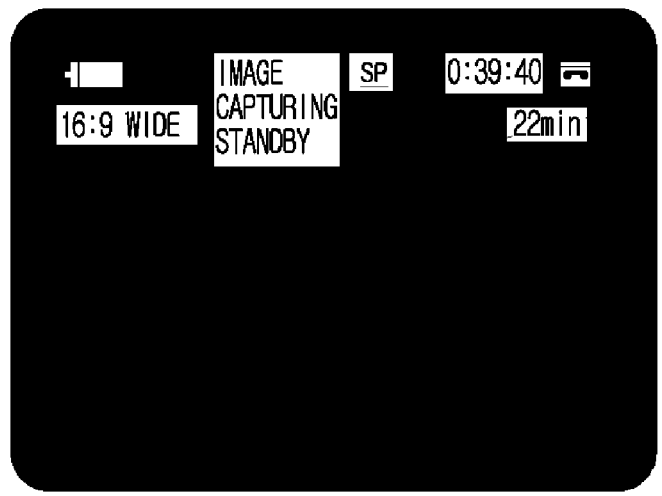

FIGS. 30A to 30C are views illustrating images captured by a fade-in/out function. The fade-in/out function is a function which provides fade-in/fade-out effects to the captured image by smoothly connecting start or end portions or scene-changing portions of the image during the image capturing operation. As illustrated in FIG. 30A, if the user pushes the fade button 122-4 to perform the fade-out function, the image being displayed on the LCD screen 123 gradually becomes dark while the fade button 122-4 is pushed. Accordingly, sounds may also become increasingly mere faint as the image becomes darker. If the image becomes completely dark as illustrated in FIG. 30A, the sounds are no longer stored. In contrast, in order to perform the fade-in function, the user stops the pushing of the fade button 122-4. Accordingly, as illustrated in FIGS. 30C to 30A, the image gradually becomes bright as it was before, and the sounds also gradually become louder to match the image.

Figure 31A:
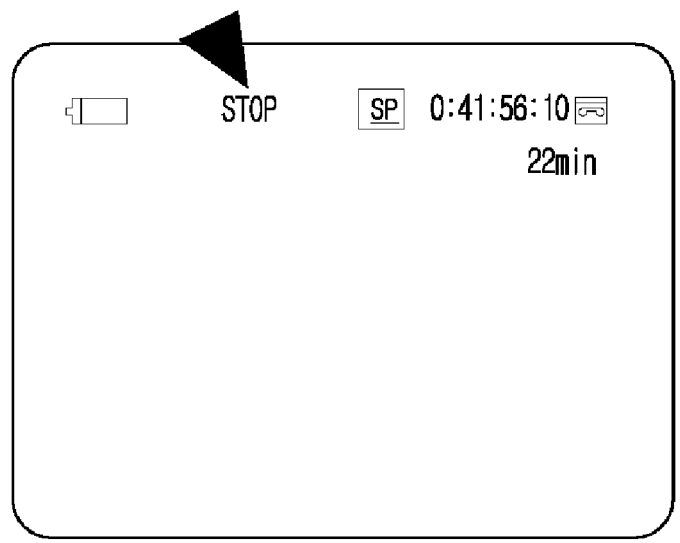
Figure 31B:
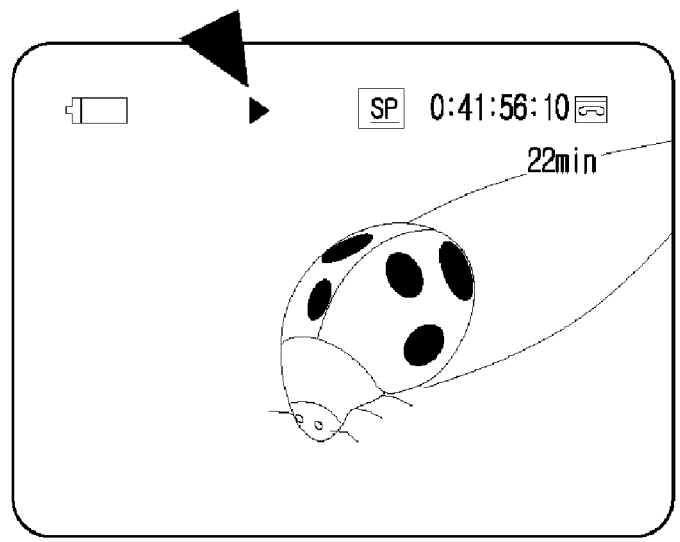

FIGS. 31A and 31B are views illustrating a method of reproducing an image on the LCD screen. First, the user opens the LCD screen 123. If the LCD screen is opened, a "Stop" mark, which is a type of an operation display part 323, is displayed on the LCD screen 123 as illustrated in FIG. 31A. Accordingly, the user searches to find the image using the RW button 122-1 and the FF button 122-1. If the image to be reproduced appears on the LCD screen 123, the user pushes the play/pause button 122-3 to reproduce the captured image.

FIG. 31B is a view illustrating the LCD screen 123 in a state in which the reproduction command is input. As illustrated in FIG. 31B, if the reproduction command is input, a "Reproduction" mark, which is a type of the operation display part 323, appears on the LCD screen 123, and a time code is operated. Then, the user may input an image reproduction end command by pushing the stop button 122-4.

Figure 32:
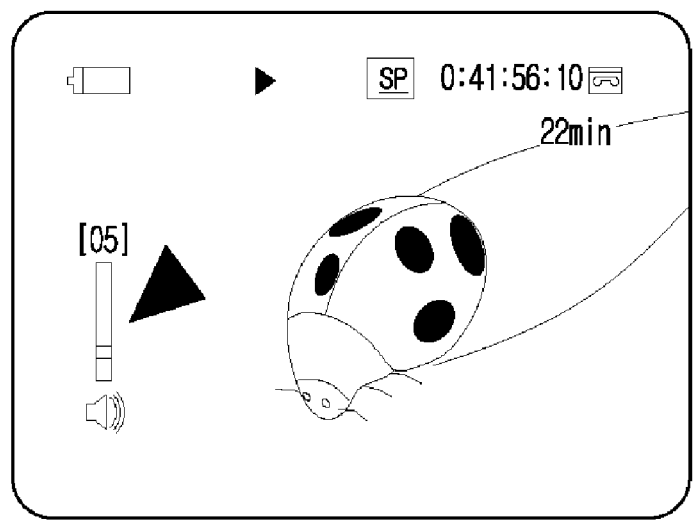

FIG. 32 is a view illustrating a method of adjusting volume of sounds being reproduced. The user can adjust the volume by pushing the up/down button 125. If the user pushes the up/down button 125, a volume mark appears on the LCD screen 123, as illustrated in FIG. 32. If the down button is pressed, the volume mark moves downward, while if the up button is pressed, the volume mark is moved upward. If the user stops the pushing of the up/down button 125, the volume mark may disappear from the screen after a lapse of one or two seconds. In contrast, if a video/audio cable is connected to the AV terminal, the sounds may not be output from a speaker of the multifunctional video apparatus.

Hereinafter, a method of setting functions of the multifunctional video apparatus using the quick menu button 145 will be described in detail. The quick menu includes functions frequently set to correspond to respective modes of the multifunctional video apparatus, such as hand-shake correction, auto exposure, selection of color tone, etc., and thus using the quick menu button 145, the functions of the multifunctional video apparatus can be easily set.

The quick menu of the multifunctional video apparatus may differ according to various modes. When the multifunctional video apparatus is in the tape camera mode, the quick menu includes functions of backlight correction, hand-shake correction, auto exposure, selection of color tone, shutter, exposure, and focus, and when the multifunctional video apparatus is in the memory camera mode, the quick menu includes functions of backlight correction, photo size, selection of color tone, photo quality, exposure, focus During the memory tape reproduction mode, the quick menu includes functions of selection of memory reproduction, file deletion, erase prevention, and print mark.

According to the method of selecting and setting the quick menu item, if the user first pushes the quick menu button 124, the quick menu item is displayed on the LCD screen 123. Then, the user moves the cursor to a function to be set using the up/down button 125, and then pushes the confirmation button 126. Also, the user can set a specified function by moving the cursor to a desired item using the up/down button 125 and by pushing the confirmation button 126. Finally, the user pushes the quick menu button 145 to terminate the setup. Since the quick menu item is included in the menu item, the quick menu item can be selected even by using the menu button.

Hereinafter, a method of setting the functions of the multifunctional video apparatus by selecting the quick menu item or menu item will be described in detail.

Figure 33:
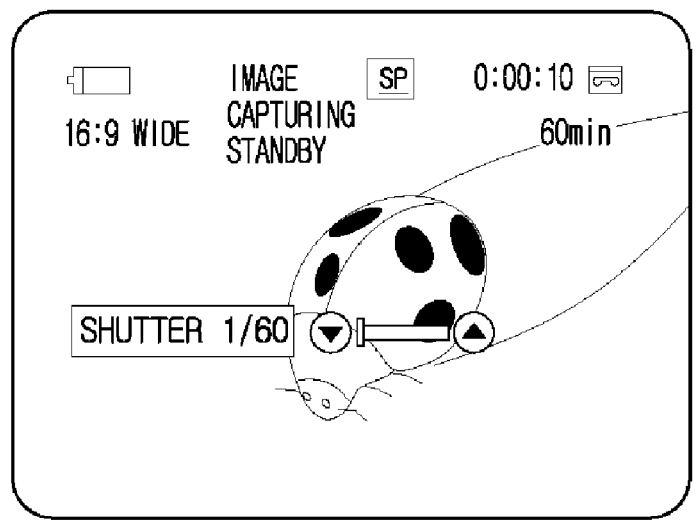
FIGS. 33 to 59 are views illustrating user interfaces (UI) related to a method of setting functions of the multifunctional video apparatus using menu items according to an exemplary embodiment of the present general inventive concept.

FIG. 33 is a view illustrating a shutter speed adjustment. If a user pushes the quick menu button 124, the quick menu item is displayed on the LCD screen 123. Then, the user selects "Shutter" using the up/down button 125, pushes the confirmation button 126, and selects one of either of "Manual" and "Auto" that are sub-items of the item "Shutter" using the up/down button 125 and the confirmation button 126. If "Manual" is selected, the user adjusts a shutter speed using the up/down button 125, pushes the confirmation button 126, and then pushes the quick menu button 124 to terminate the setup. FIG. 33 illustrates that the shutter speed is set to 1/60.

Figure 34:
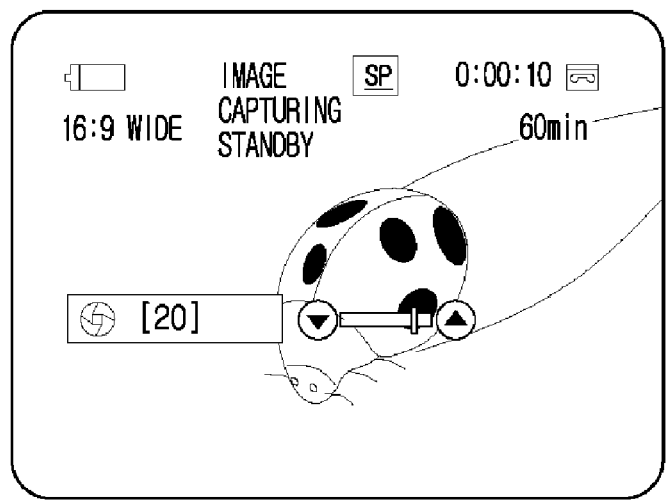

Exposure adjustment can be performed in the same manner as the shutter speed. The exposure denotes a quantity of light and a continuation time of the light in a specified scene. FIG. 34 illustrates that the adjusted exposure is 20.

In contrast, to release the functions of shutter speed and exposure adjustment, the user pushes the confirmation button 126 after selecting "Auto." Accordingly, the shutter speed and exposure adjustment items are not displayed, and the set shutter speed and the adjusted exposure are released.

Figure 35:
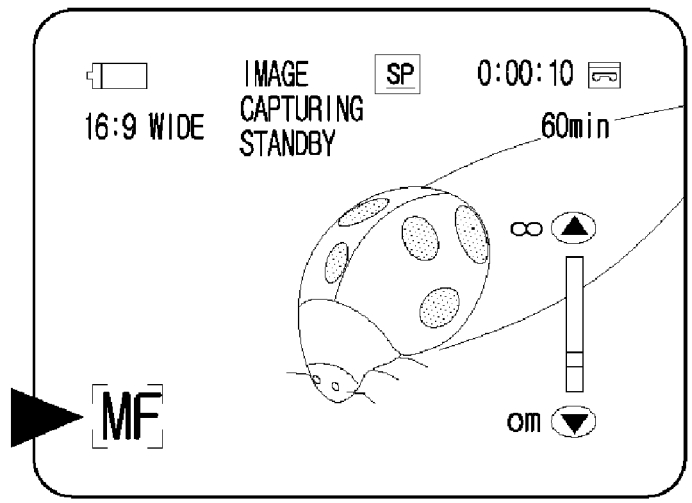

FIG. 35 is a view illustrating a method of setting a manual focus function. If the user selects a quick menu item "Focus" and selects "Manual" using the up/down button 125, "MF" (Manual Focus) that is a manual focus mark 308 is displayed on the LCD screen as illustrated in FIG. 35. Then, the user places the focus on a part of the image capturing region using the up/down button 125. In contrast, if the user selects "Auto," the icon "MF" is not displayed on the LCD screen 123, and the multifunctional video apparatus automatically focuses a center portion of the image capturing region.

Figure 36A:
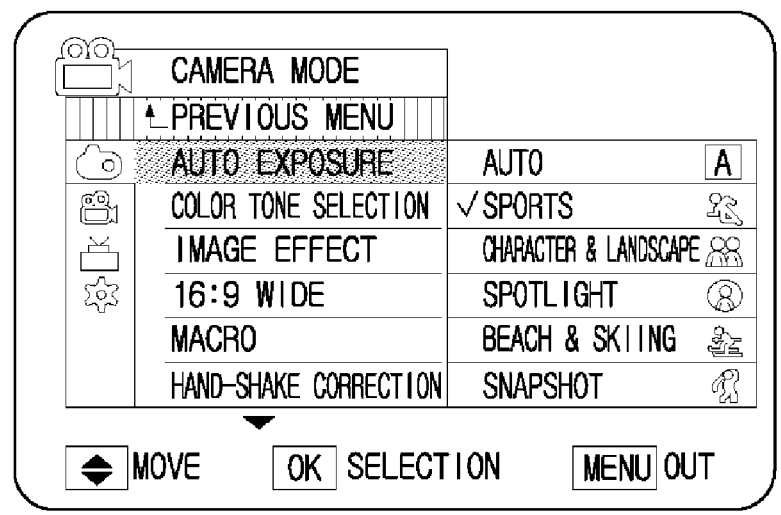
Figure 36B:
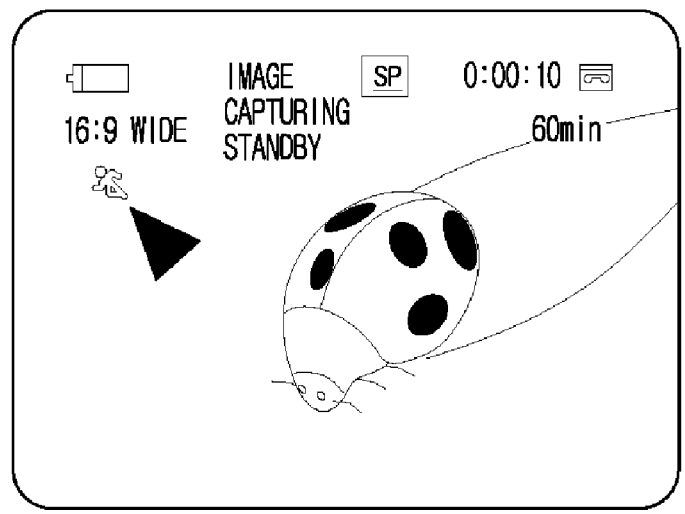

FIGS. 36A and 36B are views illustrating a method of setting an auto exposure. If the user selects a menu item "Camera Mode" and selects "Auto Exposure" using the up/down button 125 and the confirmation button 126, sub-items of "Auto Exposure" are displayed as illustrated in FIG. 36A. Among the SUB-items being displayed, "Auto" is a function of automatically adjusting the exposure according to an image capturing environment, "Sports" is a function that is used when an image having quick or grandiose movements such as athletic sports is captured, and "Character & Landscape" is a function that is used when an image having almost no movement (such as a person and a landscape) is captured. "Beach & Skiing" is a function that is used when an image is captured in a place where strong light is reflected, such as a beach or a skiing ground, and "Snapshot" is a function that is used when a quickly moving object is instantaneously captured, such as a swing scene. If the user selects "Sports," an icon related to the sub-item "Sports" in "Auto Exposure" 304 is displayed on the LCD screen 123 as illustrated in FIG. 36B, and the exposure corresponding to the sports mode is set. In contrast, if "Auto" is selected, no icon is displayed.

Figure 37A:
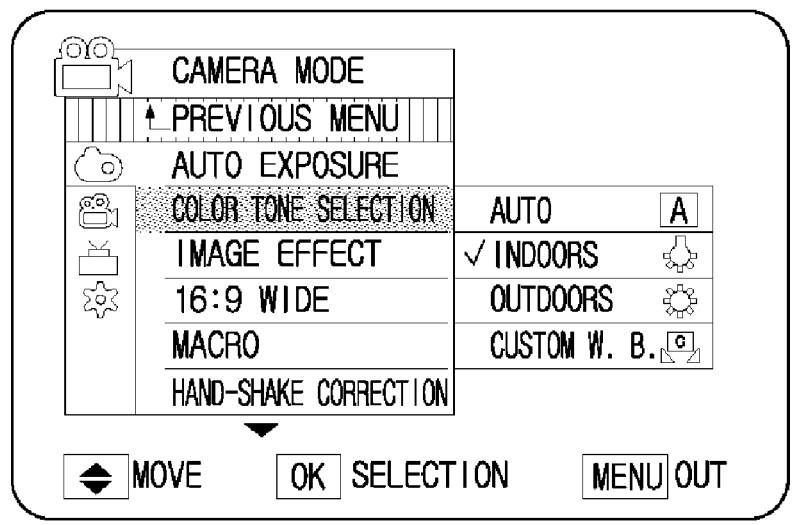
Figure 37B:
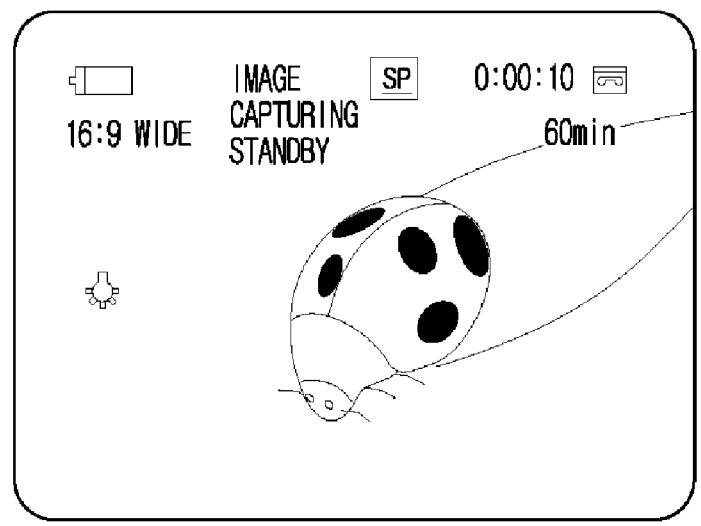

FIGS. 37A and 37B are views illustrating a method of setting a color tone selection function. The user selects a camera setup, and then selects "Color Tone Selection". Accordingly, on the LCD screen 123, as illustrated in FIG. 37A, "Auto," "Indoors," "Outdoors," and "Custom W. B.," which are sub-items of "Color Tone Selection" and corresponding icons, as illustrated in FIG. 37A. "Auto" is a function of automatically adjusting color tone according to the image capturing environment, "Indoors" is a function that is used when the image is captured with a corrected color tone using illuminations such as incandescent electric lamps, studio and video flashes, and "Outdoors" is a function that is used when the image is captured with a corrected color tone based on natural light. "Custom W. B." is a function that is used when the color tone is adjusted to a state desired by the user according to the image capturing environment. If the user selects "Indoors" and then terminates the setup, as illustrated in FIG. 37B, an icon corresponding to "Indoors" in a color tone selection mark 305 is displayed on the LCD screen 123. Then, the image is captured with the color tone corresponding to indoors. In particular, when "Custom W. B." is set, an expression <White Balance> is displayed to flicker on the LCD screen 123. Accordingly, if the user holds an object before illuminations desired by the user and then pushes the confirmation button 126, the expression <White Balance> disappears, and an icon corresponding to "Custom W. B." is displayed on the LCD screen 123.

Figure 38A:
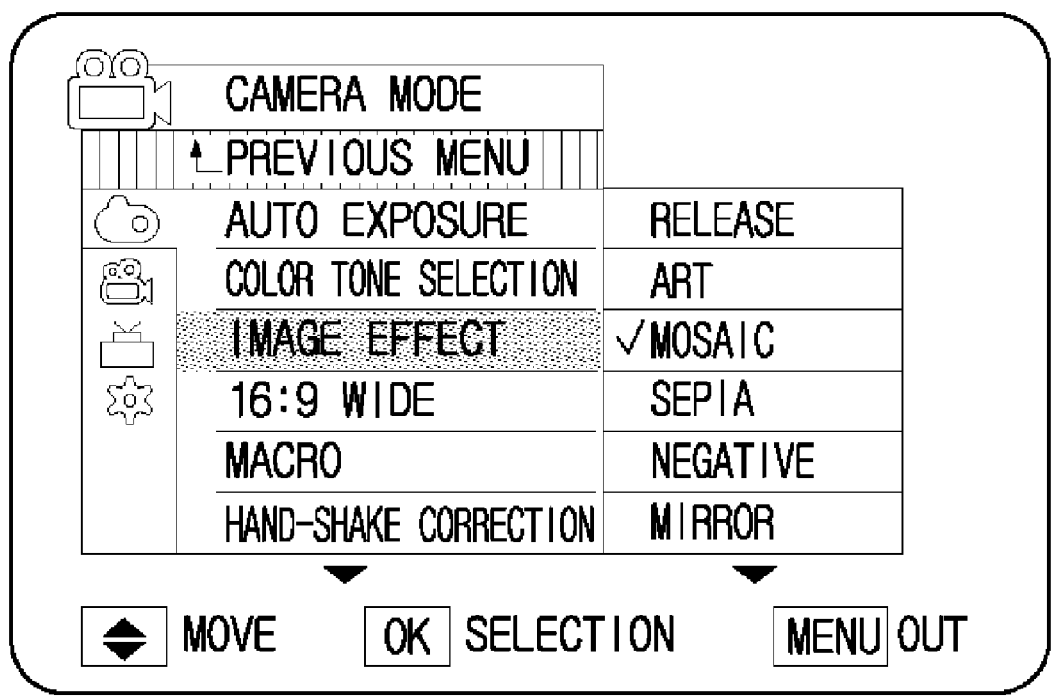
Figure 38B:
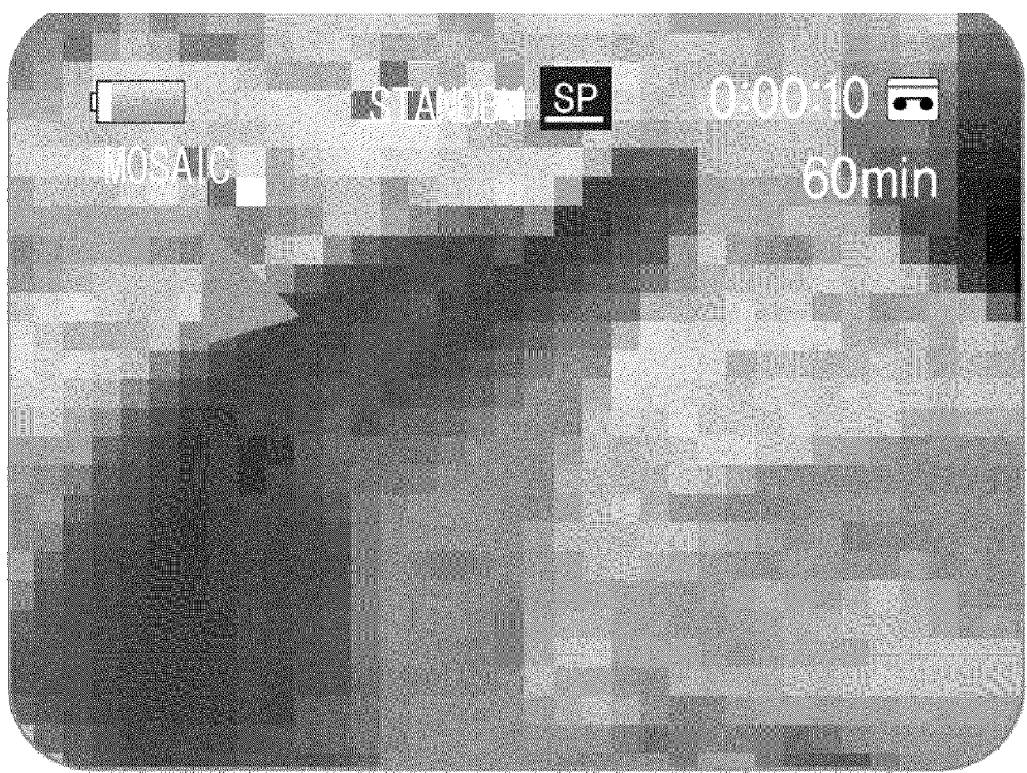

FIGS. 38A and 38B are views illustrating a method of setting an image effect function. The user selects a camera setup, and then selects "Image Effect." Accordingly, as illustrated in FIG. 38A, "Release," "Art", "Mosaic," "Sepia," and "Negative," which are sub-items of "Image Effect," are displayed. The user selects one of the sub-items using the up/down button 125 and terminates the setup of the image effect function by pushing the menu button 145. FIG. 38B is a view illustrating an image displayed on the LCD screen 123 when "Mosaic" in an image effect mark 328 is selected.

Figure 39A:
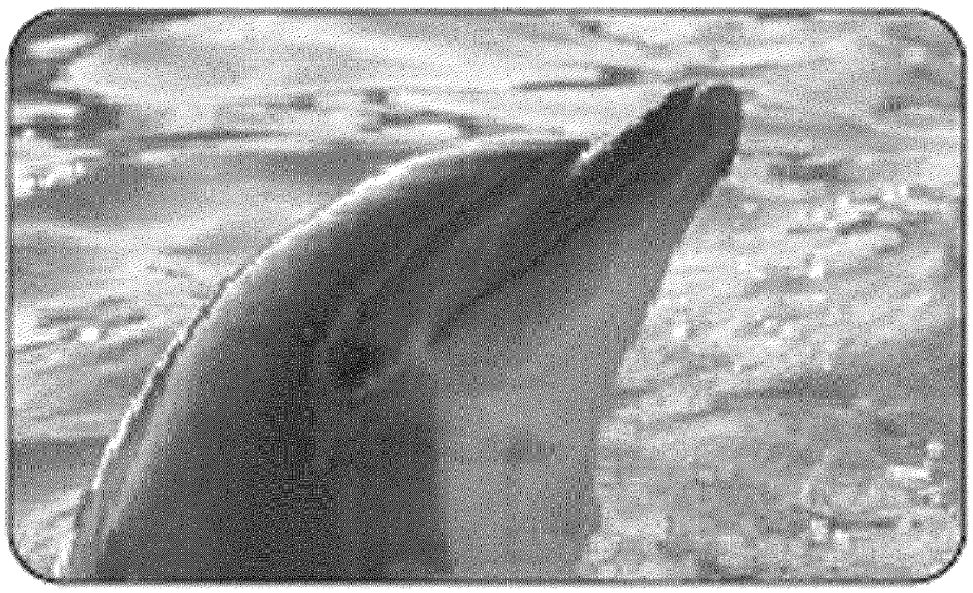
Figure 39B:
Figure 39C:
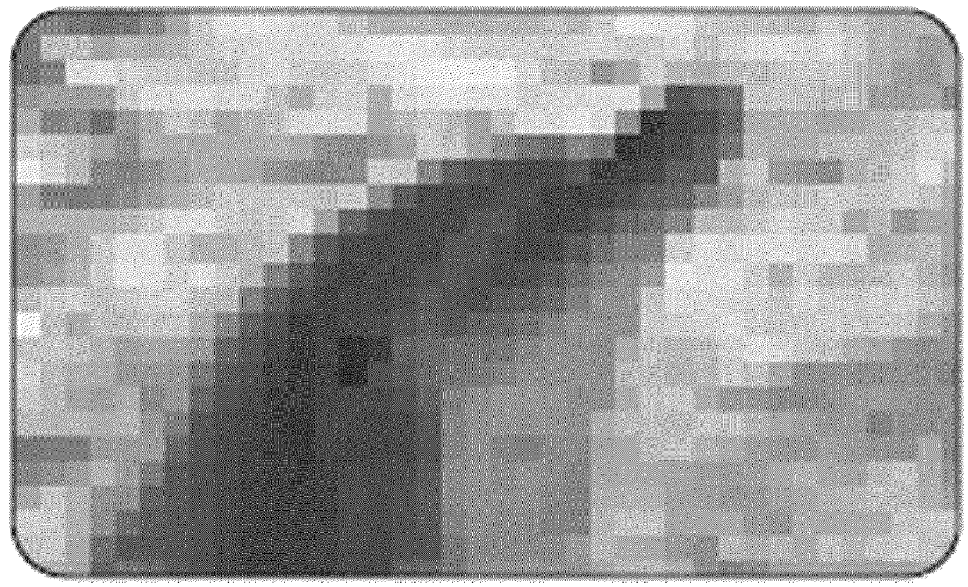
Figure 39D:
Figure 39E:
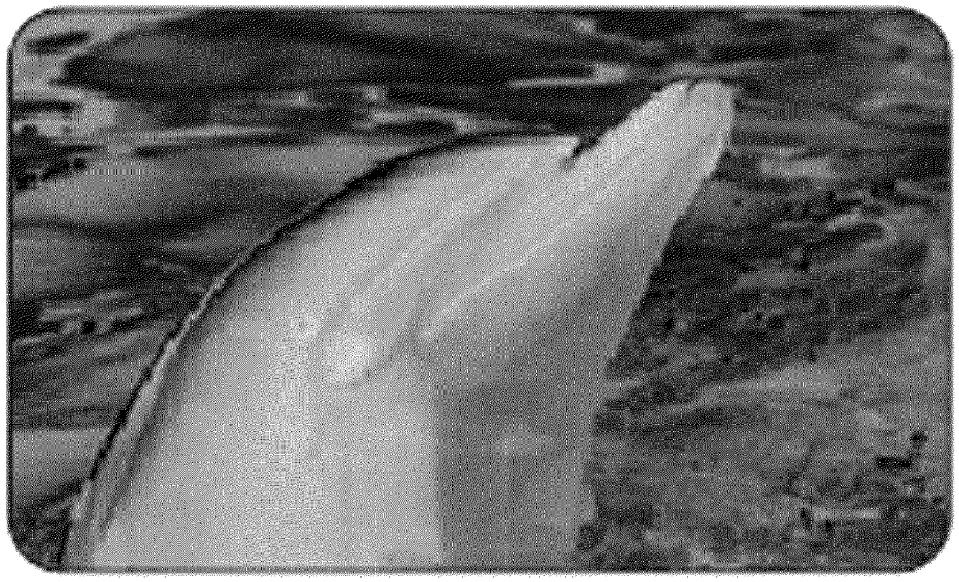
Figure 39F:
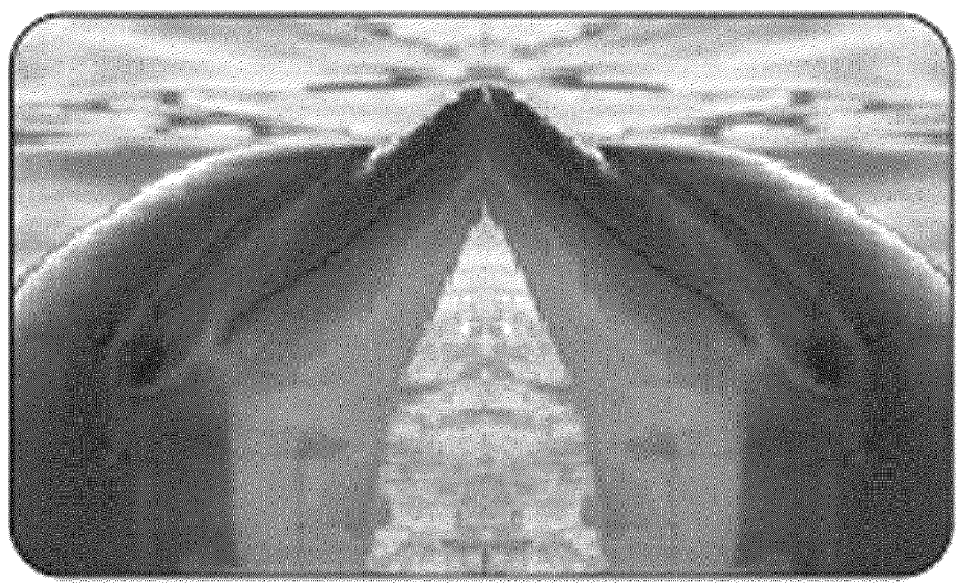
Figure 39G:
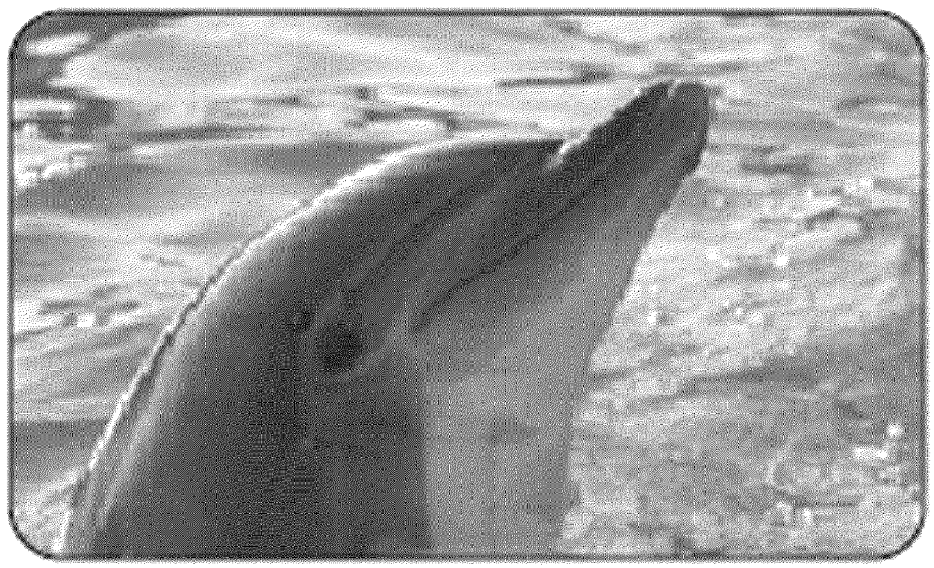
Figure 39H:
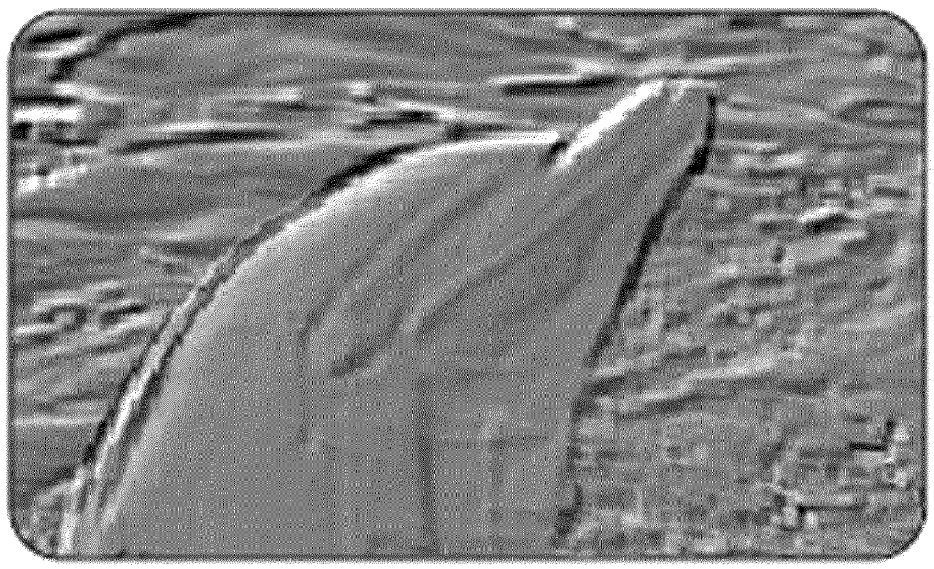
Figure 39I:
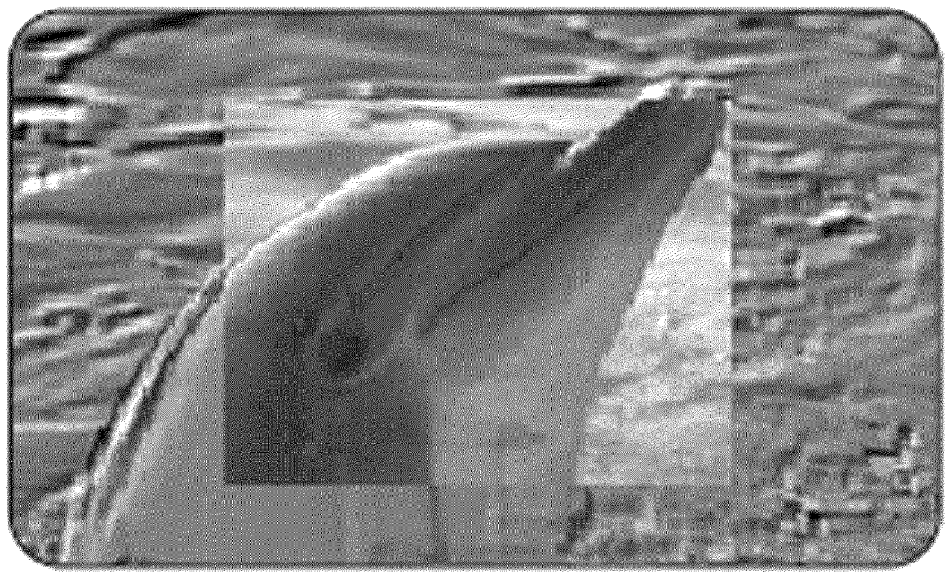
Figure 39J:
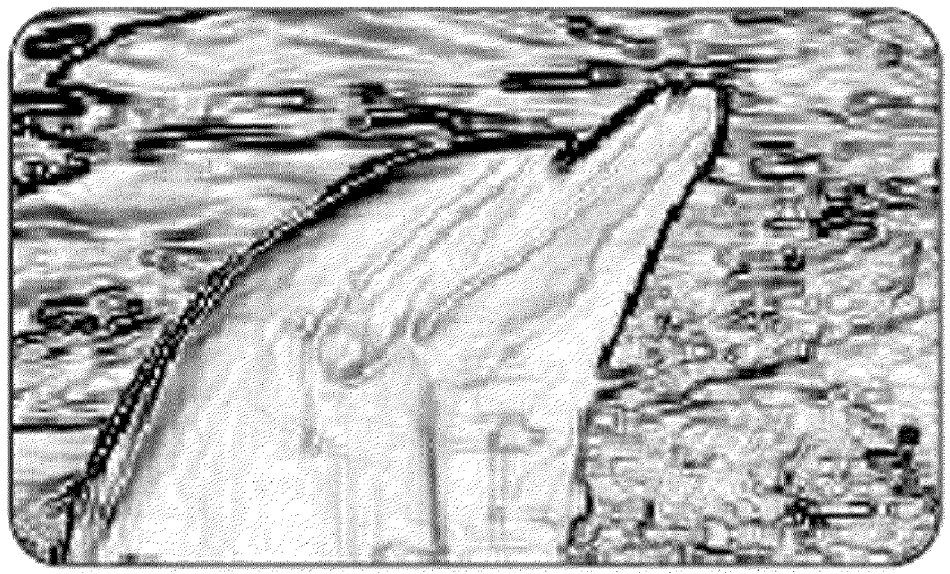
Figure 39K:
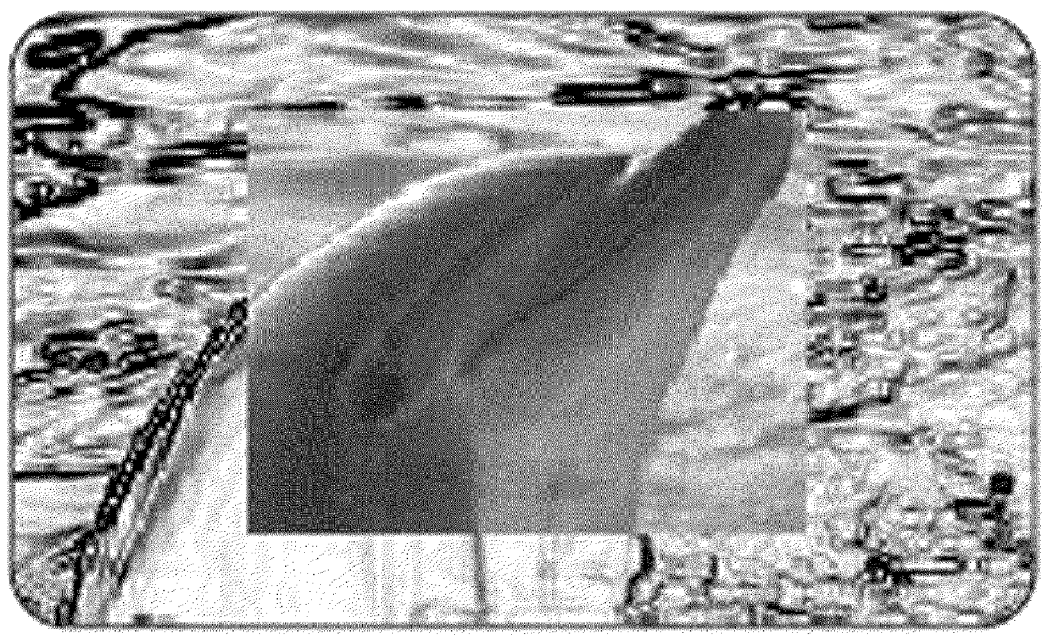

FIGS. 39A to 39K are views illustrating an image according to the sub-items of the image effect function. FIG. 39A illustrates an image displayed on the LCD screen 123 when "Release" is selected. "Release" is a function of expressing a natural image when the image is captured or reproduced. FIG. 39B is a view illustrating an art effect that is expressed with a feeling of dye painting. FIG. 39C is a view illustrating a mosaic effect of the displayed image. FIG. 39D is a view illustrating an image captured in a state that a sepia effect, whereby an image expressed by a brown mono tone is set. FIG. 39E is a view illustrating a negative effect whereby expressed colors are inverted like a photo film. FIG. 39F is a view illustrating a mirror effect that is expressed as a symmetrical image. FIG. 39G is a view illustrating a black-and-white effect whereby a color image is expressed by black and white only. FIG. 39H is a view illustrating an emboss-1 effect whereby only a cubic effect is expressed with no color. FIG. 39I is a view illustrating an emboss-2 effect whereby only a cubic effect is expressed only at an edge of the image, with no color. FIG. 39J is a view illustrating a pastel-1 effect on the displayed image, and FIG. 39K is a view illustrating a pastel-2 effect on the displayed image.

Figure 40A:
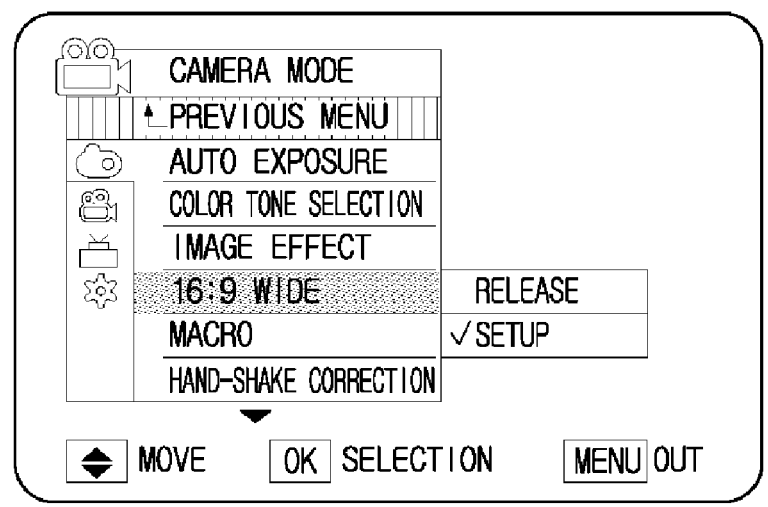
Figure 40B:
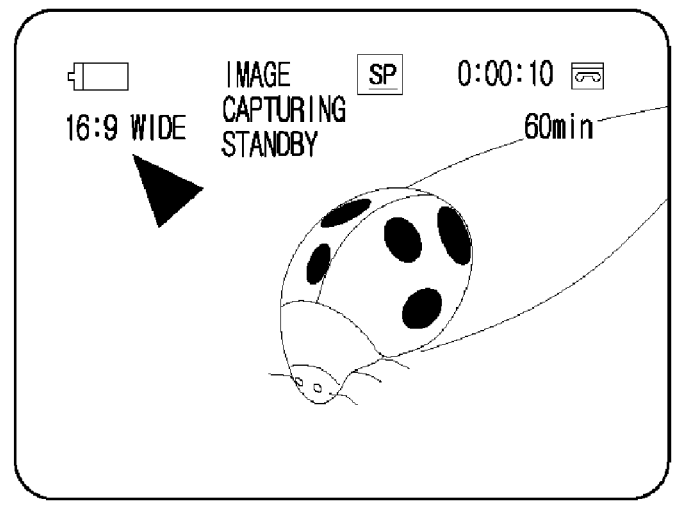

FIGS. 40A and 40B are views illustrating a method of setting a 16:9 wide screen. The 16:9 wide-screen setting function includes a function to make a captured image having a 16:9 aspect ratio be reproduced through a TV that supports the 16:9 aspect ratio. If the user selects "Camera Mode" among menu items and then selects 16:9 aspect ratio, as illustrated in FIG. 40A, "Release" and "Setup," which are sub-items of "16:9 Wide," are displayed. The user then sets the "16:9 Wide" function by selecting one of the sub-items using the up/down button 125 and the confirmation button 126, and terminates the setup by pushing the menu button 145. FIG. 40B is a view illustrating the LCD screen 123 when "Setup" function of "16:9 Wide" is selected.

Figure 41A:
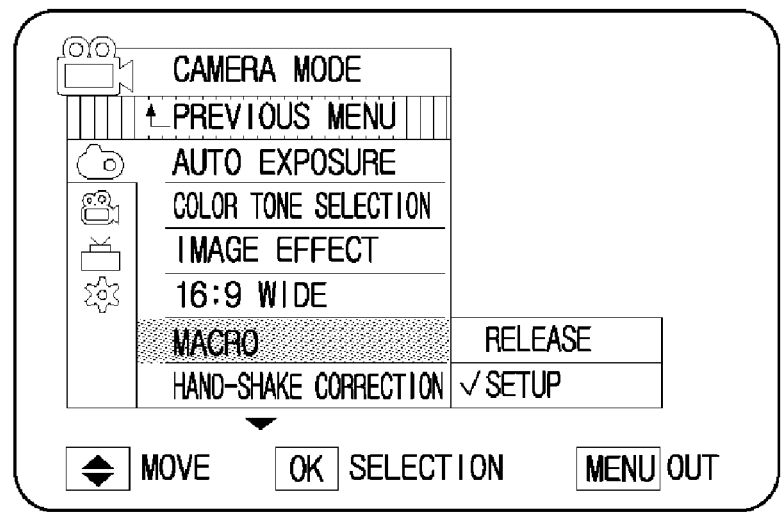
Figure 41B:
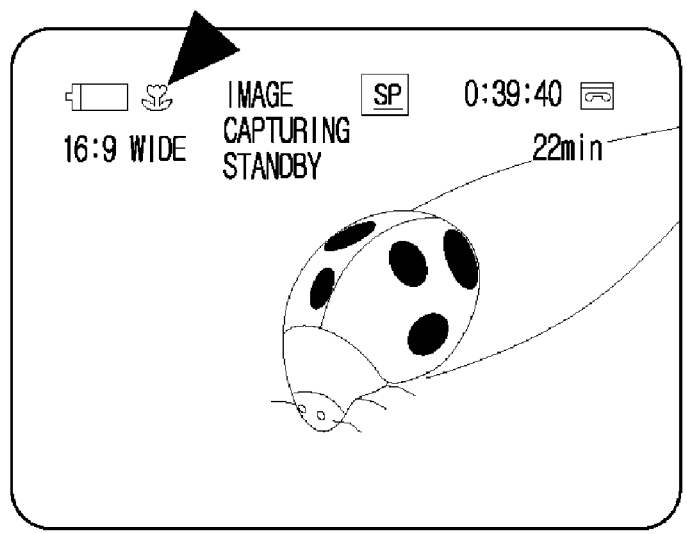

FIGS. 41A and 41B are views illustrating a method of setting a macro function. The macro function is a function that is used when a object is at a distance of 50~100 cm from the lens 111 and no focus is set. If the user selects a menu item "Camera Mode" and then selects an item "Macro," as illustrated in FIG. 41A, "Release" and "Setup," which are sub-items of the macro function, are displayed. The user selects one of the sub-items of the macro function using the up/down button 125 and the confirmation button 126, and terminates the macro function setup using the menu button 145. FIG. 41B illustrates a macro mark 325 displayed on the LCD screen 123 when "Setup" of the macro function is selected.

Figure 42:
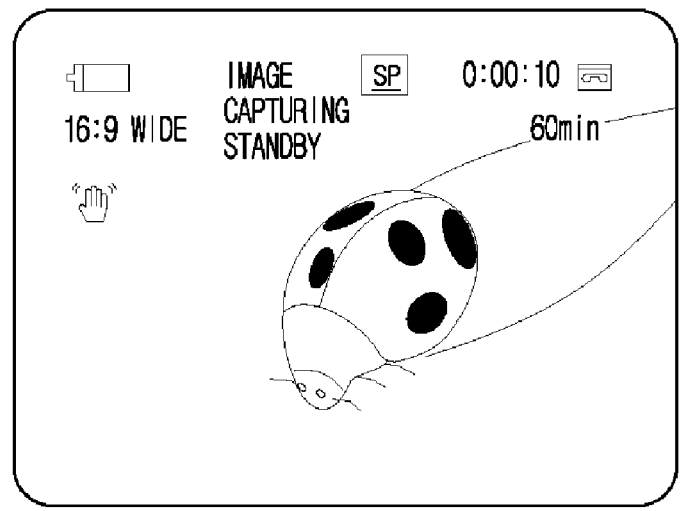

FIG. 42 is a view illustrating a method of setting a hand-shake correction function. The method of setting the hand-shake correction function is similar to the method of setting a macro function. If the hand-shake correction function is set, as illustrated in FIG. 42, a hand-shake correction mark 303 is displayed on the LCD screen 123.

Figure 43:
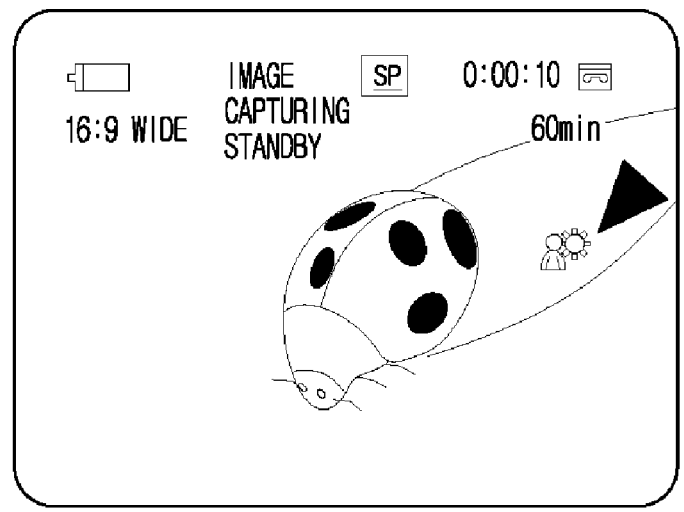

FIG. 43 is a view illustrating a backlight correction function setup. The backlight correction function is a function making an object, which has a bright backlight and thus appears dark, be captured as a bright and clear image. If the backlight correction function is set, a backlight correction mark 315 is displayed on the LCD screen 123, as illustrated in FIG. 43.

Figure 44A:
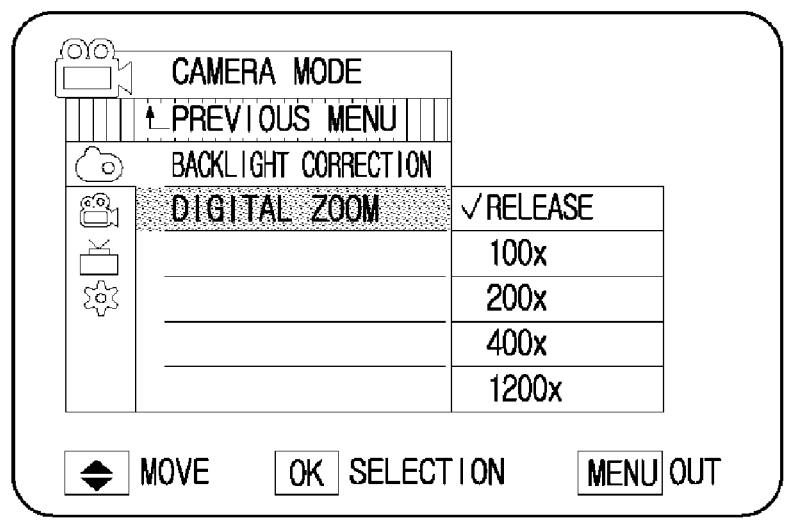
Figure 44B:
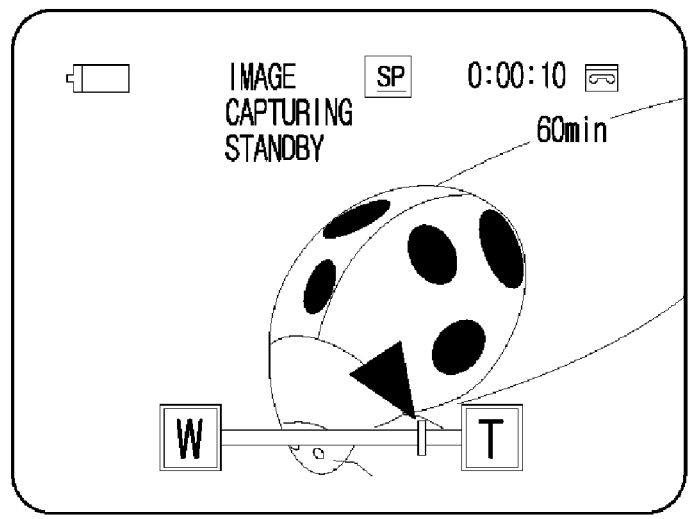

FIGS. 44A and 44B are views illustrating a method of setting a digital zoom function. If the user selects "Camera Mode" and then selects sub-item "Digital Zoom," as illustrated in FIG. 44A, sub-items of the digital zoom function, e.g., 100 Magnification (100×), 200×, 400×, and 1200×, are displayed on the LCD screen 123. The user selects one of the sub-items of the digital zoom function using the up/down button 125 and the confirmation button 126, and terminates the digital zoom function setup using the menu button 145. FIG. 44B is a view illustrating a zoom mark 310 displayed on the LCD screen 123 when 1200× digital zoom function is selected.

Figure 45:
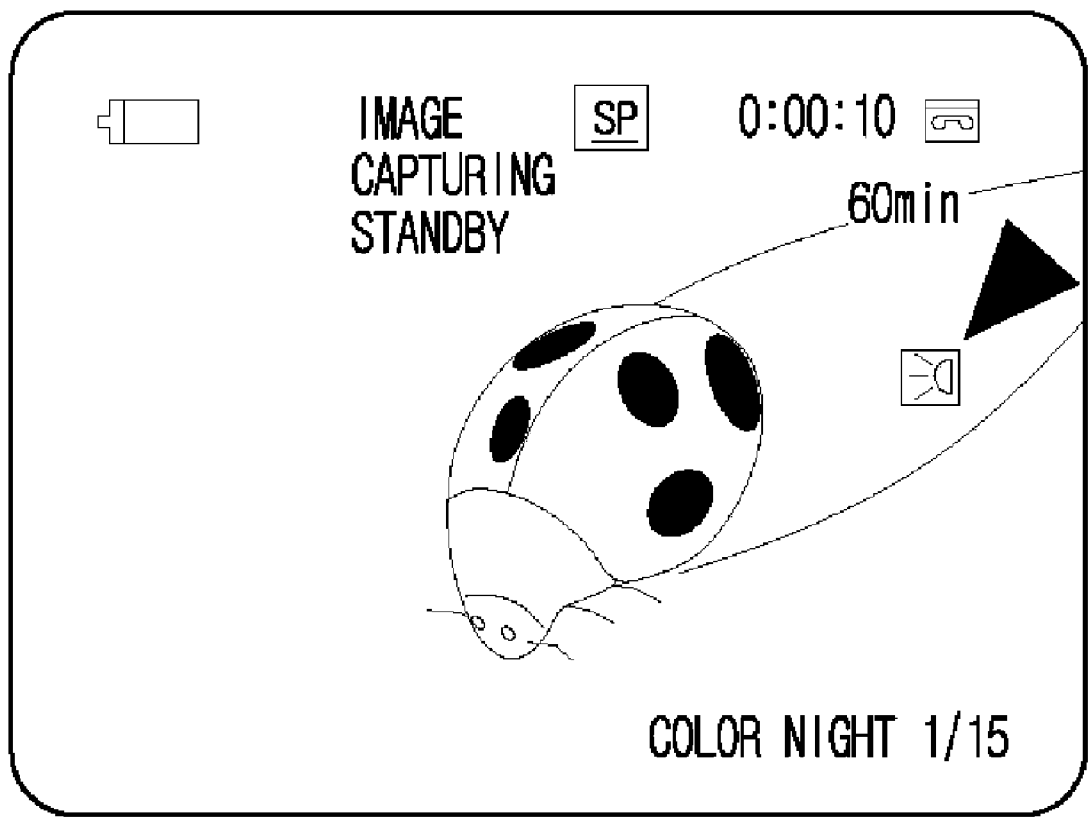

FIG. 45 is a view illustrating a method of setting a color night or flash function. The user can select the shutter speed by pushing a color night/light button 122-4. Whenever the color night/light button 122-4 is pushed, the shutter speed is set to "color night 1/38," "color night 1/15," "light 1/15," and "turned-off." FIG. 45 illustrates an image in the case where "light 1/15", i.e., flash, is set.

Figure 46A:
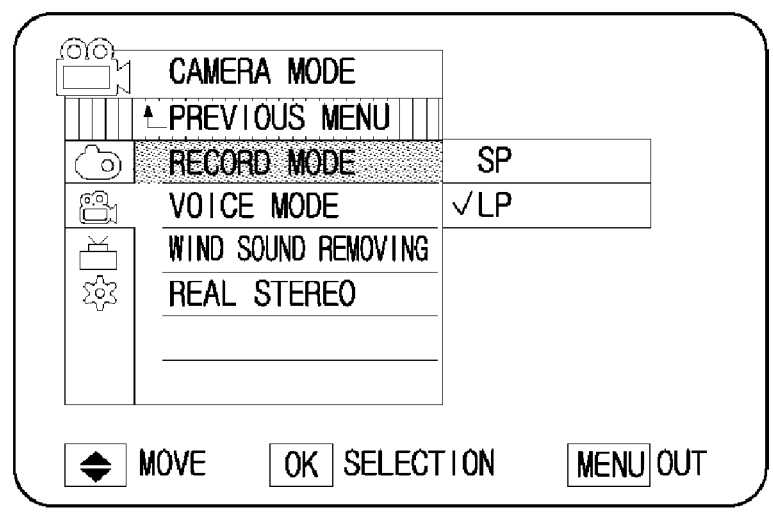
Figure 46B:
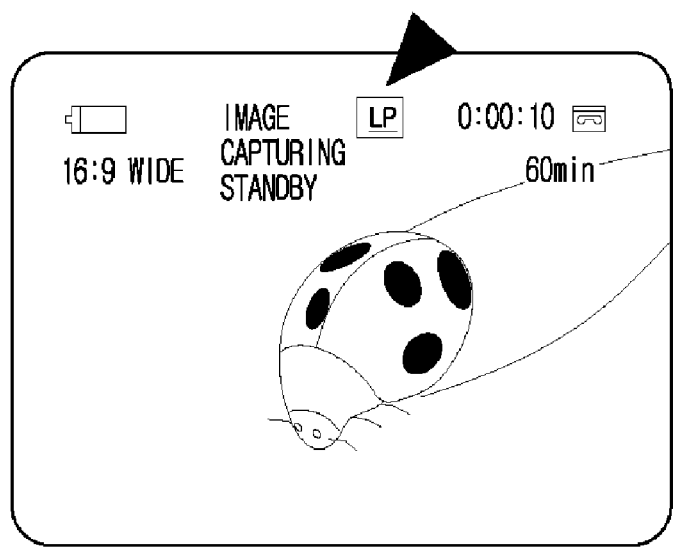

FIGS. 46A and 46B are views illustrating a method of setting a record mode. If the user selects a record setup and then selects "Record Mode," as illustrated in FIG. 46A, "SP" (Standard Play) and "LP" (Long Play), which are sub-items of "Record Mode," are displayed on the LCD screen 123. "SP" is a function capable of capturing or reproducing an image corresponding to a recording time of a tape that is a recording medium, and "LP" is a function capable of capturing or reproducing an image corresponding to a time that is longer than the recording time of the tape. For example, if the recording mode is set to "LP," the multifunctional video apparatus compresses the image at a compression rate higher than "SP," and an image recorded during a 90 minute period can be recorded in the tape for 60 minutes. Accordingly, picture quality of an image recorded in an LP mode generally deteriorates in comparison to that of an image recorded in an SP mode. The user selects one of sub-items of "Recording Mode" using the up/down button 125 and the confirmation button 126, and terminates the setup of the recording mode function using the menu button 145. FIG. 46B is a view illustrating "LP" displayed on the LCD screen 123 as a recording mode mark 322 when "LP" is selected as the recording mode.

Figure 47A:
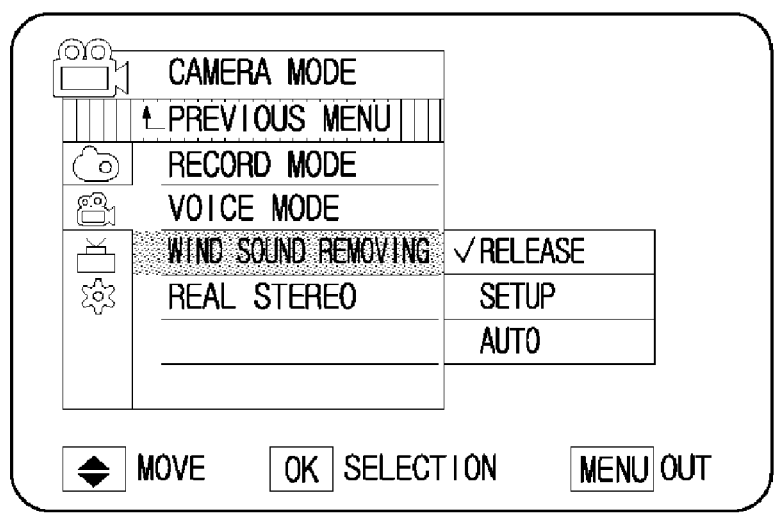
Figure 47B:
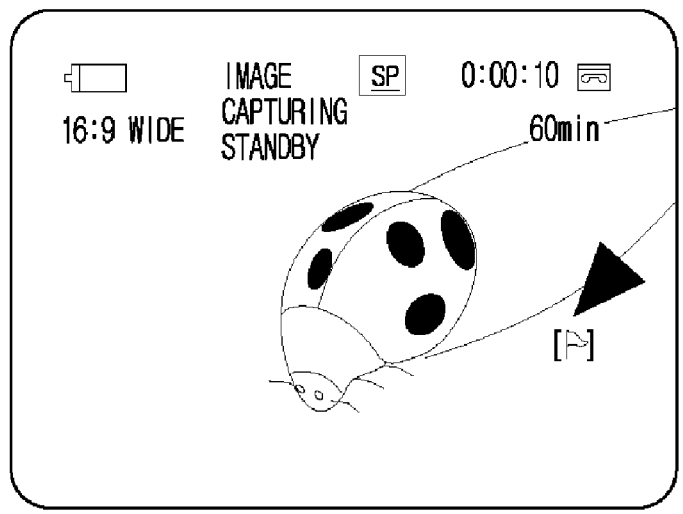

FIGS. 47A and 47B are views illustrating a method of setting wind sound removing function. If the user selects a record setup and then selects "Wind Sound Removing," as illustrated in FIG. 47A, "Release," "Setup," and "Auto," which are sub-items of "Wind Sound Removing," are displayed on the LCD screen 123. "Release" is a function that does not use the wind sound removing function, "Setup" is a function of removing bass portion such as the wind sound, and "Auto" is a function of minimizing the wind sound as preserving human voice. The user selects one of the sub-items of "Wind Sound Removing" using the up/down button 125 and the confirmation button 126, and terminates the setup of the wind sound removing function using the menu buttons 145. FIG. 47B is a view illustrating the wind sound removing function mark 314 displayed on the LCD screen 123 when "Setup" of the wind sound removing function is selected.

Figure 48A:
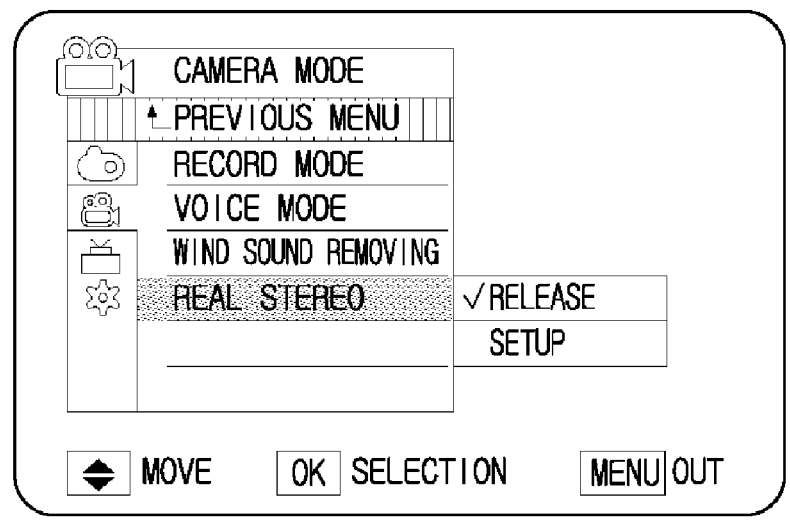
Figure 48B:
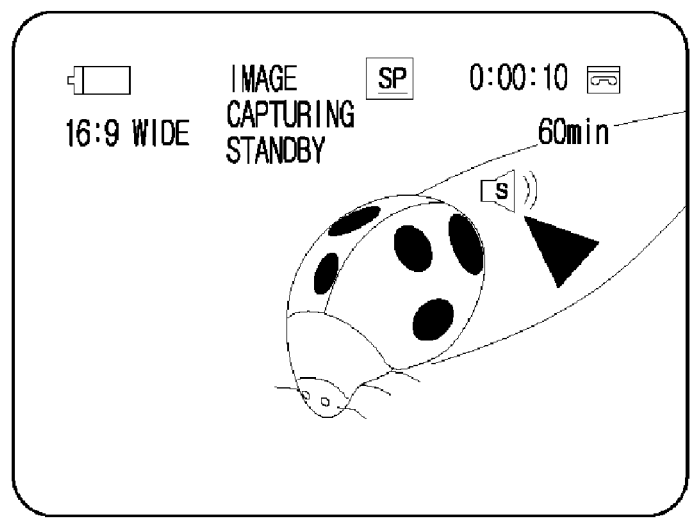

FIGS. 48A and 48B are views illustrating a method of setting a real stereo function. If the user selects a record setup and then selects "Real Stereo," as illustrated in FIG. 48A, "Release" and "Setup," which are sub-items of "Real Stereo," are displayed on the LCD screen 123. If the real stereo function is set, the horizontal characteristic of an input signal is improved, and thus the stereo function of the input signal is strengthened. The user selects one of the sub-items of "Real Stereo" using the up/down button 125 and the confirmation button 126, and terminates the setup of the real stereo function using the menu button 145. FIG. 48B is a view illustrating a real stereo mark 317 displayed on the LCD screen when "Setup" is selected.

Figure 49:
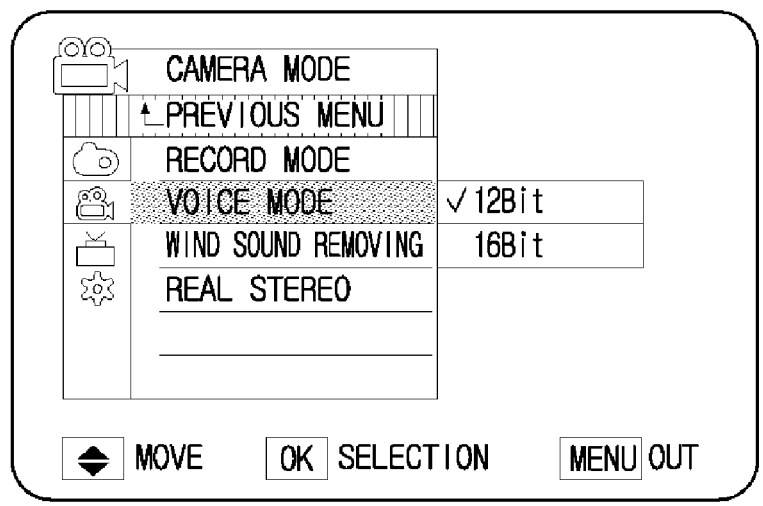

FIG. 49 is a view illustrating a method of setting a voice mode. If the user selects a record setup and then selects "Voice Mode," as illustrated in FIG. 49, "12 Bits" and "16 Bits," which are sub-items of "Voice Mode," are displayed on the LCD screen 123. The user selects one of the sub-items of "Voice Mode Stereo" using the up/down button 125 and the confirmation button 126, and terminates the setup of the voice mode function using the menu button 145. "12 Bits" is used when two-track stereo voice is recorded, and "16 Bits" is used when one-track stereo voice is recorded. "12 Bits" may be set when voice or background music is added during an editing operation or during an audio dubbing.

Figure 50:
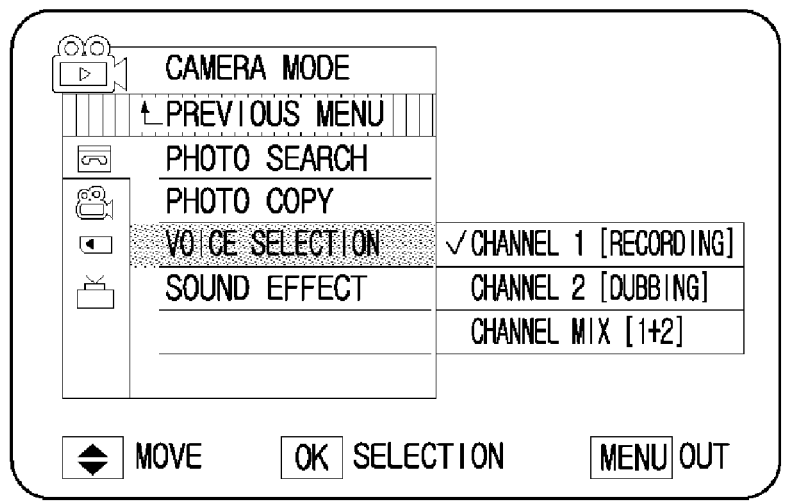

FIG. 50 is a view illustrating a method of listening to a recorded voice. The recorded voice is divided into voice recorded during the image capturing and dubbed voice, and such voices are reproduced separately or together. The user first changes the mode of the multifunctional video apparatus to a tape reproducing mode (e.g., the tape reproducing mode labeled "Reproduction Mode" as illustrated in FIG. 50). Then, the user searches to find an image the voice of which is to be heard using the play/pause button 122-3, RW button 122-1, or FF button 122-2. If the corresponding image is searched for, the user stops the reproduction of the image using the play/pause button 122-3.

Then, if the user selects a tape setup and then selects "Voice Selection" which is a sub-item of the tape setup, as illustrating in FIG. 50, sub-items of "Voice Selection," i.e., "Channel 1 (Recording)," "Channel 2 (Dubbing)," and "Channel Mix (1+2)," are displayed. "Channel 1" is a function of outputting only the voice recorded during the image capturing, "Channel 2" is a function of outputting only the voice or background music recorded through an audio dubbing, and "Channel Mix" is function of outputting both the voice recorded during the image capturing and the voice or background music recorded through the audio dubbing. The user selects one of the sub-items and then terminates the setup of the voice selection function by pushing the menu button 145. Thereafter, if the play/pause button 12203 is pushed, the image and the selected voice are reproduced.

Figure 51:
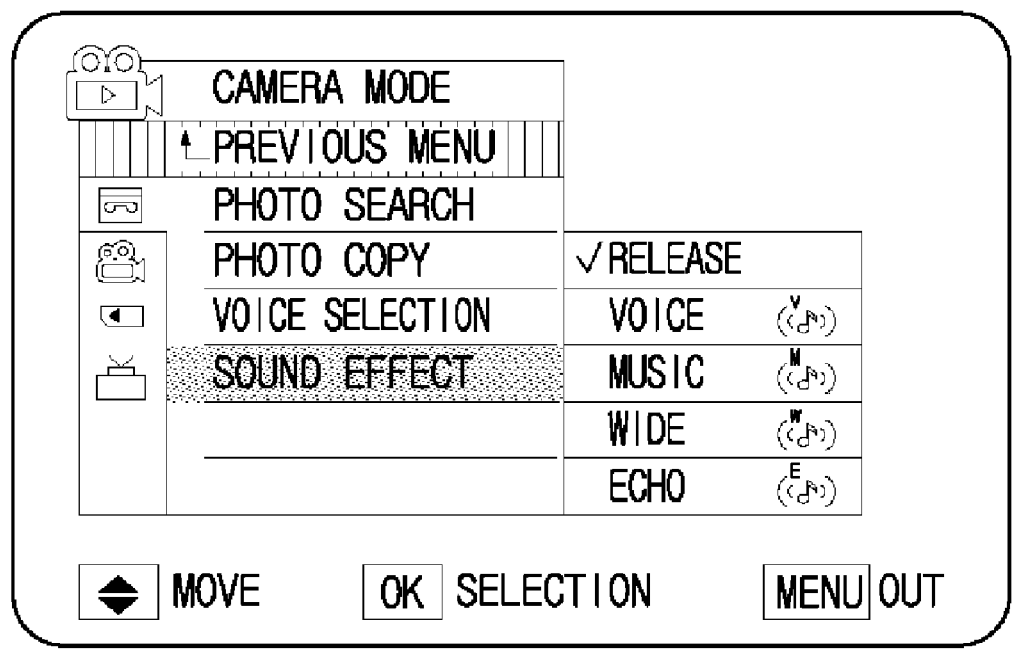

FIG. 51 is a view illustrating a method of setting sound effect. If the user selects a tape setup and then selects "Sound Effect," as illustrated in FIG. 51, "Release," "Voice," "Music," "Wide," and "Echo," which are sub-items of "Sound Effect," are displayed. "Release" is a function that does not use the sound effect, "Voice" is a function that is used to improve a human voice, and "Music" is a function that is used to improve music sound by enhancing treble and bass sounds. "Wide" is a function that is used to heighten full stereo sound effects by enhancing left/right sounds, and "Echo" is a function that is used to give an echo effect to the reproduced sound. The user selects one of the sub-items, and FIG. 51 illustrates a state that "Release" is selected. By pushing the menu button 145, the setup of the sound effect is terminated.

Hereinafter, functions related to a method of capturing a still image and a method of reproducing a captured still image using the multifunctional video apparatus according to an embodiment of the present general inventive concept will be described.

Figure 52A:
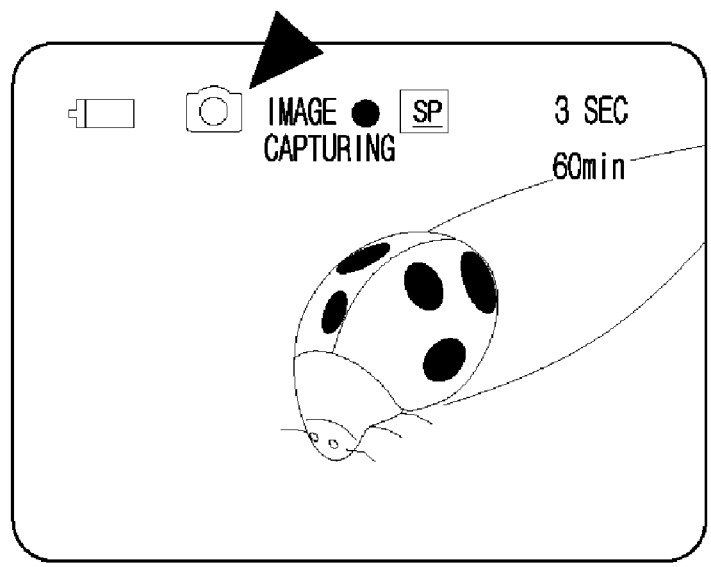
Figure 52B:
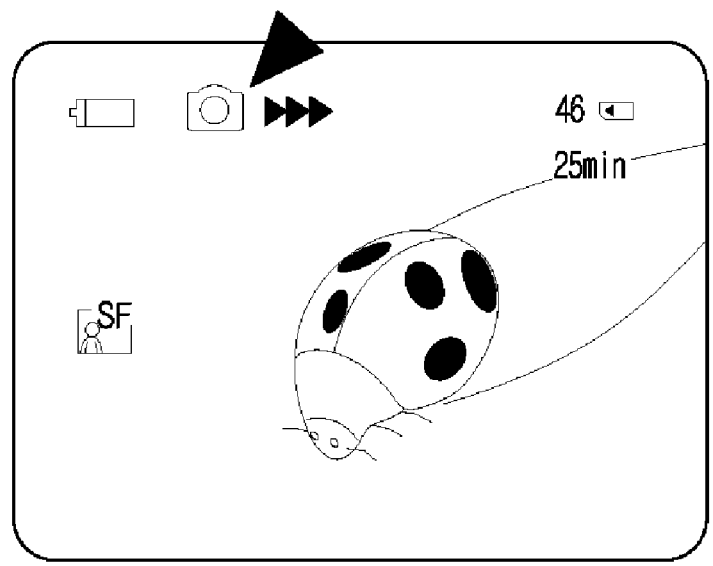

In order to capture a still image, the user pushes a photo button 142. FIG. 52A illustrates an image capturing mark, which is included in the operation display part 415, displayed on the LCD screen 123 when the still image is recorded on a tape, and FIG. 52B illustrates a record mark, which is included in the operation display part 415, displayed on the LCD screen 123 when the still image is recorded in a memory card.

Figure 53A:
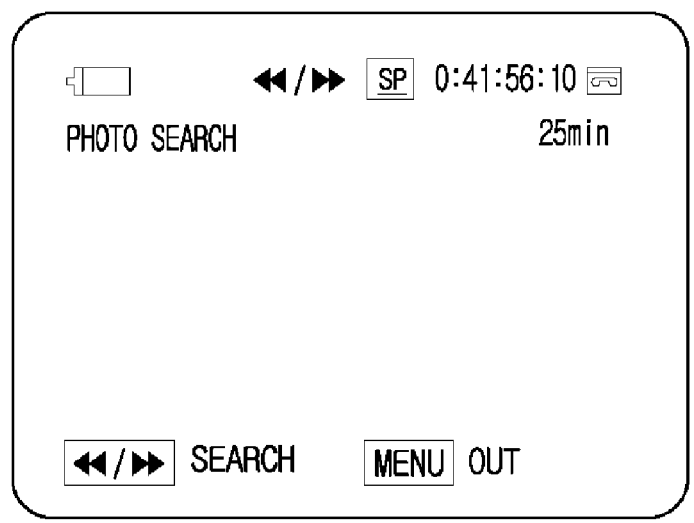
Figure 53B:
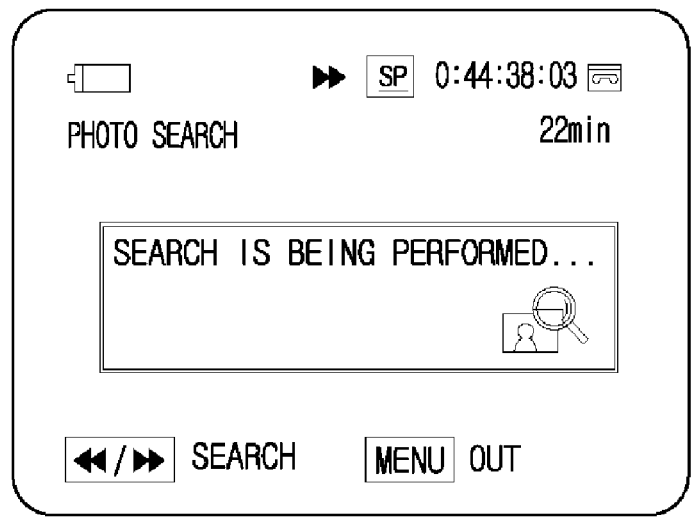

FIGS. 53A and 53B are views illustrating a method of searching to find a still image recorded on the tape. If the user selects a tape setup and then selects a sub-item "Photo Search," as illustrated in FIG. 53A, a rewind (RW)/fast forward (FF) mark is displayed on the LCD screen 123. The user searches to find the still image using the RW button 122-1 or FF button 122-2. FIG. 53B illustrates a mark, which indicates a still image searching process, displayed on the screen 123 when the FF button 122-2 is pushed. The user can terminate the still image search by pushing the stop button 122-4 or the menu button 145.

Figure 54A:
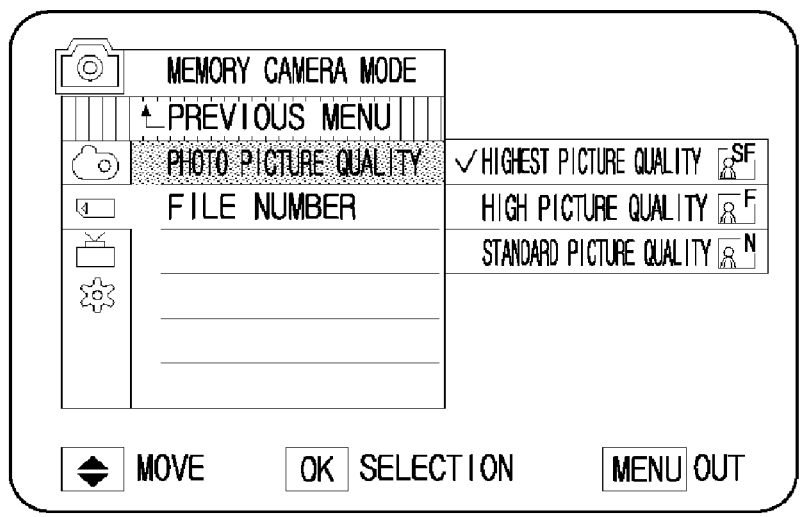
Figure 54B:
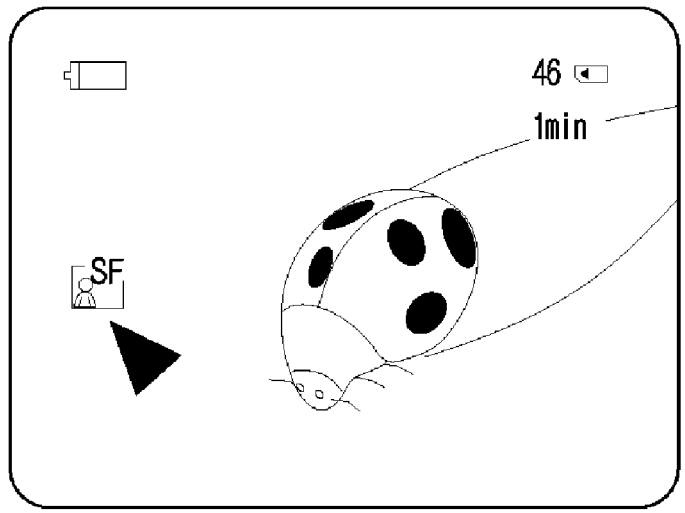

FIGS. 54A and 54B are views illustrating a method of setting a still image quality function. First, the user changes the mode of the multifunctional video apparatus to a memory card camera mode (i.e., the memory card camera mode indicating "Memory Camera Mode" as illustrated in FIG. 54A). Then, if the user selects a memory setup, and then selects "Photo Picture Quality," which is picture quality of the still image, "Highest Picture Quality," "High Picture Quality," and "Standard Picture Quality," which are sub-items of "Photo Picture Quality," are displayed on the LCD screen 123 as illustrated in FIG. 54A. The user selects one of the sub-items of the photo picture quality function using the up/down button 125 and the confirmation button 126, and terminates the setup of the photo picture quality function using the menu button 145. FIG. 54B is a view illustrating a highest picture quality included in a photo picture quality mark 504 displayed on the LCD screen 123 when "Highest Picture Quality" is selected.

Figure 55A:
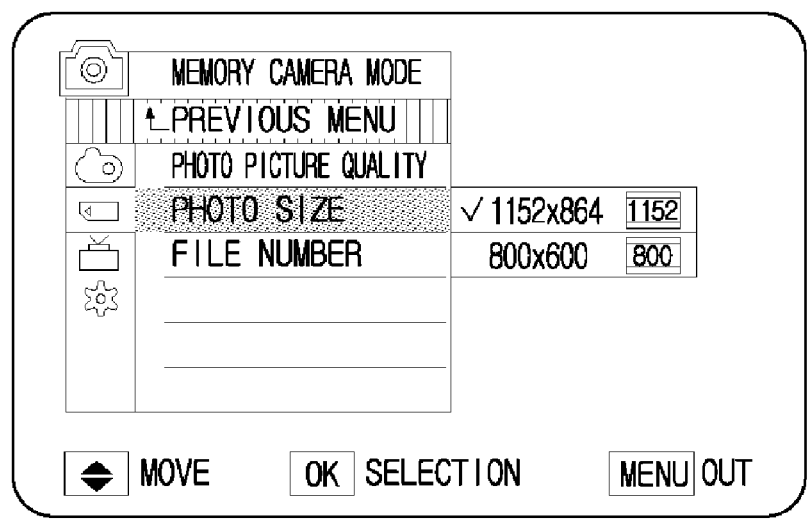
Figure 55B:
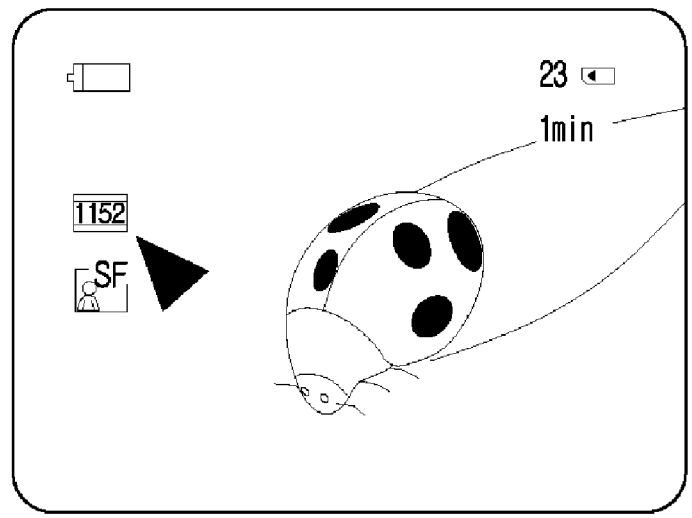

FIGS. 55A and 55B are views illustrating a method of setting a size of a still image. If the user select a memory setup and then selects "Photo Size," as illustrated in FIG. 55A, "1152×864" and "800×600," which are sub-items of "Photo Size," are displayed on the LCD screen 123. The user selects one of the sub-items of "Photo Size" using the up/down button 125 and the confirmation button 126, and terminates the setup of the photo size function using the menu button 145. FIG. 55B is a view illustrating a "1152" mark included in a photo size mark 502 displayed on the LCD screen 123 when "1152×864" is selected.

Figure 56:
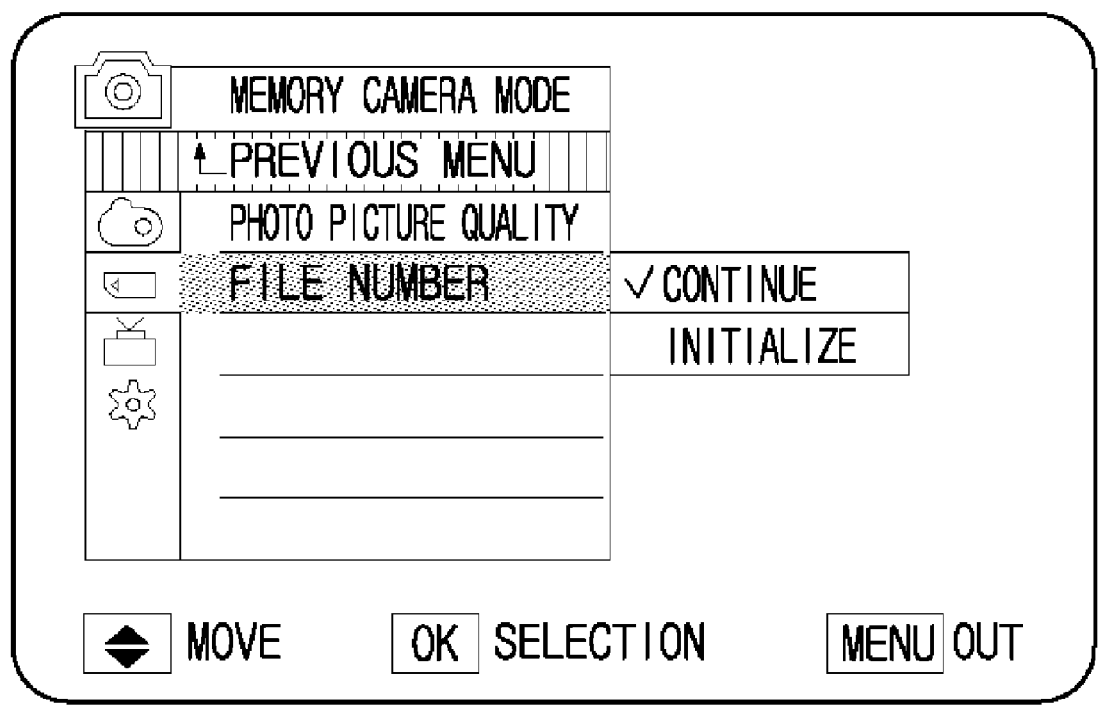

FIG. 56 is a view illustrating a method of designating a file number. If the user selects a memory setup and then selects "File Number," as illustrated in FIG. 56, "Continue" and "Initialize," which are sub-items of "File Number," are displayed on the LCD screen 123. The user selects one of the sub-items of "File Number" using the up/down button 125 and the confirmation button 126, and terminates the designation of the file number using the menu button 145. "Continue" is a function of designating the photo file number in succession to a previously given file number, irrespective of a photo deletion, and "Initialize" is a function of designating "0001" as the file number of the photo taken after a new memory card is used or after the entire photos are deleted.

Figure 57A:
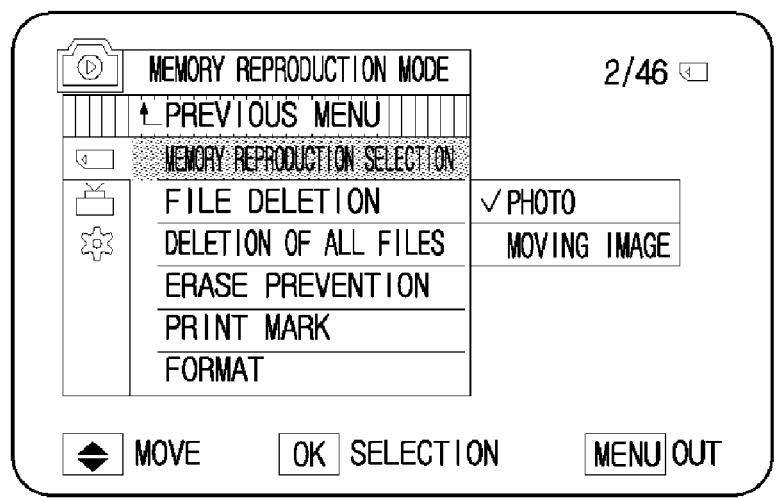
Figure 57B:
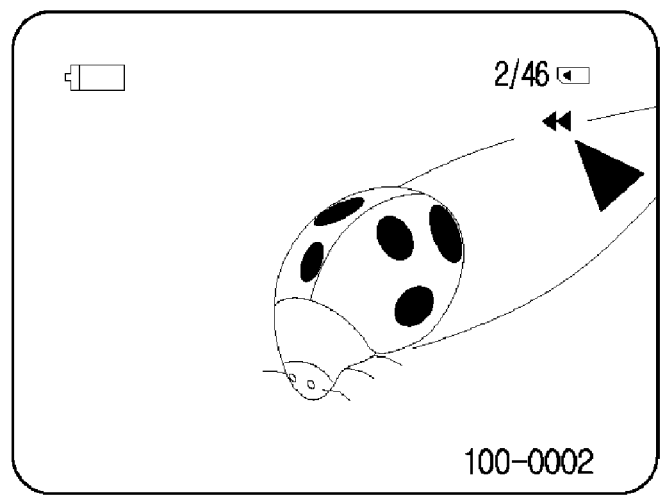

FIGS. 57A and 57B are views illustrating a method of searching to find a still image stored in a memory card. The user changes the mode of the multifunctional video apparatus to a memory card reproduction mode (i.e., the memory card reproduction mode designated as "Memory Reproduction Mode" as illustrated in FIG. 57A). Then, if the user selects a memory setup, and then selects "Memory Reproduction Selection," as illustrated in FIG. 57A, "Photo" and "Moving Image," which are sub-items of "Memory Reproduction Selection," are displayed on the LCD screen 123. The user selects "Photo" and searches to find a desired still image using the "Previous" button or the "Next" button. FIG. 57B illustrates a scene instantaneously caught in a process of searching to find the photo using the "Previous" button.

Figure 58A:
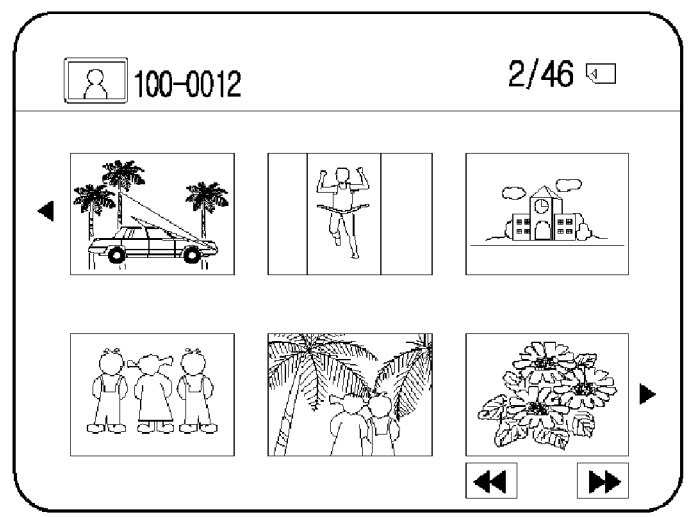
Figure 58B:
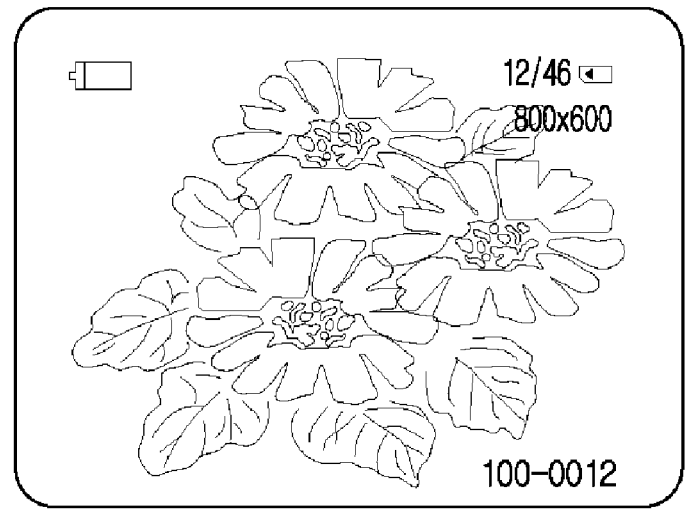

FIGS. 58A and 58B are views illustrating multi-scene reproduction. If the user pushes a multi-screen button 122-4, as illustrating in FIG. 58A, six still images are displayed on the LCD screen 123. The user can select one of the displayed still images using the "Previous" button 122-1 or the "Next" button 122-2. In order to display the sixth still image in FIG. 58A on the whole LCD screen 123, the user pushes the multi-scene button 122-4, and thus only the selected still image is displayed on the entire screen as illustrated in FIG. 58B.

Figure 59:
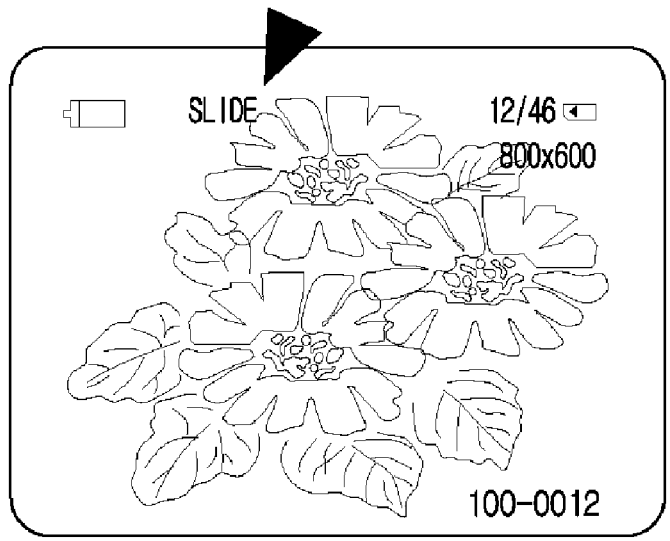

FIG. 59 is a view illustrating a slide reproduction. If the user pushes a slide button 122-3, as illustrated in FIG. 59, a slide 612 is displayed on the LCD screen 123. Then, all the still images recorded in the memory card are reproduced one by one, in an order of their file numbers, at predetermined intervals (preferably, at intervals of 2~3 seconds). In contrast, during releasing of the slide function, the user pushes the slide button 122-3 once more.

Hereinafter, a method of recording a moving image or a still image, which is recorded on a tape, in a memory card will be described.

Figure 60:
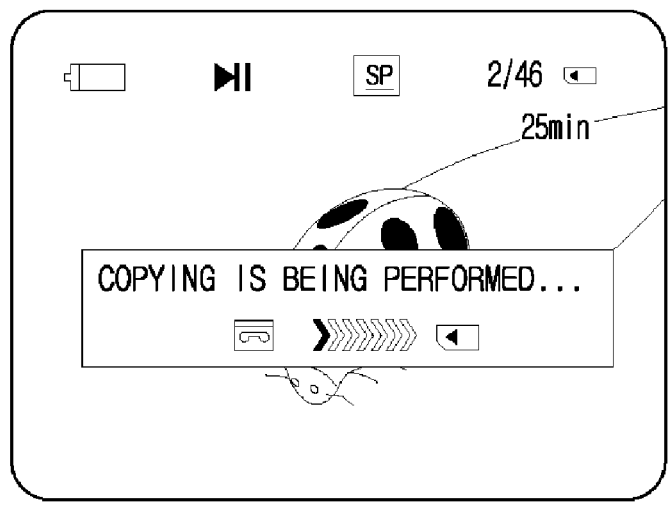
FIGS. 60 to 65B are views illustrating user interfaces (UI) related to a method of using recording media of the multifunctional video apparatus according to an exemplary embodiment of the present general inventive concept.

FIG. 60 is a view illustrating a method of recording a moving image recorded in a tape in a memory card. The user inserts a tape on which an image to be copied is recorded into the multifunctional video apparatus, and reproduces the image by pushing the play/pause button 122-4. If the image to be copied is displayed on the LCD screen 123, the user pushes a photo button 142. Then, as illustrated in FIG. 60, the image appearing on the LCD screen 123 is recorded in the memory card in the form of a photo image. In contrast, to stop the recording, the user pushes the stop button 122-4 to stop the tape.

Figure 61A:
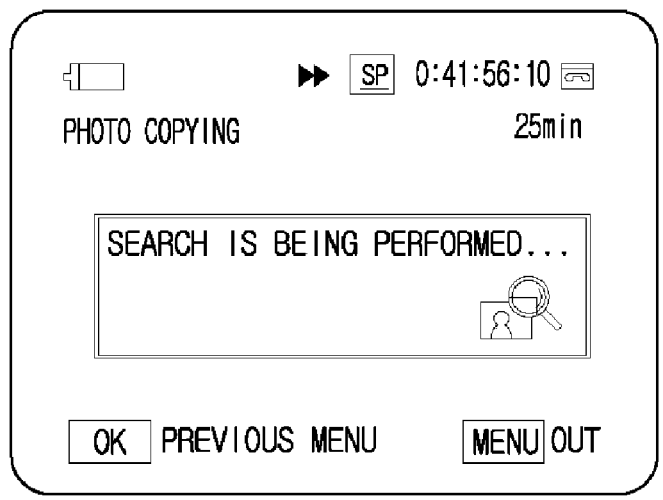
Figure 61B:
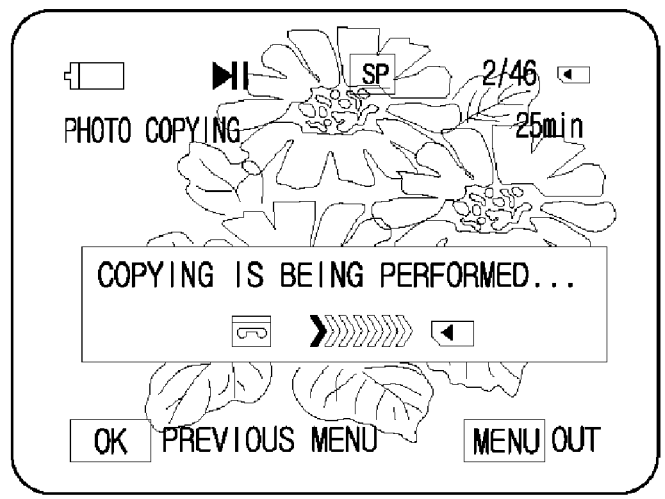

FIGS. 61A and 61B are views illustrating a method of recording a still image recorded in a tape in a memory card. The user selects a tape setup and then selects "Photo Copy." Then, the multifunctional video apparatus searches to find still images recorded on the tape in order by automatically performing the FF of the tape, as illustrated in FIG. 61A. If the still image is found, as illustrated in FIG. 61B, the multifunctional video apparatus copies the still image into the memory card. To terminate the copying of the still image, the user pushes the stop button 122-4.

A method of deleting some or all files stored in the memory card will now be described.

Figure 62A:
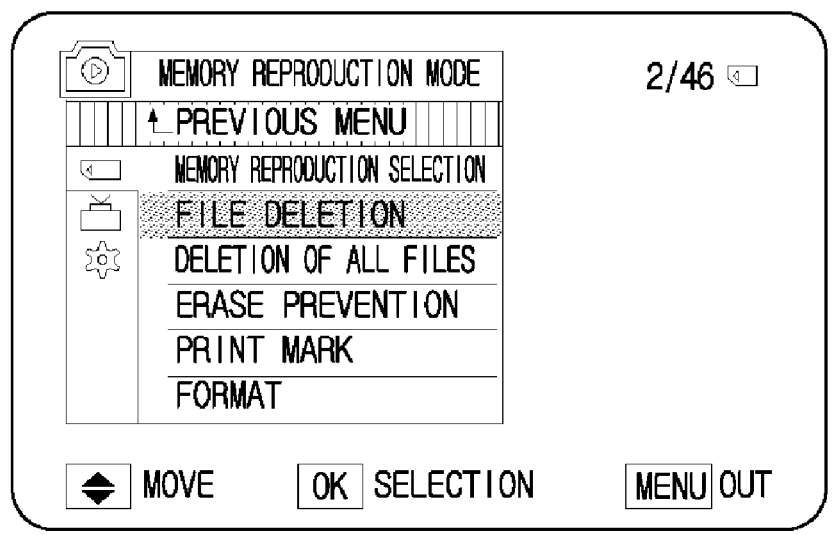
Figure 62B:
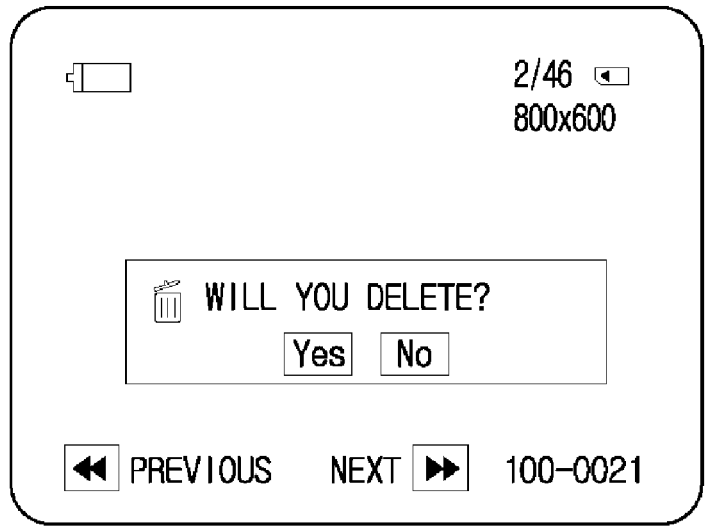

FIGS. 62A and 62B are views illustrating the method of deleting some files stored in the memory card. The user searches an image to be deleted by use of the RW button 122-1 or the FF button 122-2. If the image to be deleted is displayed on the LCD screen 123, the user selects "Memory Setup" in the menu items, and then selects "File Delete" in the "Memory Setup," as illustrated in FIG. 62A. Then, the confirmation expression "Delete?" is displayed on the LCD screen 123, as illustrated in FIG. 62B. The user selects <Yes> or <No> by using the up/down button 125 and the confirmation button 126. If <Yes> is selected, the selected file is deleted, while if <No> is selected, the file deletion is canceled. The user can terminate the file deletion setting function by pushing the menu button 145.

Figure 63A:
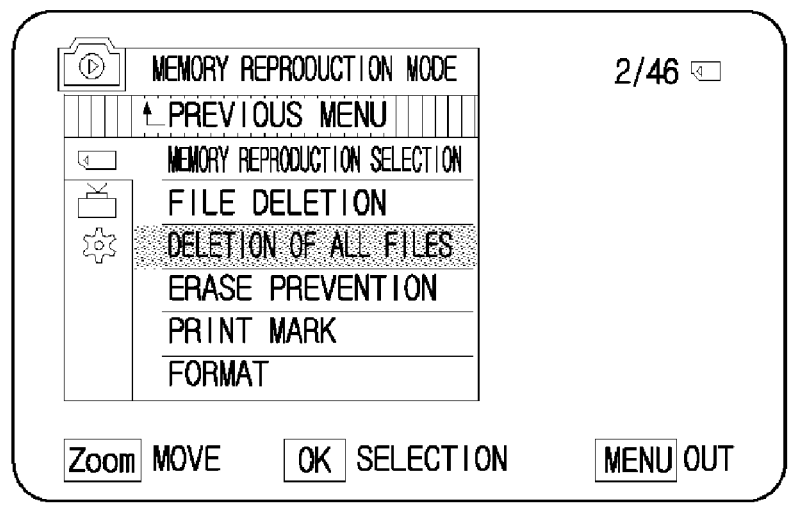
Figure 63B:
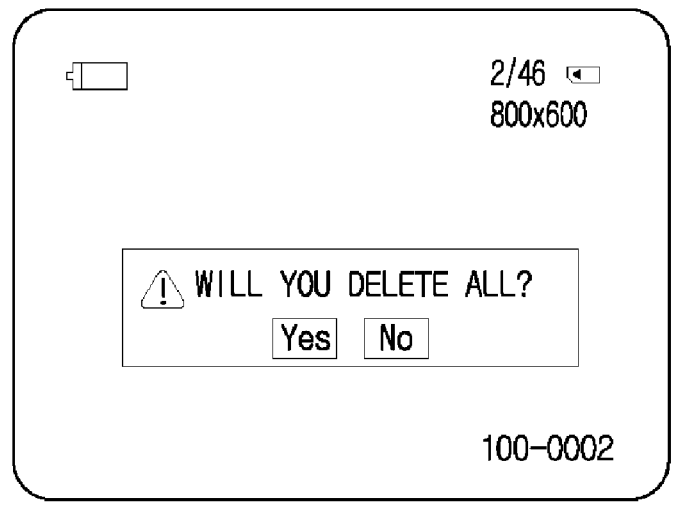

FIGS. 63A and 63B are views illustrating the method of deleting all files stored in the memory card. The user selects "Memory Setup" in the menu items," and then selects "File Delete" in the "Memory Setup," as illustrated in FIG. 63A.

Then, the confirmation expression "Delete?" is displayed on the LCD screen 123, as illustrated in FIG. 63B. The user selects <Yes> or <No> by using the up/down button 125 and the confirmation button 126. If <Yes> is selected, all files are deleted.

Figure 64A:
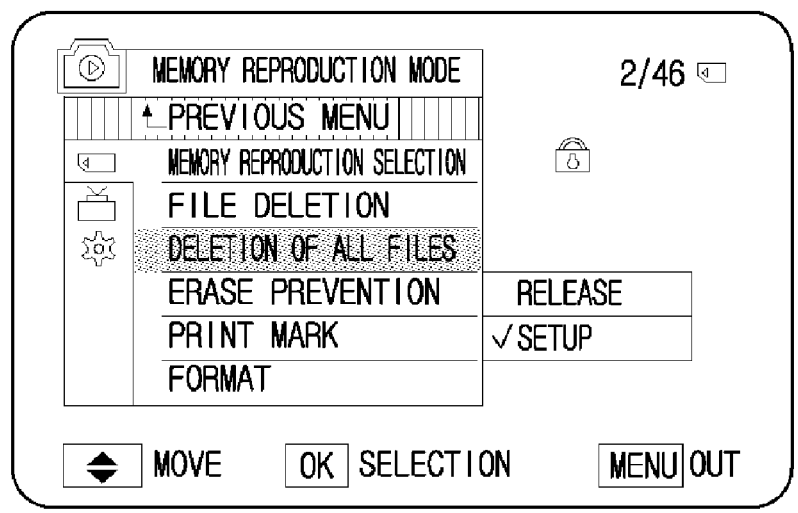
Figure 64B:
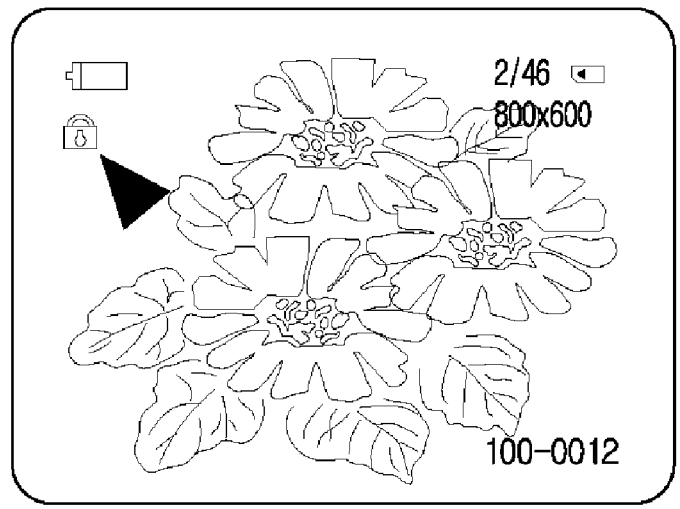

FIGS. 64A and 64B are views illustrating the method of setting the moving picture or still image recorded in the memory card so that it is not deleted. The user searches an image intended to be provided with erase prevention by using the RW button 122-1 or the FF button 122-2. If the image intended to be provided with erase prevention is displayed on the LCD screen 123, the user selects "Memory Setup" in the menu items, and then selects "Erase Prevention" in the "Memory Setup." Sub-items "Release" and "Setup" of the item "Erase Prevention" are displayed on the LCD screen 123, as illustrated in FIG. 64A. The user determines the set of the erase prevention by selecting "Release" or "Setup," and terminates the erase prevention setting function by pushing the menu button 145 down. The "Release" is a function of releasing the erase prevention set to delete the file, while the "Setup" is a function of setting the erase prevention for the image selected on the current LCD screen 123. FIG. 64B illustrates the image that the "Setup" is selected in the "Erase Prevention."

Figure 65A:
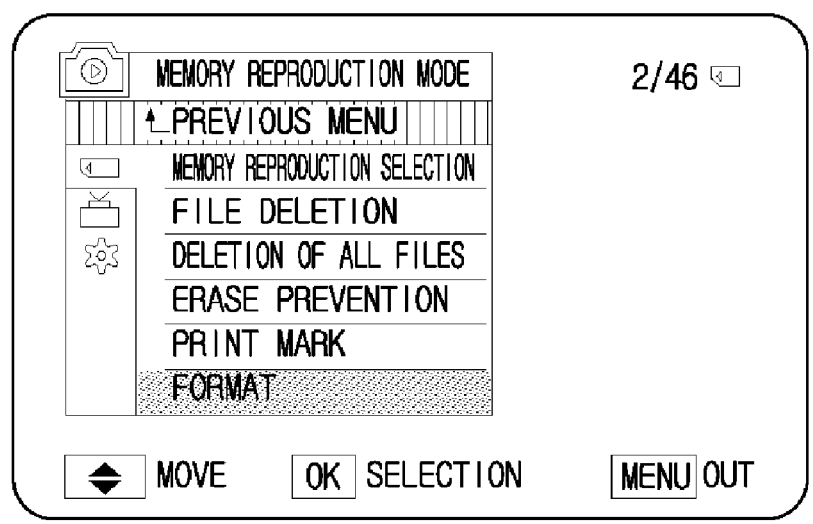
Figure 65B:
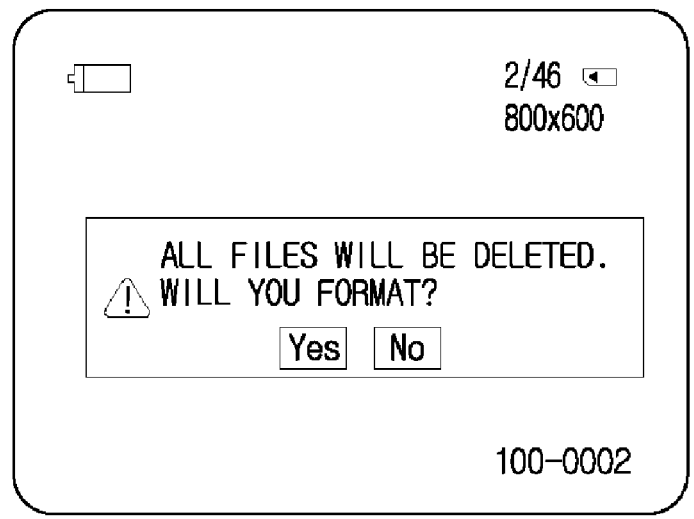

FIGS. 65A and 65B illustrate a method of formatting the memory card. The user selects "Memory Setup" in the menu items, and then selects "Format" in the "Memory Setup." Then, the confirmation expression "All files are deleted. Format?" is displayed on the LCD screen 123, as illustrated in FIG. 65B. The user selects <Yes> or <No> by using the up/down button 125 and the confirmation button 126. If <Yes> is selected, the memory card is formatted, which deletes all files from the memory card.

A method and apparatus of processing the image by using the multifunctional video apparatus will be described.

Figure 66A:
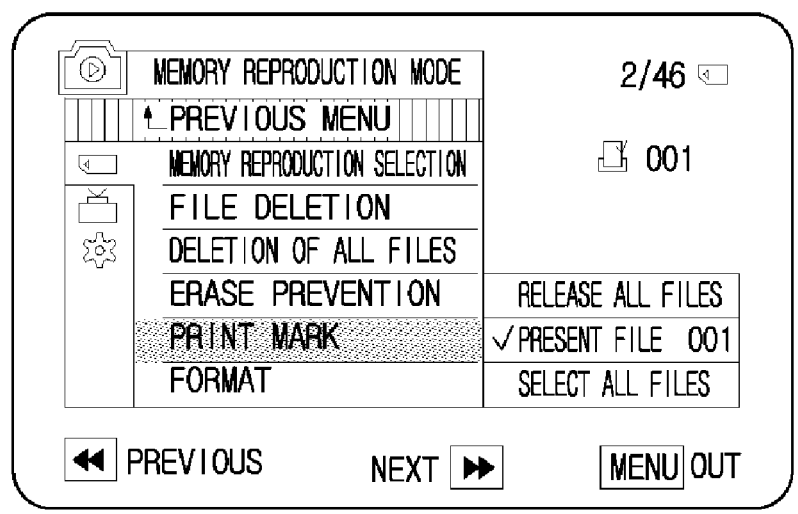
FIGS. 66A to 75 are views illustrating a method of processing an image using the multifunctional video apparatus according to an exemplary embodiment of the present general inventive concept and other external devices.
Figure 66B:
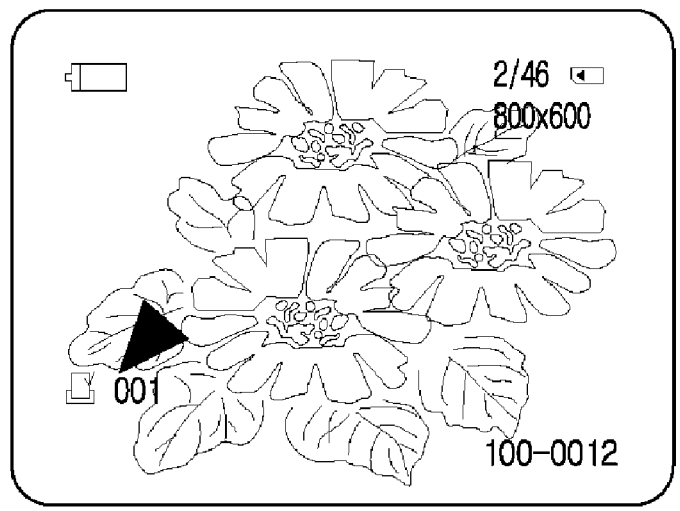

FIGS. 66A and 66B are views illustrating a method of setting a print mark function. The print mark function is a function of storing still image output information in the memory card and designating output sheets. The user searches the still image to be set with the print mark by using the RW button 122-1 or the FF button 122-2. If the still image to be set with the print mark function is displayed on the LCD screen 123, the user selects "Memory Setup" in the menu items, and then selects "Print Mark" in the "Memory Setup." Then, sub-items of the print mark, such as "All File Release," "Current File," and "All File Select," is displayed on the LCD screen 123, as illustrated in FIG. 66A. The user selects any one of the sub-items, and then pushes the menu button 145 to terminate the print mark function setup. The "All File Release" is a function of releasing all set print marks, the "Current File" is a function of setting the print mark on the still image displayed on the current LCD screen 123, and the "All File Select" is a function of setting the print mark on all still images recorded in the memory card.

If the user selects the "Current File" in the sub-items and then selects the printing sheet by using the up/down button 125 and the confirmation button 126, as illustrated in FIG. 66B, an icon corresponding to the print mark setup is displayed on the selected still image. As illustrated in FIG. 66B, the printing sheet is provided as one singular sheet.

Figure 67A:
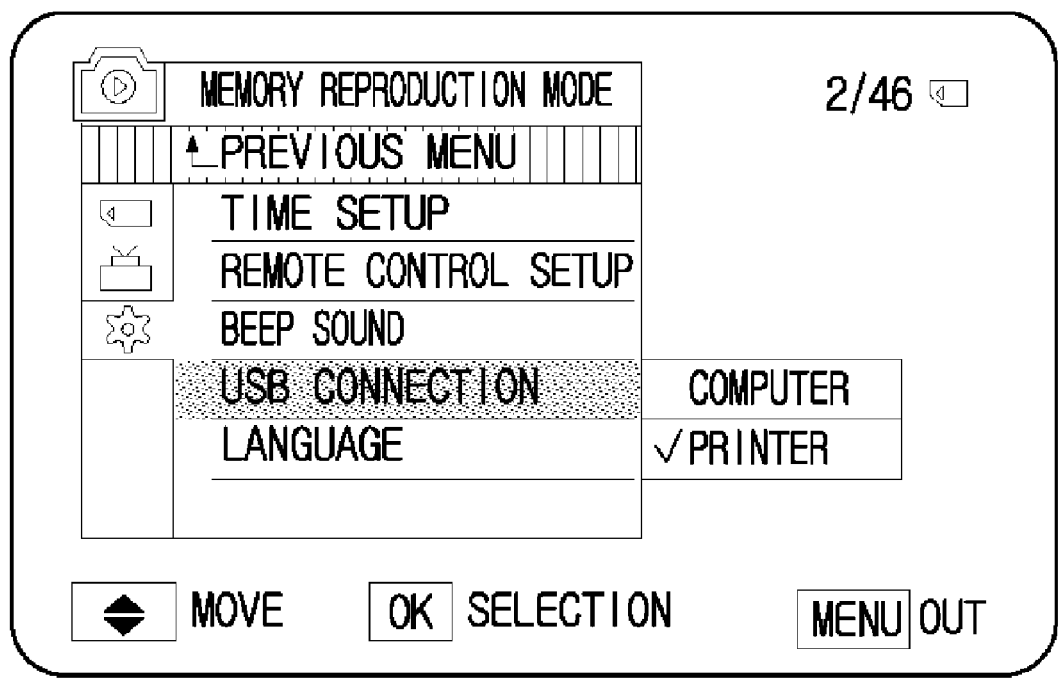

FIGS. 67A to 67E are views illustrating a method of setting a PictBridge function. Herein, the PictBridge function denotes that the still image stored in the memory card built in the multifunctional video apparatus is output by directly connecting the multifunctional video apparatus with a print supporting the direct output via an USB cable. The user selects an initial setup in the menu items, and then selects "USB Connect" in the initial setup. As illustrated in FIG. 67A, the sub-items "Computer" and "Printer" of the "USB Connect" are displayed on the LCD screen 123. The user selects the printer by using the up/down button 125 and the conformation button 126, and then terminates the PictBridge setup by pushing the menu button 145 down.

Figure 67B:
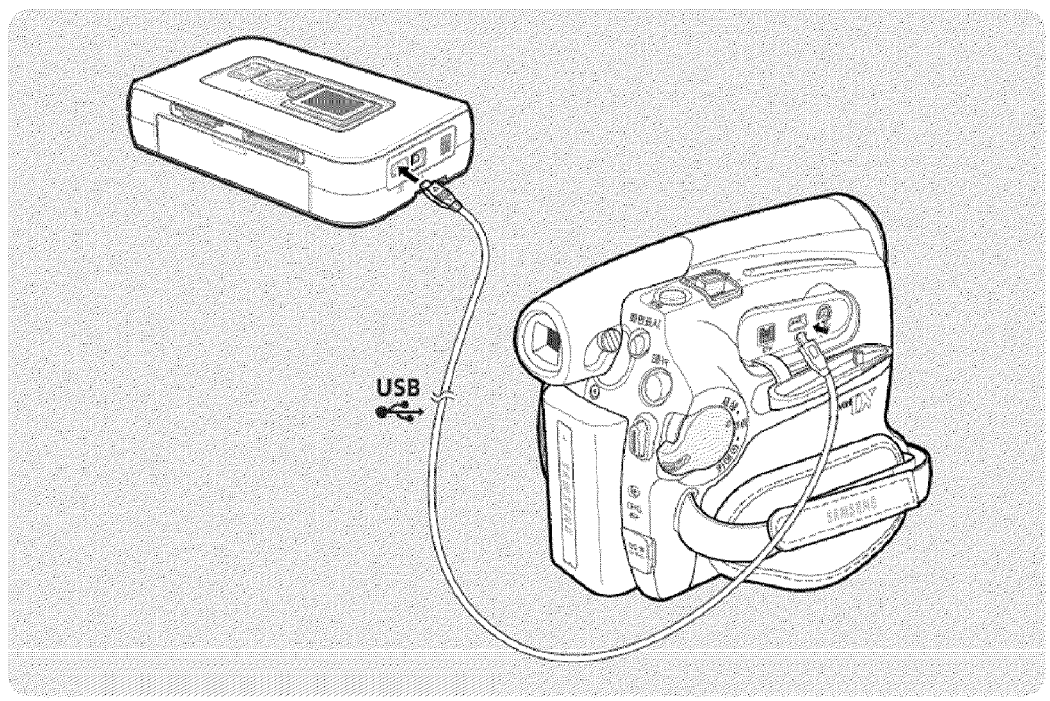

As illustrated in FIG. 67B, the multifunctional video apparatus is connected with the printer by using the USB cable, and then, the printer is turned on.

Figure 67C:
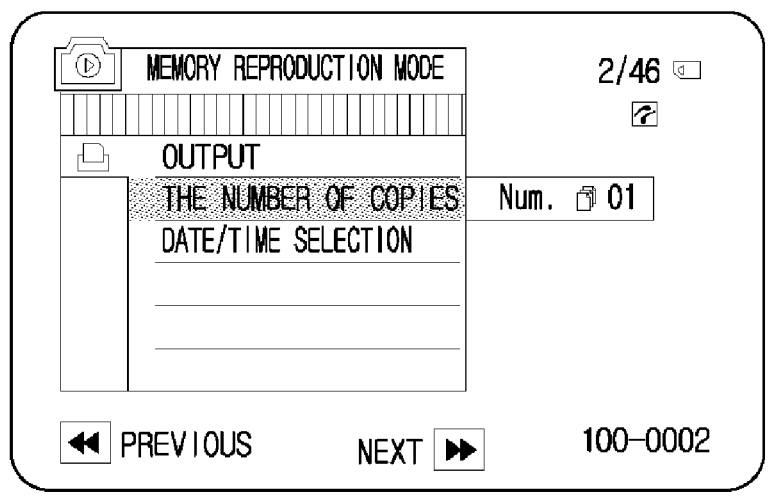
Figure 67D:
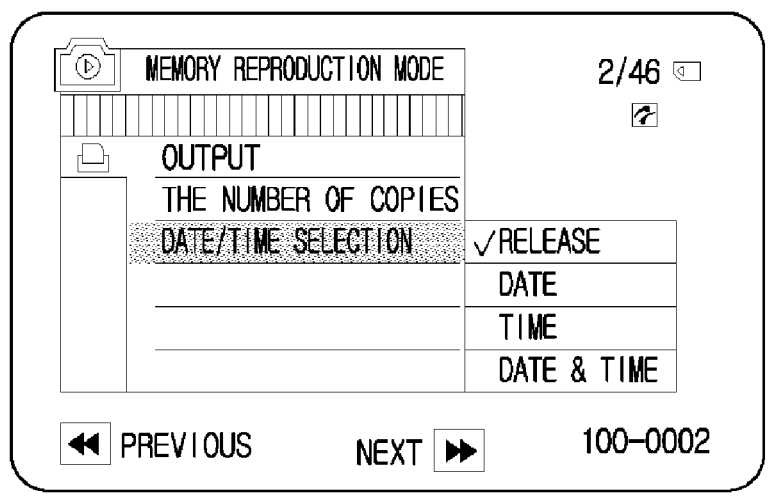
Figure 67E:
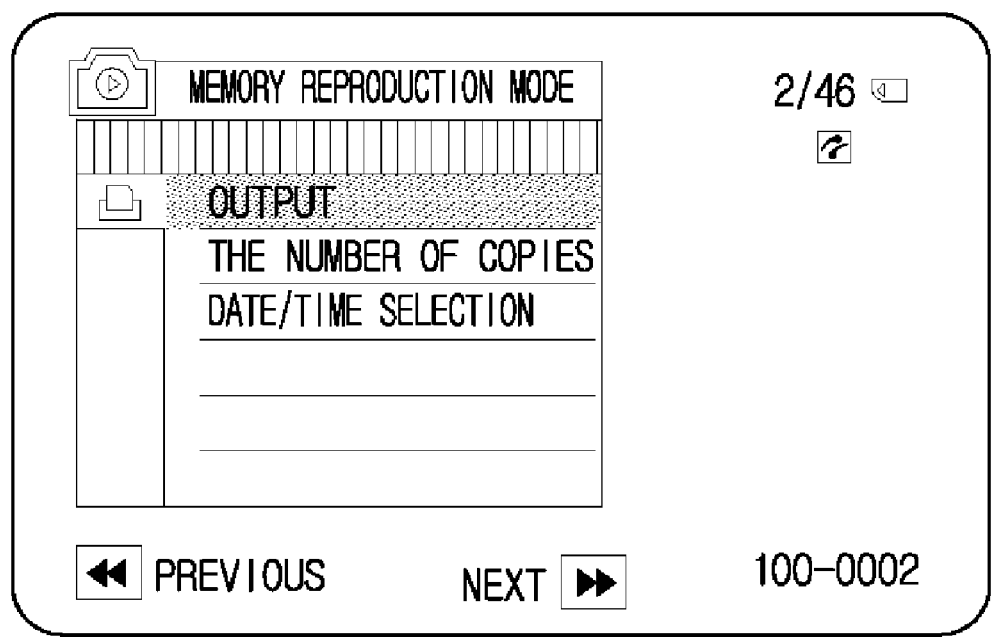

In order to output the still image, the user searches the still image to be output by using the RW button 122-1 or the FF button 122-2. The user determines a number of sheets to be output in the memory setup, and selects "Data/Time Select" to select a display mode of the date/time to be displayed on the still image to be output. Then, the user selects the still image to be output. As illustrated in FIG. 67C, the number of sheets to be output is one. Also, as illustrated in FIG. 67D, the data only is displayed on the image to be output. FIG. 67E is a view illustrating a notification that the output is selected.

Figure 68:
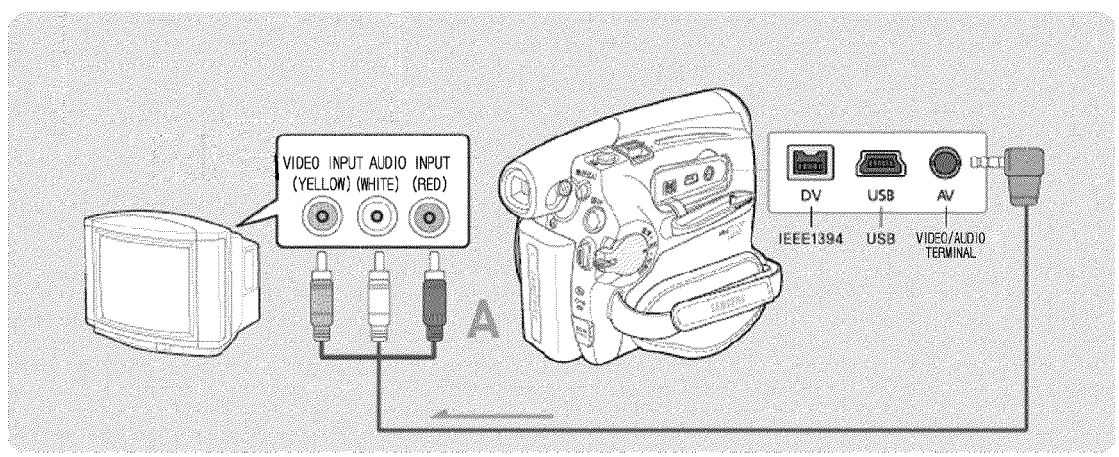

FIG. 68 is a view illustrating a method of connecting the multifunctional video apparatus to a TV having video/audio terminals. Video/audio cables are connected to the AV terminal provided on the side of the multifunctional video apparatus and a video/audio input terminal of the TV. As illustrated in FIG. 68, the video/audio cable terminal and the video/audio terminal on the TV should be connected to correspond to each other by color. However, if the audio input terminal of the TV is provided singularly, a yellow terminal of the video/audio cable may be connected to the image input terminal of the TV, and a white terminal of the video/audio cable may be connected to the audio input terminal of the TV.

To reproduce the image of the tape which is in the multifunctional video apparatus through the TV connected to the multifunctional video apparatus, the user turns on a power of the TV, and then sets a menu of the TV by an external input. After the user selects the power selection switch 148 as reproduction, and selects the AV input/output selection as the output, the user searches the image to be reproduced by using the RW button 122-1 or the FF button 122-2. If the image to be reproduced is displayed on the LCD screen 123 of the multifunctional video apparatus, the user pushes the play/pause button 122-3 to reproduce the image. To stop the reproduction, the user pushes the stop button 122-4.

Figure 69:
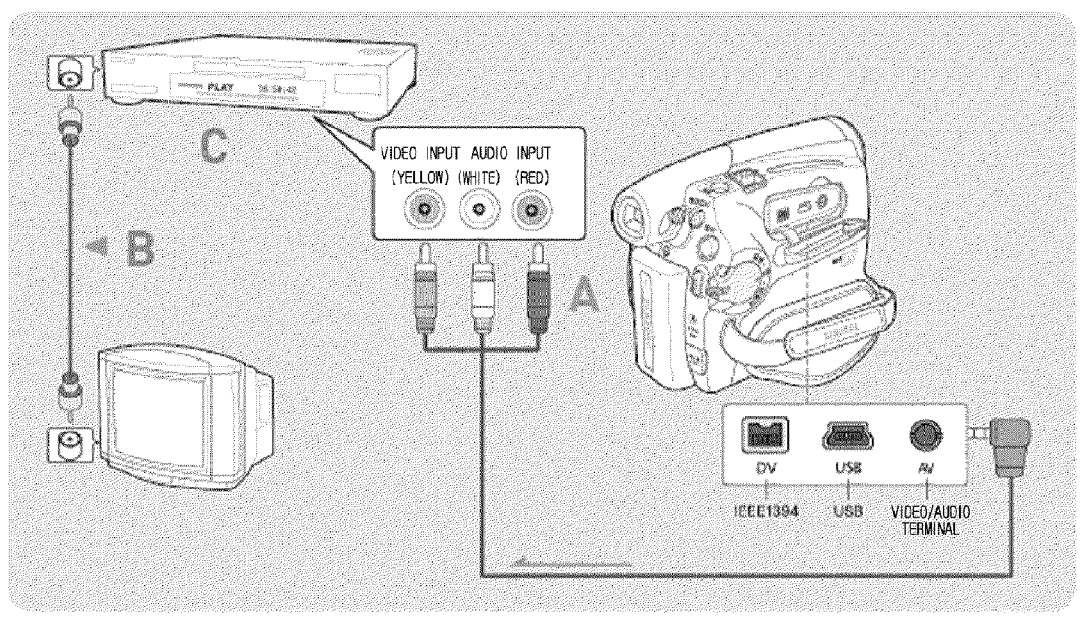

FIG. 69 is a view illustrating the method of connecting the multifunctional video apparatus with a TV having no video/audio terminal. In the case where the TV does not have the video/audio terminal, the multifunctional video apparatus is connected with the TV by using a video player, as illustrated in FIG. 69. The video/audio cable is connected to the AV terminal of the multifunctional video apparatus and the video/audio input terminal of the video player, and a coaxial cable is connected to the video player and the TV. Input selection of the video player may be selected as an external input.

To reproduce the image of the multifunctional video apparatus, after the user turns on the powers of the TV and video player, the user selects the channel of the TV as a channel used at seeing and hearing the video. The user selects the power selection switch 148 of the multifunctional video apparatus as playback, and searches to find the image to be reproduced by using the RW button 122-1 or the FF button 122-2. If the image to be reproduced is displayed on the LCD screen of the multifunctional video apparatus or the TV screen, the user pushes the image by pushing the play/pause button 122-3.

Figure 70:
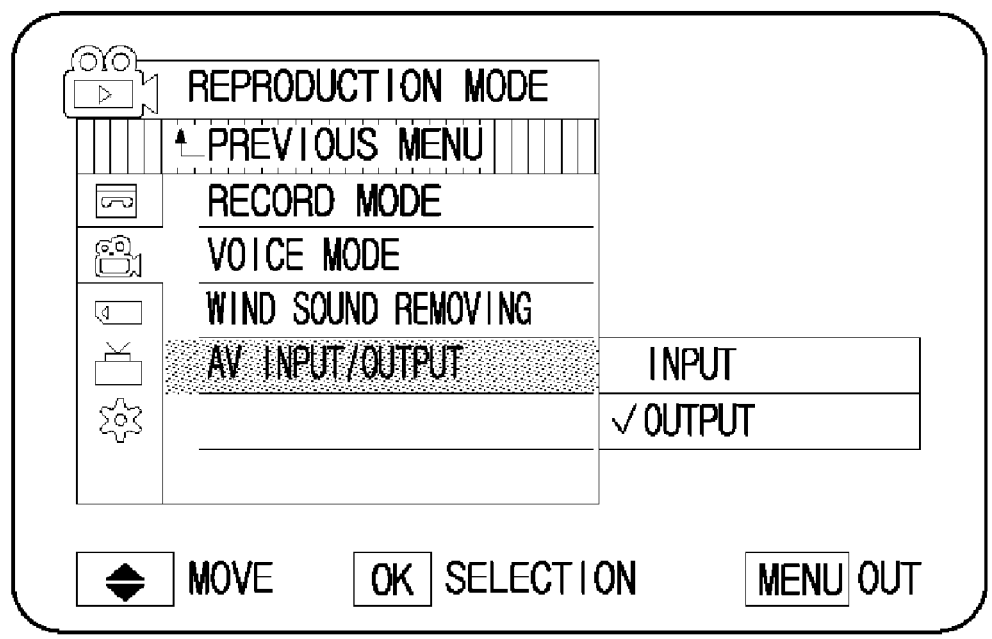

The image output from the TV can be recorded in the multifunctional video apparatus by connecting the TV to the multifunctional video apparatus. Firstly, the user turns on the power of the TV, and selects a program to be recorded. The user selects "Recording Setup" in the menu items of the multifunctional video apparatus, and then "AV Input/Output" in the "Recording Setup." As illustrated in FIG. 70, sub-items "Output" and "Input" of the "AV Input/Output" are displayed on the LCD screen 123, and the user selects "Output" by using the up/down button 125 and the confirmation button 126. Thus, the image output from the TV is recorded in the multifunctional video apparatus.

Figure 71:
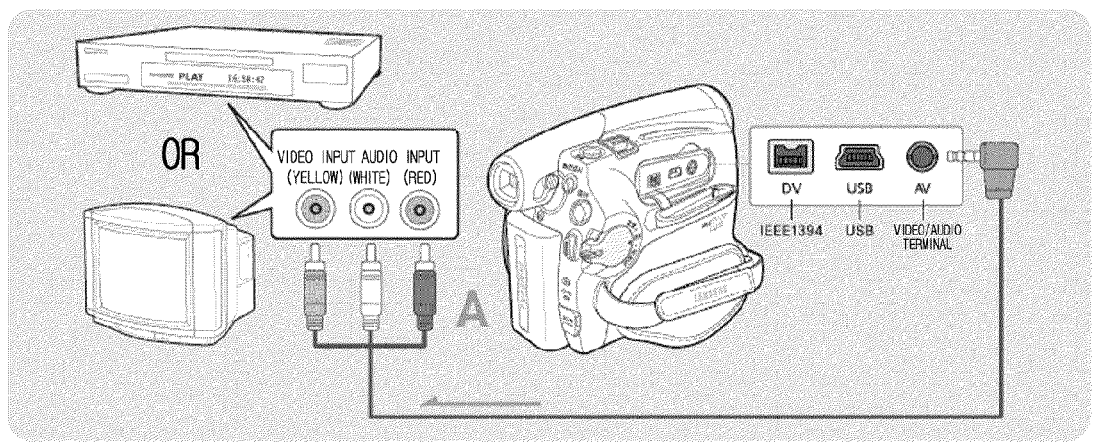

FIG. 71 is a view illustrating a voice plus function. Herein, the voice plus function signifies that an audio signal input via a microphone of the multifunctional video apparatus is reproduced or stored together with the video signal, instead of an audio signal recorded in the recording medium of the multifunctional video apparatus. First, the user connects the multifunctional video apparatus with the video player or the TV.

When the TV does not have the video/audio terminal, as illustrated in FIG. 69, the multifunctional video apparatus is connected with the TV by using the video player. The video/audio cable is connected to the AV terminal of the multifunctional video apparatus and the video/audio input terminal of the video player. The video/audio cable connecting method is the same illustrated in FIG. 68. The coaxial cable is connected to the video player and the TV. Input selection of the video player may be selected as an external input.

Also, to reproduce the image of the multifunctional video apparatus, after the user turns on the power of the TV and video player, the user selects a channel of the TV as a channel used to see and hear the video. The user selects the power selection switch 148 of the multifunctional video apparatus as playback, and searches to find the image to be reproduced by using the RW button 122-1 or the FF button 122-2. If the image to be reproduced is displayed on the LCD screen of the multifunctional video apparatus or the TV screen, the user reproduces the image by pushing the play/pause button 122-3.

An image of the multifunctional video apparatus can be copied to a video tape. The multifunctional video apparatus, the video player, and the TV may be connected to each other, as illustrated in FIG. 69. In order to copy the image of the multifunctional video apparatus to the video tape, after the user turns on the power of the TV and video player, the user selects the channel of the TV as a channel used to see and hear the video. The user selects the video as an external input by using the input selection button of the video. After the user selects the power selection switch 148 of the multifunctional video apparatus as playback, and searches the image to be copied by using the RW button 122-1 or the FF button 122-2. If the image to be copied is displayed on the LCD screen 123 or the viewfinder 130, the user copies the image to the video tape by pushing the play/pause button 122-3 and a recording button of the video player.

Figure 72:
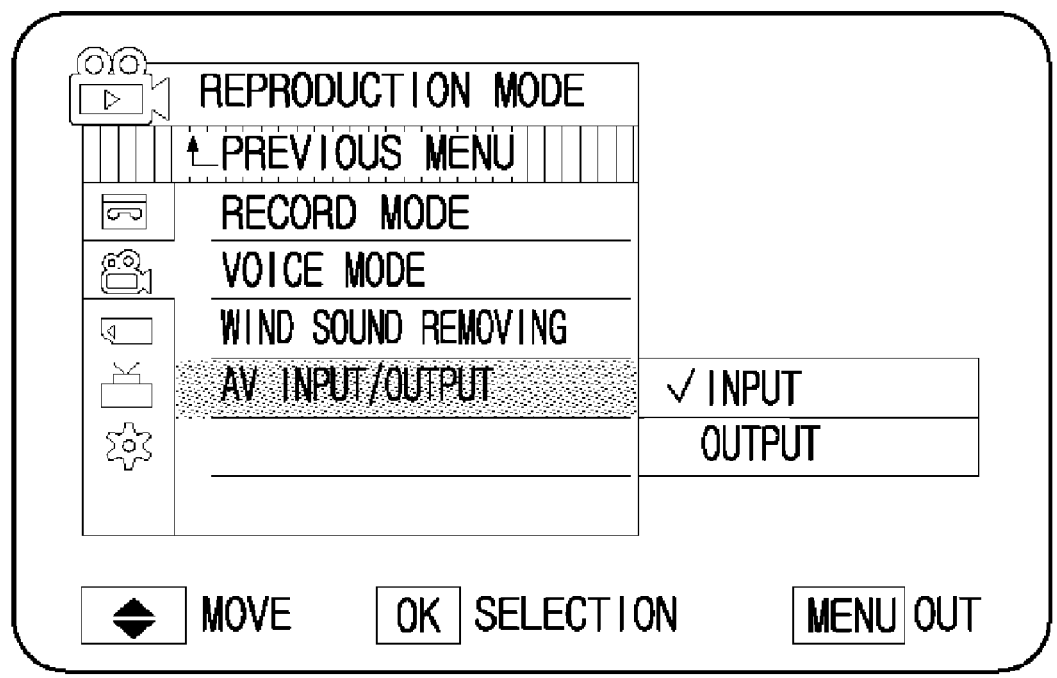

The image of the video player may also be copied to the multifunctional video apparatus. FIG. 72 is a view illustrating the method of copying the image of the video player to the multifunctional video apparatus. As illustrated in FIG. 72, the user selects the recording setup among menu items, and then selects "AV Input/Output" in the recording setup. Then, the sub-items "Output" and "Input" of the AV input/output are displayed on the LCD screen 123. The user selects "Input," and pushes the menu button 145 to stop the setup for the AV input. The user reproduces the video, and pushes the filming start/stop button 146 to start to record the image.

Figure 73:
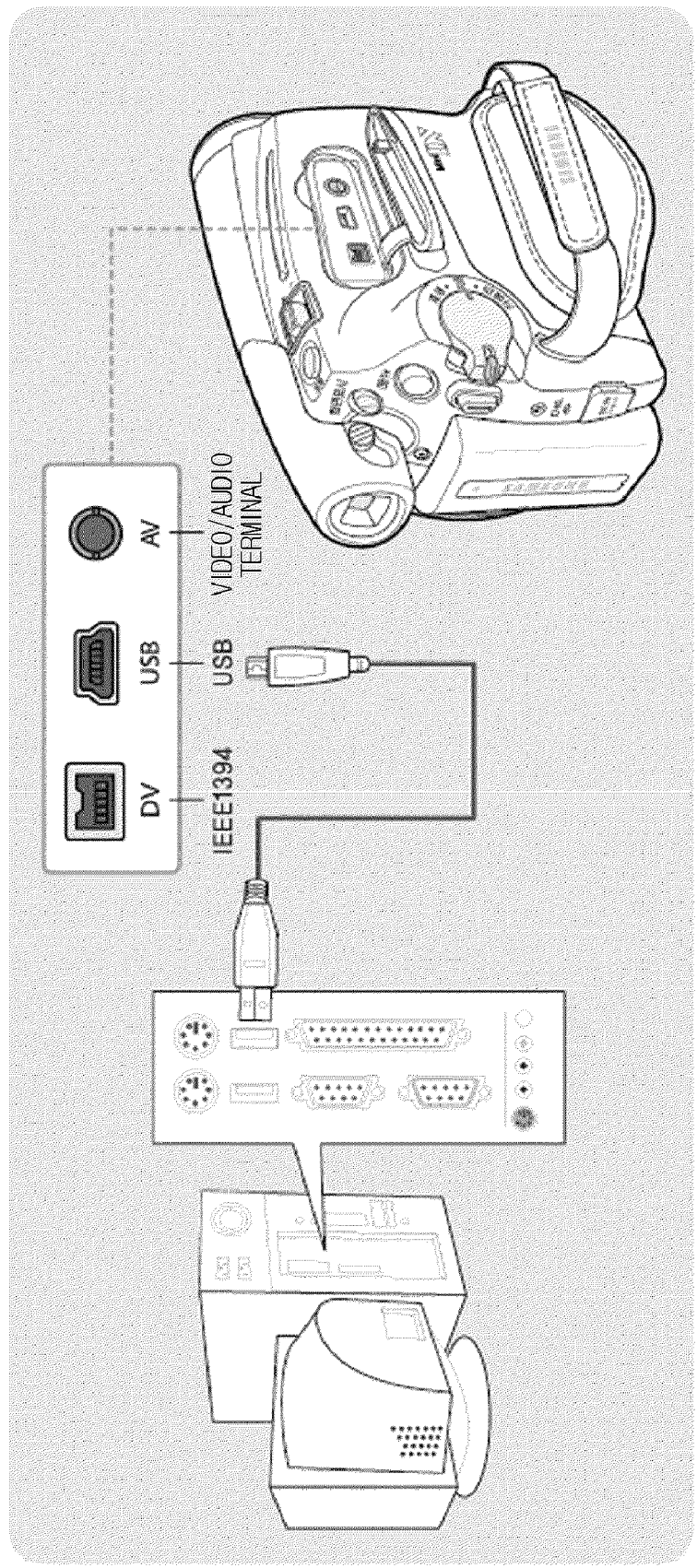

FIG. 73 is a view illustrating a method of connecting the multifunctional video apparatus with a personal computer. The multifunctional video apparatus and the personal computer are connected to each other via a USB cable. A large jack of the USB cable is connected to the USB terminal of the personal computer, while a small jack of the USB cable is connected to the USB terminal of the multifunctional video apparatus. By connecting the multifunctional video apparatus with the personal computer, the multifunctional video apparatus may be used as a personal computer, a portable disc, or a USB image transmitter. In order to use the multifunctional video apparatus through the personal computer, after the user selects the initial setup in the menu items and selects "USB Connect" in the initial setup, "Computer" is selected in "USB Connect" to terminate the computer setup.

Figure 74:
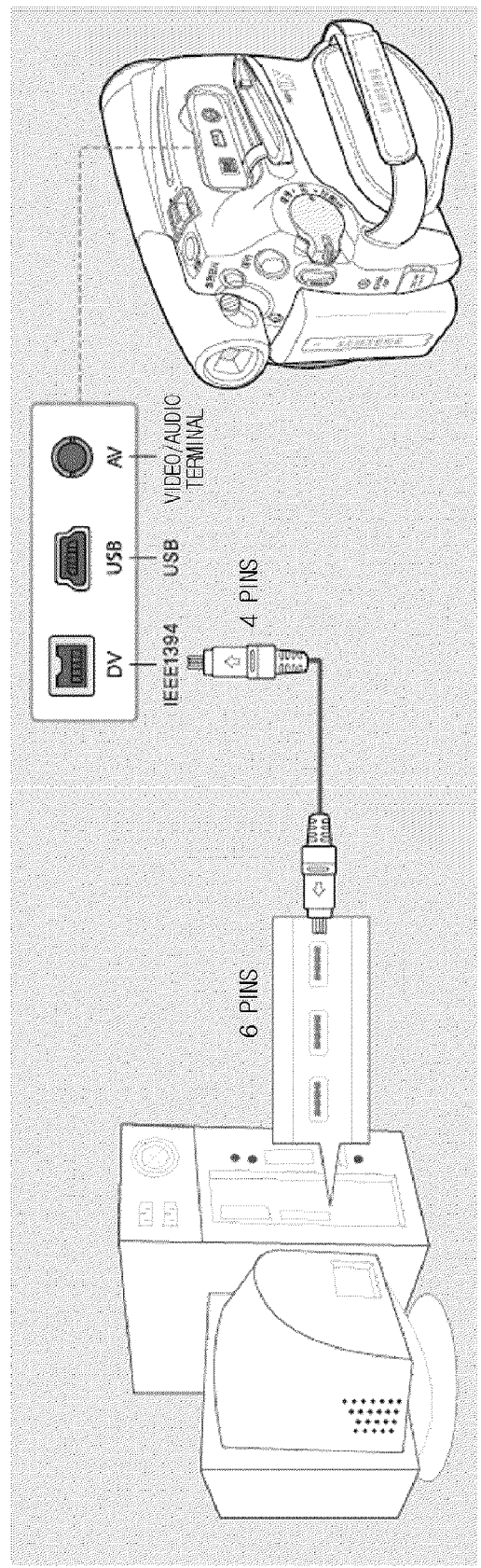

FIG. 74 is a view illustrating a method of connecting the multifunctional video apparatus with the personal computer via a 6 pins-4 pins DV cable. As illustrated in FIG. 74, four pins of the DV cable are connected to the DV terminal of the multifunctional video apparatus, while six pins of the DV cable are connected to the personal computer.

Figure 75:
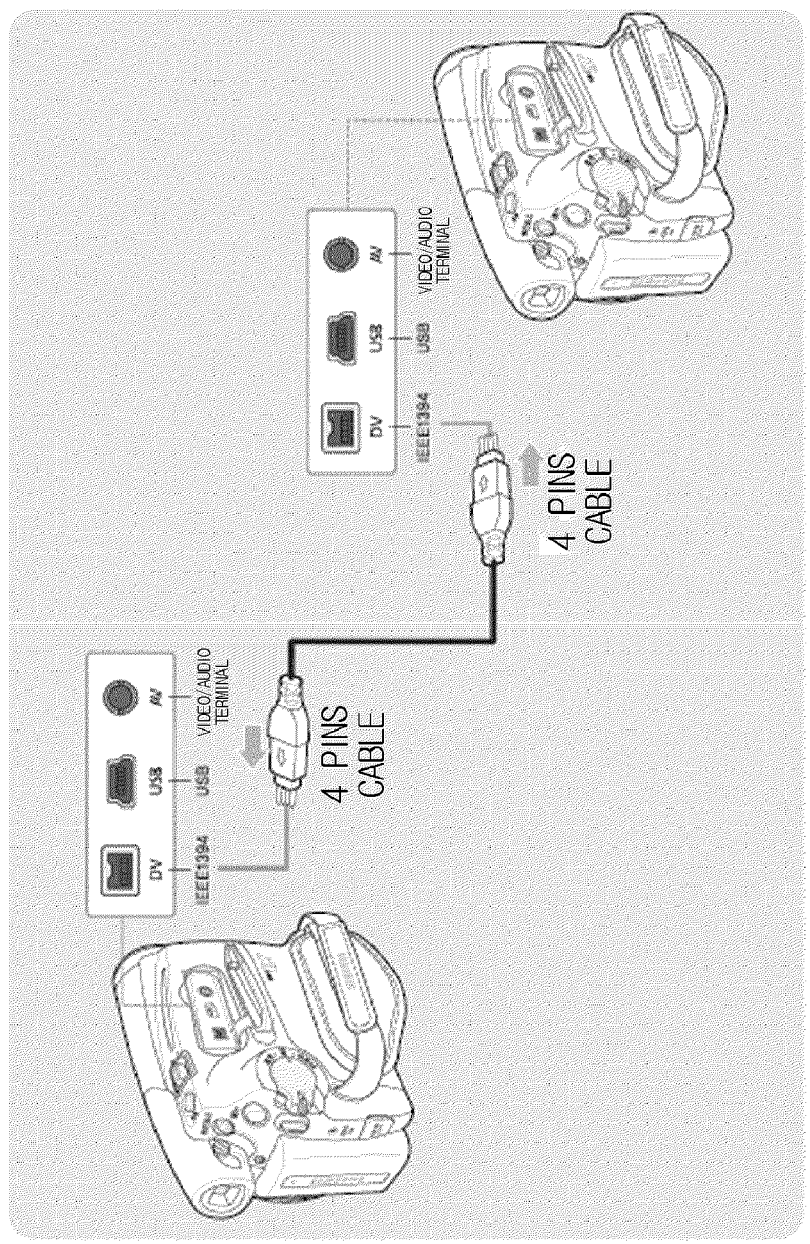

FIG. 75 is a view illustrating a method of connecting the multifunctional video apparatus with another multifunctional video apparatus of the same type, via a 4 pins-4 pins DV cable. As illustrated in FIG. 75, each of the four pins of the DV cable is connected to each DV terminal of each of the corresponding multifunctional video apparatuses. to transmit the image stored in the another multifunctional video apparatus to the multifunctional video apparatus, after the user connects the multifunctional video apparatuses via the DV cable, the user pushes the filming start/stop button 146 of the multifunctional video apparatus to put the multifunctional video apparatus in a recording standby state. The user pushes the playback button of the another multifunctional video apparatus to reproduce the image. If the image to be recorded is displayed on the LCD screen 123, the user pushes the filming start/stop button 146 of the multifunctional video apparatus. To temporarily stop the recording, the user pushes the filming start/stop button 146 of the multifunctional video apparatus. To totally stop the recording, the user pushes the stop button 122-4.

Figure 80:
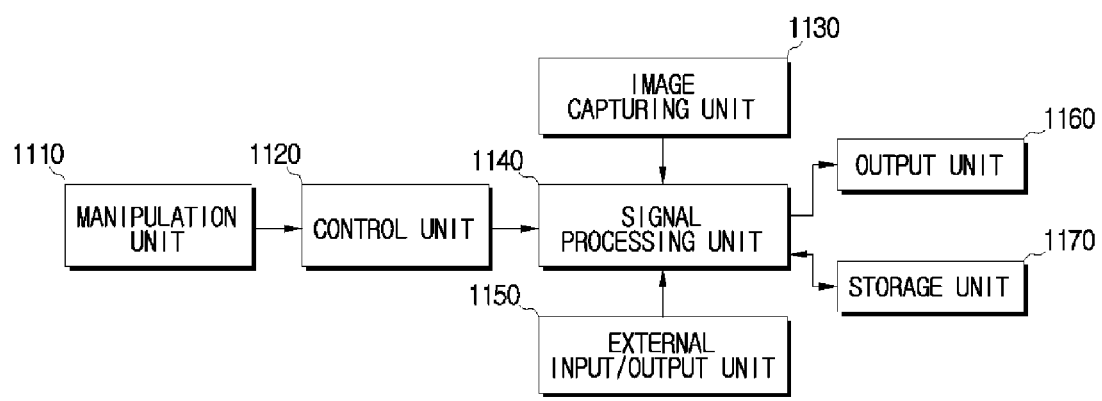
FIG. 80 is a block diagram illustrating an internal construction of the multifunctional video apparatus according to an exemplary embodiment of the present general inventive concept.

A remote controller, which is a type of a manipulating part 1110, as illustrated in FIG. 80, of the multifunctional video apparatus, will now be described.

Figure 76:
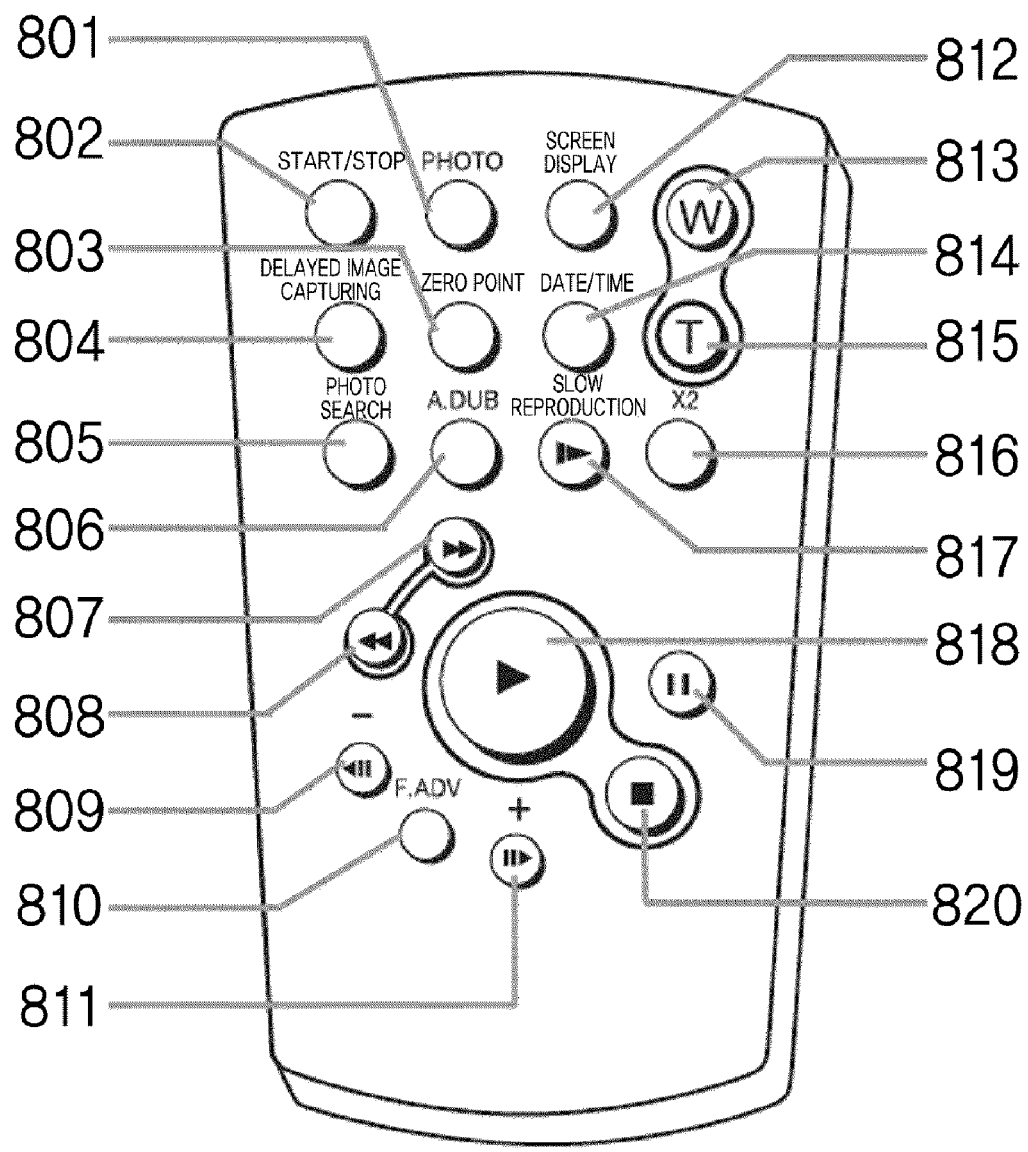
FIGS. 76 to 79 are views illustrating a remote controller according to an exemplary embodiment of the present general inventive concept.

FIG. 76 is a view illustrating the remote controller applied to the multifunctional video apparatus. The remote controller includes a still image (i.e., photo) button 801, a filming start/stop button 802, a null-point memory button 803, a delay filming button 804, a still image (i.e., photo) search button 805, an audio edit (A.DUB) button 806, a FW button 807, a RW button 808, an reverse slow playback/reverse frame advance button 809, a frame advance button 810, a forward slow playback/forward advance button 811, a screen display button 812, a zoom-out button 813, a date/time button 814, a zoom-in button 815, a double speed playback button 816, a slow playback button 817, a playback button 818, a pause button 819, and a stop button 820.

When names of buttons provided on the remote controller are identical to those of buttons provided on the multifunctional video apparatus, inherent function of the remote controller will now be described since the functions thereof are substantially identical to each other.

The user can reproduce the moving picture in unit of one frame by using the remote controller. First, the user reproduces the moving picture by pushing the playback button, and temporarily stops the specific image by pushing the pause button 819. The user reproduces the moving picture in unit of one frame in a forward or reverse direction by using the forward frame advance button 811 or the reverse frame advance button 809. To reproduce the moving picture that is reproduced in unit of one frame at a normal speed, the user pushes the playback button 813.

Also, the user can reproduce the moving picture slowly relative to a normal reproducing speed. First, the user reproduces the moving picture by pushing the playback button, and then, reproduces the moving picture slowly in a forward or reverse direction by pushing the slow playback button 817, the forward slow playback button 811, or the reverse slow playback button 809. The reverse slow playback button 809 is a button used when the moving picture to be forwardly reproduced at a normal speed is reversely reproduced at a slow speed. The forward slow playback button 811 is a button used when the moving picture to be reversely reproduced at a normal speed is forwardly reproduced at a slow speed.

Also, when the user reproduces the moving picture at a double speed, the user can reproduce the moving picture in a forward direction at a double speed by pushing the double speed playback button 816. When the user reproduces the moving picture that is forwardly reproduced, reversely at a double speed, the user pushes the reverse frame advance button 809. Again, to allow the user to reproduce the moving picture in a forward direction at a double speed, the user pushes the forward frame advance button 811.

Figure 77:
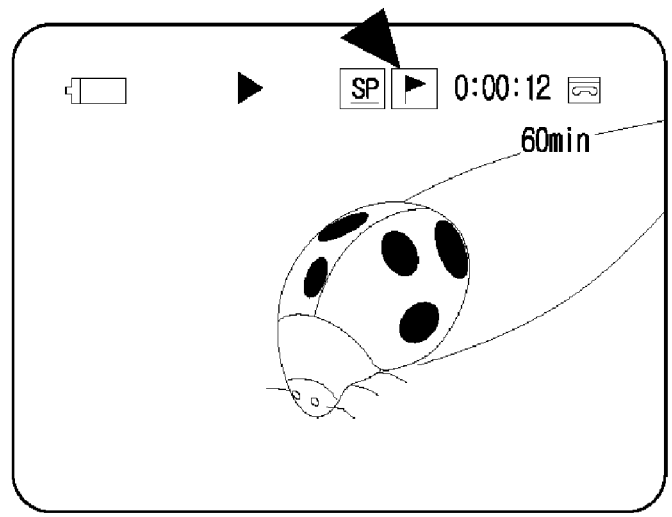

FIG. 77 is a view illustrating a method of setting a zero point remembering function. The zero point remembering function includes a function of remembering a position of a specified image as "0" value of a counter. The user can set the zero point remembering function during image capturing by pushing a zero point remembering button 803 just before the image capturing starts. Then, as illustrated in FIG. 77, the zero point memory icon 321 corresponding to the zero point remembering mark is displayed, and the counter is reset to <0:00:00>. As the image capturing starts through the pushing of the image capturing start/stop button 802, the counter begins to count. If the power selection switch 148 is switched to "Reproduction" and the RW button 808 is pushed after the image capturing is completed, the tape mounted in the multifunctional video apparatus is rewound to make the value of the counter return to <0:00:00>.

In contrast, if it is intended to set a specified image as the zero point during the reproduction of the image, the user pushes the zero point remembering button 803. If the RW button 808 is pushed after the reproduction is completed, the tape is rewound to the position of the image which was set as the zero point.

Figure 78:
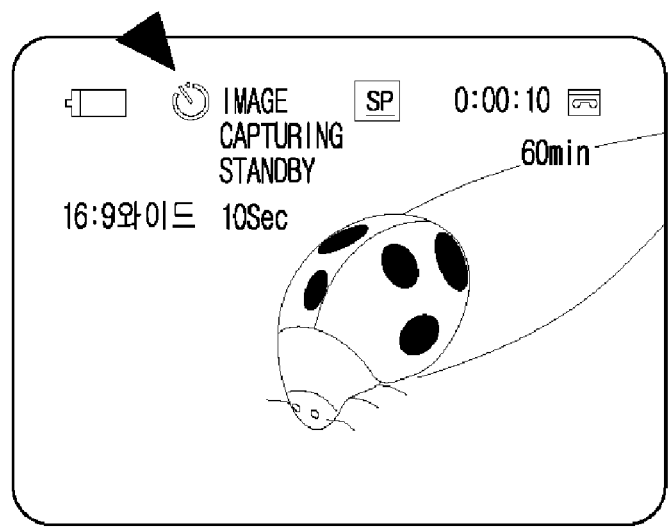

FIG. 78 is a view illustrating a delayed image capturing method. If the user intends to delay the image capturing start time corresponding to a predetermined time (e.g., 10 seconds) using a delayed image capturing function of a remote controller, the user pushes the delayed image capturing button 804 of the remote controller. Then, as illustrated in FIG. 78, the photo image capture icon 329 corresponding to a delayed image capturing mark is displayed on the LCD screen 123, and if the image capturing start/stop button 802 of the remote controller is pushed, the image is captured after the lapse of the predetermined time. If the image is captured, the icon corresponding to the delayed image capturing may disappear from the LCD screen 123.

Figure 79:
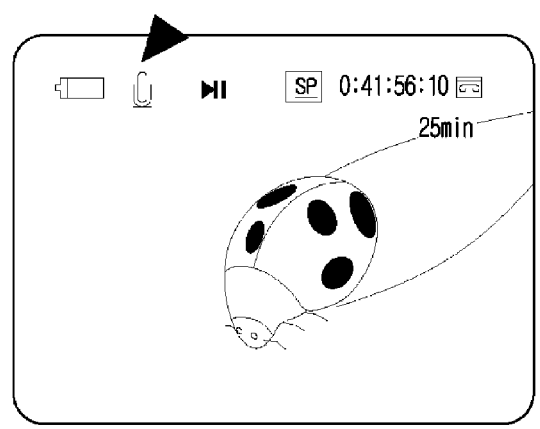

FIG. 79 is a view illustrating a voice editing method to dub voice or background music on an already captured image. The user searches to find the image to be dubbed using the reproduction button 818, the pause button 819, the RW button 808, and the FF button 807. The user gives pause to the image by pushing the pause button 819, and pushes the voice editing button 806 of the remote controller. Then, as illustrated in FIG. 79, the voice editing icon 416 corresponding to a voice editing mark is displayed on the LCD screen 123, and the multifunctional video apparatus is in a dubbing standby state. Thereafter, if the user pushes the reproduction button 818, the dubbing is performed. If the user desires to stop the voice editing, the user pushes the stop button 820.

When the multifunctional video apparatus is not in use, the user may remove the tape from the multifunctional video apparatus and may make the power selection switch be in a turned-on state. In addition, the power supply unit and the battery pack 149 may be separated from the multifunctional video apparatus to separately store the power supply unit, battery pack 149, and the multifunctional video apparatus.

FIG. 80 is a block diagram illustrating the internal construction of the multifunctional video apparatus as described above. As illustrated in FIG. 80, the multifunctional video apparatus according to an embodiment of the present general inventive concept including a manipulation unit 1110, a control unit 1120, an image capturing unit 1130, a signal processing unit 1140, an external input/output unit 1150, an output unit 1160, and a storage unit 1170.

The manipulation unit 1110 receives and transfers a user's manipulation command to the control unit 1120 to be described later. The manipulation unit may correspond to function buttons 122, quick button, up/down button 125, confirmation button 126, the mode selection switch 128, the image capturing start/stop button 146, screen display button 144, and the remote controller and the remote controller receiving unit 112.

The control unit 1120 controls the operations of the image capturing unit 1130, the signal processing unit 1140, the external input/output unit 1150, and the storage unit 1170, so that various operations according to the user's manipulation command input through the manipulation unit 1110 is performed.

The image capturing unit 1130 may correspond to the lens 111 and the built-in microphone 116, which transfer the still image or moving image generated by perform the photo/moving image capturing to the signal processing unit 1140 to be described later.

The external input/output unit 1150 may correspond to an external input terminal that applies the image received from an external device (e.g., a PC, TV, video, etc.) to the signal processing unit 1140 or the storage unit 1170, or applies the image output from the signal processing unit 1140 to the external device. The signal processing unit 1140 processes the still image, moving image, voice, etc., and stores the processed images and voice in the storage unit 1170. The above-described tape and memory card correspond to the storage unit 1170.

In addition, the signal processing unit 1140 reproduces the still image, moving image, music, voice, etc., stored in the storage unit 1170, and transfers the reproduced images, music, and voice sounds to the output unit 1160.

The output unit 1160 outputs the still image, moving image, music, and voice sounds transferred from the signal processing unit 1140 to the user. The above-described LCD screen 123, viewfinder 130, and built-in speaker correspond to the output unit 1160.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Other video devices may be added to the multifunctional video apparatus, and using the above-described user interfaces, the user can use the multifunctional video apparatus more conveniently.

As described above, according to an embodiment of the present general inventive concept, the user can use the multifunctional video apparatus, which operates in many modes and provides many functions, through simple manipulation, and superior visual effects can be provided through the multifunctional video apparatus.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image capturing and reproducing apparatus, comprising:
    a main body;
    a storage unit to store a captured image;
    a mode determining unit to select a mode of the image capturing and reproducing apparatus; and
    a display unit rotatively connected to the main body, comprising:
        an LCD screen to display the captured image and a quick menu including frequently set items among a plurality of menu items included in a general menu according to the mode selected by the mode determining unit, and
        a control button to perform at least two control functions according to the mode selected by the mode determining unit,
    wherein if the mode selected by the mode determining unit is an image capturing mode, the control button operates to perform zoom-in or zoom-out of an object and if the mode selected is an image reproduction mode, the control button operates to increase or decrease the volume of sound corresponding to the captured image.

2. An image capturing and reproducing apparatus, comprising:
    a main body;
    a mode determining unit to select a mode of the image capturing and reproducing apparatus; and
    a display unit rotatively connected to the main body, comprising:
        an LCD screen to display the captured image, and
        a quick menu button to display a quick menu including frequently set items among a plurality of menu items included in a general menu according to the mode selected by the mode determining unit,
    wherein the general menu includes a greater number of menu items than the quick menu, and
    wherein if the mode selected by the mode determining unit is an image capturing mode, the control button operates to perform zoom-in or zoom-out of an object and if the mode selected is an image reproduction mode, the control button operates to increase or decrease the volume of sound corresponding to the captured image.

3. The apparatus of claim 2, wherein if the mode selected by the mode determining unit is an image capturing mode, the quick menu button operates to display a menu used to perform image capturing; and
    if the mode selected is an image reproduction mode, the quick menu button operates to display a menu used to perform image reproduction.

4. A method of displaying a recording medium of an image capturing and reproducing apparatus having a first recording medium and a second recording medium, the method comprising:
    selecting the first recording medium or the second recording medium;
    displaying a recording medium icon corresponding to the selected recording medium;
    selecting an image capturing mode or an image reproduction mode of the image capturing and reproducing apparatus; and
    displaying an icon corresponding to the selected mode on a display unit rotatably connected to a main body of the image capturing and reproducing apparatus, such that the display unit further comprises: a LCD screen, and
    a quick menu button to display a quick menu including frequently set items among a plurality of menu items included in a general menu according to the mode selected,
    wherein the general menu includes a greater number of menu items than the quick menu.

5. A method of simultaneously controlling an image and a sound of an image capturing device, the method comprising:
    inputting an image and voice control command during capturing of an image by pushing a fade button during an image capturing operation;
    controlling the captured image to become dark gradually and simultaneously controlling the sound to become gradually less audible based the image and the voice control command while maintaining the capturing of the image; and
    restoring the present operation state to the operation state before the fade button is pushed by controlling the image to become bright gradually and simultaneously controlling the voice to become loud gradually if the pushing of the fade button is stopped.

6. A non-transitory computer readable recording medium having embodied thereon a computer program to execute a method for a multifunctional image recording and playback device, wherein the method comprises:
    selecting a first recording medium or a second recording medium;
    displaying a recording medium icon corresponding to the selected recording medium;
    selecting an image capturing mode or an image reproduction mode of an image capturing and reproducing apparatus; and
    displaying an icon corresponding to the selected mode on a display unit rotatably connected to a main body of the multifunctional image recording and playback device, such that the display unit further comprises:
    a LCD screen, and
    a quick menu button to display a quick menu including frequently set items among a plurality of menu items included in a general menu according to the mode selected,
    wherein the general menu includes a greater number of menu items than the quick menu.

7. An image capturing and reproducing apparatus, comprising:
- a mode selection unit to select between a mode of capturing an image onto at least one of a plurality of recording media and a mode of reproducing another image from at least one of the plurality of recording media;
- a display unit to display the image being captured or the reproduced another image and to display an icon corresponding to the selected mode, and
- a fade button to gradually darken and brighten the captured image and to simultaneously adjust a volume of sound corresponding to the captured image while maintaining capturing of the image.

8. The image capturing and reproducing apparatus of claim 7, wherein the display unit further displays an indicator corresponding to the selected mode.

9. The image capturing and reproducing apparatus of claim 7, wherein the mode selection unit further comprises:
- a power selection switch to select between an image capturing mode and an image reproducing mode; and
- a mode selection switch to select one of the plurality of recording media.

10. The image capturing and reproducing apparatus of claim 9, wherein the plurality of recording media comprises a tape and a memory card.

11. The image capturing and reproducing apparatus of claim 10, wherein selecting the tape and the image capturing mode produces a menu on the display unit which includes at least one of a plurality of functions which allow a user to alter a voice mode of the image being captured, to display recording time left in the tape, to apply image effects to the image being captured, to change a shutter speed of a lens of the image capturing and reproducing apparatus, to perform handshake correction, to capture a photo of the image being captured, and to change an aspect ratio of the image being captured.

12. The image capturing and reproducing apparatus of claim 10, wherein selecting the tape and the image reproducing mode produces a menu on the display unit which includes at least one of a plurality of functions which allow a user to change a volume of a sound from the image being reproduced, to dub external audio sounds onto the image being reproduced, and to display an amount of reproduction time left in the tape.

13. The image capturing and reproducing apparatus of claim 10, wherein selecting the memory card and the image capturing mode produces a menu on the display unit which includes at least one of a plurality of functions which allow a user to change a pixel size of the image being captured, to alter an exposure setting of a lens of the image capturing and reproducing apparatus, to display an amount of MPEG-4 recording time left in the memory card, and to display a number or images which can fit onto the memory card.

14. The image capturing and reproducing apparatus of claim 10, wherein selecting the memory card and the image reproducing mode produces a menu on the display unit which includes at least one of a plurality of functions which allow a user to prevent the image being reproduced from being erased, to display a folder in which the image being reproduced is stored, to display an amount of reproduction time left in the memory card.

15. A method of an image capturing and reproducing apparatus, comprising:
- selecting between a mode of capturing an image onto at least one of a plurality of recording media and a mode of reproducing another image from at least one of the plurality of recording media;
- displaying an indicator corresponding to the selected mode;
- displaying the image being captured or the reproduced another image; and
- controlling a brightness of the image being captured or the reproduced other image while simultaneously controlling a volume associated with the image being captured or the reproduced other image, while maintaining the capturing of an image or the reproducing another image, respectively.

16. A non-transitory computer readable recording medium having embodied thereon a computer program to execute a method, wherein the method comprises:
- selecting between a mode of capturing an image onto at least one of a plurality of recording media and a mode of reproducing another image from at least one of the plurality of recording media;
- displaying an indicator corresponding to the selected mode; and
- displaying the image being captured or the reproduced another image, such that a brightness of the image being captured or the reproduced another image is gradually adjusted with a fade button while simultaneously controlling with the fade button a volume associated with the image being captured or the reproduced another image, while maintaining the capturing of an image or the reproducing another image, respectively.

17. A multifunctional image recording and playback device,
comprising:
a selection unit comprising:
- a mode selection switch to select between a power on/off mode, an image recording mode, and an image playback mode;
- a recording medium switch to select a recording medium from a plurality of recording media; and a display unit comprising:
- an LCD screen to display an image, and
- a menu button separated from the LCD screen to display a quick menu including frequently set items among a plurality of menu items included in a general menu according to mode selected mode,
wherein the general menu includes a greater number of menu items than the quick menu, and
wherein if the mode selected by the mode determining unit is an image capturing mode, the control button operates to perform zoom-in or zoom-out of an object and if the mode selected is an image reproduction mode, the control button operates to increase or decrease the volume of sound corresponding to the captured image.

* * * * *